United States Patent [19]
Schwenke et al.

[11] Patent Number: 5,940,293
[45] Date of Patent: Aug. 17, 1999

[54] BAR CHART EDITOR FOR INDUSTRIAL CONTROLLER

[75] Inventors: Marvin J. Schwenke, Clinton Township, Mich.; James Andrew Sinclair, Cleveland Heights, Ohio

[73] Assignee: Allen-Bradley Company, LLC, Milwaukee, Wis.

[21] Appl. No.: 08/955,486

[22] Filed: Oct. 22, 1997

[51] Int. Cl.[6] ............ G05B 11/01; G05B 15/02; G06F 19/00; G06G 7/66
[52] U.S. Cl. .............. 364/167.07; 364/167.02; 364/137; 364/138; 364/146; 364/147; 364/474.02; 364/474.28
[58] Field of Search ................ 364/138, 137, 364/147, 167.07, 167.02, 474.02, 474.23, 474.31, 474.36, 474.28, 146

[56] References Cited

U.S. PATENT DOCUMENTS

| | | | |
|---|---|---|---|
| 4,827,404 | 5/1989 | Barstrow et al. | 364/200 |
| 5,168,441 | 12/1992 | Onarheim et al. | 364/146 |
| 5,321,603 | 6/1994 | Schwenke | 364/146 |
| 5,485,620 | 1/1996 | Sadre et al. | 364/147 |
| 5,504,902 | 4/1996 | McGrath et al. | 395/700 |
| 5,508,909 | 4/1996 | Maxwell et al. | 364/147 |
| 5,594,858 | 1/1997 | Blevins | 395/326 |
| 5,623,401 | 4/1997 | Baxter | 364/147 |

Primary Examiner—William Grant
Assistant Examiner—Carolyn T. Baumgardner
Attorney, Agent, or Firm—Michael A. Jaskolski; John M. Miller; John J. Horn

[57] ABSTRACT

An editor apparatus and method for programming industrial controllers in relay ladder language, the apparatus or method used to provide RLL logic to control machine tool movements in a desired sequence. The apparatus includes a display for creating a bar chart image that represents all functions in a cycle and graphically illustrates all function contingencies. The apparatus gleans function, cycle and contingency information from the image and, based on the information, creates modules that include logic required to make each function contingent upon illustrated conditions. A compiler then compiles the modules to provide an RLL program section to control the cycle.

28 Claims, 30 Drawing Sheets

FIG. 38
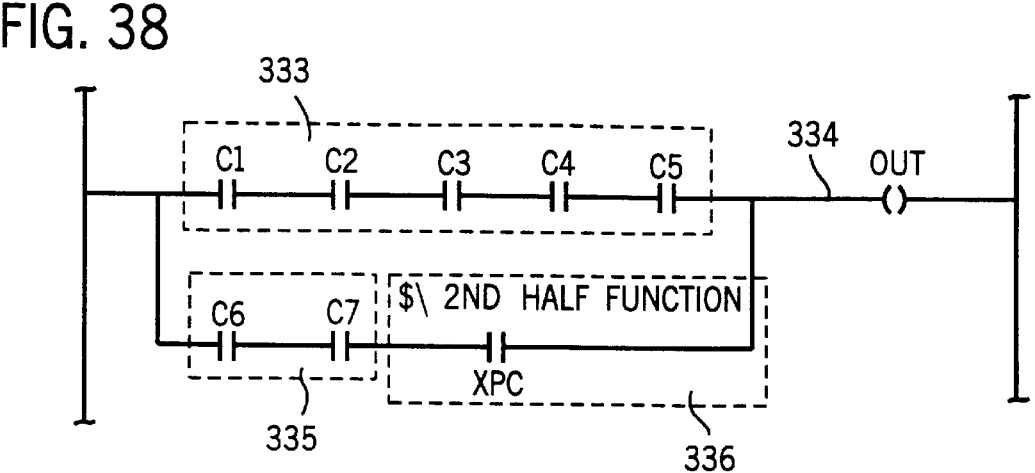
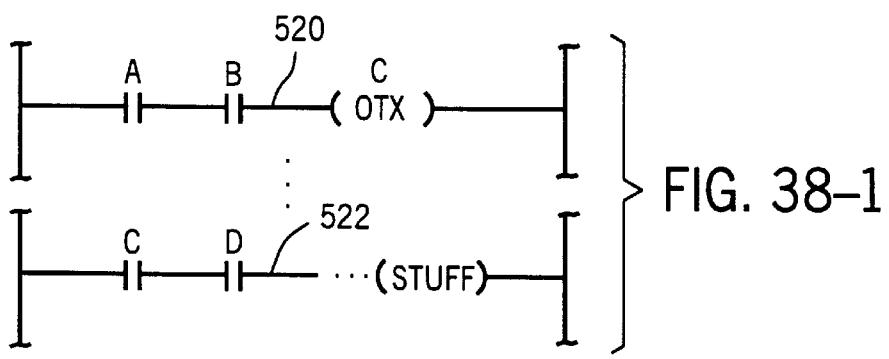
FIG. 38-1
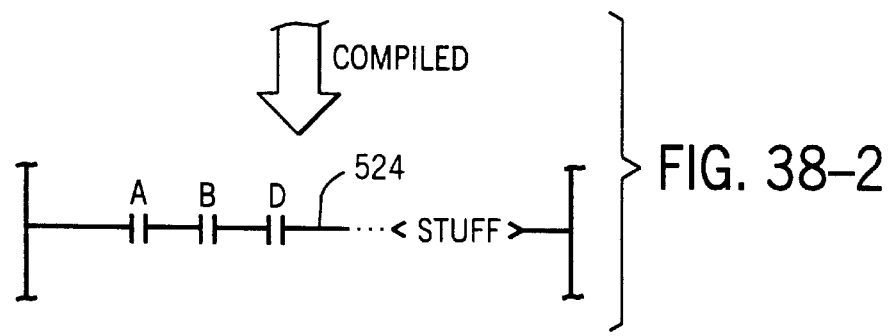
FIG. 38-2

BAR CHART EDITOR FOR INDUSTRIAL CONTROLLER

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to electronic programmable controllers for operating industrial equipment and, more particularly, to a programming interface used to develop control programs performed by industrial controllers to control industrial equipment.

Programmable controllers are well known systems for operating industrial equipment, such as assembly lines and machine tools, in accordance with a stored program. In these controllers, a stored program is executed to examine the condition of specific sensing devices on the controlled equipment, and to energize or de-energize selected operating devices on that equipment contingent upon the status of one or more of the examined sensing devices. The program not only manipulates single bit input and output data representing the state of the sensing and operating devices, but also performs arithmetic operations, timing and accounting functions, and more complex processing operations.

One industry which extensively uses programmable controllers is the automotive industry. In the automotive industry, various automotive parts are conveyed along machine lines consisting of many consecutive work stations, most work stations including at least one tool which performs some function to alter the characteristics of work pieces as they are delivered to the station. For example, an unfinished cast engine block that requires a plurality of holes, bores, and threads, as well as other metal removing procedures, may be provided at the beginning of a machine line that produces finished engine blocks. The machine line may consist of any number of different stations, each station performing a different procedure on the unfinished block. An indexer in the form of a transfer bar can be arranged to move each block from one station to the next following a completed process. Typically, at each station the block would be clamped prior to any metal removing operation.

In this type of a system, a programmable controller would receive inputs from all of the various tools at all of the work stations and would provide activating output signals to synchronize machine operation. During metal removing periods with the transfer bar out of the way, all of the tools would perform their functions. In between metal removing periods during transfer periods, the tools would be parked, the clamps un-clamped, and the transfer bar would advance work pieces from one station to the next.

Industrial controllers are frequently programmed in "relay ladder" language (RLL) where instructions are represented graphically by "contacts" and "coils" of virtual relays connected and arranged in ladder-like rungs across power and ground rails. RLL, with its input contacts and output coils, reflects the emphasis in industrial control on the processing of large amounts of input and output data.

RLL also reflects the fact that most industrial control is "real time"; that is, an ideal industrial controller behaves as if it were actually composed of multiple relays connected in parallel rungs to provide outputs in essentially instantaneous response to changing inputs. Present industrial controllers do not, in fact, employ separate parallel relay-like structures, but instead simulate the parallel operation of the relays by means of a conventional Von-Neumann type computer processor which executes instructions one at a time, sequentially. The practical appearance of parallel operation is obtained by employing extremely fast processors in the execution of the sequential control program.

As each rung is executed, inputs represented by the contacts are read from memory (as obtained from inputs from the controlled process or the previous evaluation of coils of other rungs). These inputs are evaluated according to the logic reflected in the connection of the contacts into one or more branches within the rungs. Contacts in series across a rung represent boolean AND logic whereas contacts in different branches and thus in parallel across the rung represent boolean OR logic.

Typically a single output coil at the end of each rung is set or reset and based on the evaluation of that rung this setting or resetting is reflected in the writing to memory of a bit (which ultimately becomes an output to the industrial process or to another RLL rung).

Once the given rung is evaluated, the next rung is evaluated and so forth. In the simplest form of RLL programming, there are no jumps, i.e. all rungs are evaluated in a cycle or "scan" through the rungs. This is in contrast to conventional computer programming, where branch and jump instructions cause later instructions or groups of instructions to be skipped depending on the outcome of a test associated with those branch or jump instructions.

While RLL is well suited for controlling industrial processes like those in the automotive industry, RLL programming is not an intuitive process and therefore requires highly skilled programmers. Where hundreds of machine tool movements must be precisely synchronized to provide a machining process, programming in RLL is extremely time consuming. The time and relative skill associated with RLL programming together account for an appreciable percentage of overall costs associated with a control system. In addition, the final step in RLL programming is typically a lengthy debugging and reworking step which further adds to overall system costs.

One way to streamline any type of programming is to provide predefined language modules which can be used repetitively each time a specific function is required. Because of the similar types of tools and movements associated with different machine line stations, industrial control would appear to be an ideal industry for such language modules. For example, various stations in a single machine line could employ drilling tools having identical limiting motion and configuration parameters.

In this case the idea would be to design a ladder logic language module for a drill once, place the drill language module into a control library and thereafter, each time drill logic is required, download the drill language module into a control program. Similarly, language modules for other types of tools could be designed once and then used repetitively to reduce programming and debugging time. The module library could be expanded until virtually all tool movements are represented. Library components would be viewed as "black boxes" with predefined interfaces, in much the same way that integrated circuits are used in the electronics industry.

In addition, to make it easier to program in RLL, a comprehensive module library would also facilitate automated RLL programming using a programming editor. For example, an entire module library could be stored in the memory of an electronic editing apparatus. Using the apparatus, a user could designate all characteristics of a machine. Thereafter, using the designated characteristics, the apparatus could select language modules from the module library and assemble an RLL program to control the machine.

The module library approach would work quite well for certain applications like small parts material handling or simple machining. The reason for this is that the RLL logic required for these applications tends be very small and highly reusable because the I/O count is minimal and interactions between modules are simplistic.

Unfortunately, there are many areas of industrial control for which it is particularly difficult to provide reusable language modules due to relatively large and varying job specific I/O requirements and the complexity and variability of interaction between modules.

One area of industrial control that defies the predefined language module approach is sequential control. Sequential control is the synchronization of individual tool movements and other subordinate processes to achieve a precisely defined sequence of machining operations. While it may be easy to enumerate all of the possible sequences involving just a few simple tool movements, the number of possibilities increases rapidly as the number and complexity of the tool movements increases, to the point where any attempt to enumerate them all is futile.

For example, a typical machine station configuration may include five different tools, each of which performs six different movements for a total of thirty movements. In this case, each tool movement must be made dependent on the position of an associated tool. In many cases, movement of a tool must also be conditioned upon positions of all other tools at the station. In addition, tool movements at one station are often tied to tool movements at other stations or the completion of some portion of a cycle at some other station. Furthermore, tool movement may also be conditioned upon the states of manual controls.

Taking into account the large number of machine line tools, tool movements, manual control types, manual control configurations, and cross-station contingencies that are possible, the task of providing an all encompassing module library capable of synchronizing tool movements becomes impractical. Even if such a library could be fashioned, the task of choosing the correct module to synchronize station tools would probably be more difficult than programming required RLL logic from scratch.

For these reasons, although attempts have been made at providing comprehensive language module libraries, none of the libraries has proven successful at providing comprehensive logic to synchronize tool movements. In addition, none of the libraries has made automated RLL programming a reality. Thus, typically synchronization programming in RLL is still done from scratch.

Therefore, in order to reduce programming time and associated costs, it would be advantageous to have a more flexible means of specifying control logic for controlling machine sequences. It would be advantageous if such a means enabled less skilled programmers to provide sequential control logic. Furthermore, it would be advantageous if reusable logic templates, comprising the basic components of a sequential control program, could be composed into a library of templates that would be employed to produce sequential control logic with consistent behavior and form.

Moreover, it would be advantageous if such a library of templates could be accessed using a programming apparatus such as a personal computer, or the like, to further minimize programming time required to program machine sequential control in RLL.

BRIEF SUMMARY OF THE INVENTION

The present invention includes a programming apparatus that allows a user to construct a bar chart image or graphical depiction on a computer screen which resembles a bar chart programming tool. A bar chart is a conventional controller programming tool that consists of a graphical cycle representation illustrating all related tool movements in a cycle. Control engineers regularly generate bar charts on paper to visualize sequences of motion. The apparatus gleans information from the bar chart image and, using a template based programming language, constructs a template based machine model.

A template is a language module that includes some truly reusable machine logic and a section wherein other templates can be designated that are required to provide machine logic for job-specific control requirements. When compiled, the model provides complete RLL logic for controlling sequenced tool movements.

Thus, one object of the present invention is to provide an apparatus that can reduce the time and cost associated with programming sequences of tool movements in cycles. Using the inventive apparatus, a user can quickly construct a bar chart image on a computer screen that contains all of the information necessary to sequence tool movements. The apparatus includes an editor that gleans all required information from the bar chart image, determines if additional templates are required to provide job specific logic and, where additional templates are required, creates required templates and populates existing templates with references to the new templates. Compilation is a simple process so that, after a bar chart image has been created, the apparatus itself can completely convert bar chart information into sequencing logic thus minimizing programming time and associated cost.

Another object of the present invention is to minimize the amount of training required before a user is competent in programming sequencing logic. Control engineers are already familiar with the process of constructing and using bar charts as an aid for cycle visualization. Because the inventive apparatus interfaces with a user via a bar chart image, control engineers should be comfortable using the present apparatus.

Yet another object is to provide a module library that includes logic that can be altered to accommodate job-specific requirements for sequencing cycle functions and making functions contingent upon various function conditions including function states in cycle, instantaneous states of other cycles, and instantaneous conditions of manual control devices. The present invention includes a "bucketing" means whereby certain conditions of related functions are placed in different groupings depending upon relationships between the functions and an associated function. Control logic including an output, is provided for each group indicating when all conditions in the group are true or when one or more are false. The outputs are mapped into the logic module associated with a function to provide synchronized automatic and manual function control that is conditioned as required, on the states of the related functions. In this way, function module logic is altered to accommodate job-specific requirements for a cycle.

Other and further objects and aspects of the present invention will become apparent during the course of the following description and by reference to the accompanying drawings.

BRIEF DESCRIPTION OF THE SEVERAL VIEW OF THE DRAWINGS

FIG. 38 is a diagram depicting an RLL rung including a branch having a pseudoinstruction; FIGS. 38-1 and 38-2 are diagrams depicting RLL rungs and the effect of a pseudoinstruction upon compilation;

DETAILED DESCRIPTION OF THE INVENTION

I. Exemplary Industrial Process

Figure 1:
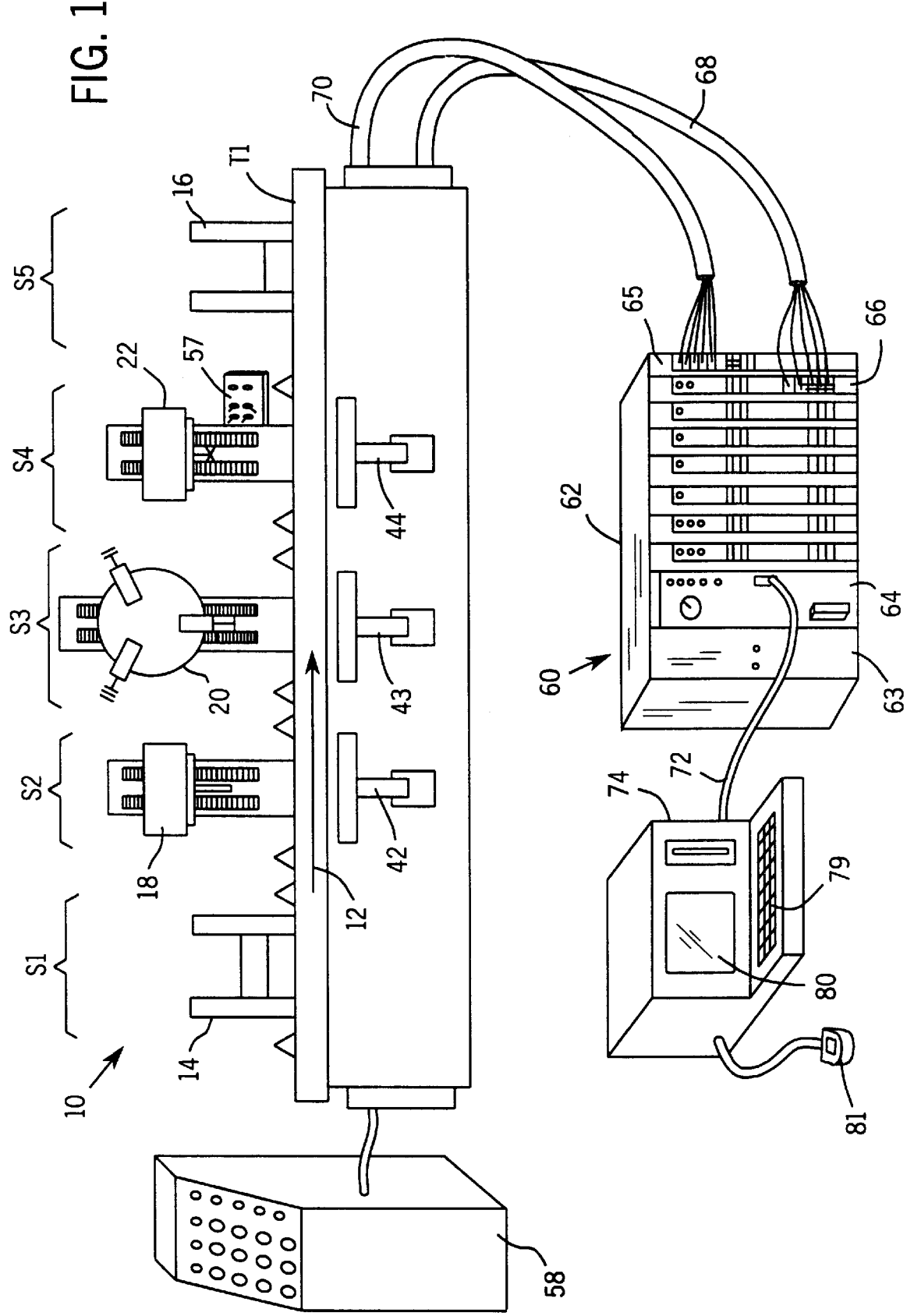
FIG. 1 is a diagram of an industrial machine that is operated by a programmable controller according to the present invention.

The present invention will be described in the context of the exemplary machine 10 shown in FIG. 1. The machine 10 includes a single indexer in the form of a transfer bar T1 which moves workpieces (not shown) along its length in the direction of arrow 12. The machine 10 also includes a number of tools referred to herein as work units, located at five different stations S1–S5 which either alter workpiece orientation or perform some type of metal-removing process on workpieces when present at an associated station. To accommodate the metal-removing process, the transfer bar T1 moves workpieces in a step-wise fashion, from station to station, the work pieces being held in position during metal-removing periods and moved during transfer periods.

The first station S1 includes a loader 14 which feeds work items to a first end of the transfer bar T1. The fifth station S5 includes an unloader 16 which removes work items from a second end of the transfer bar T1. Work units at stations S2, S3 and S4 perform metal-removing processes. Stations S2, S3 and S4 include a vertical drill 18, a turret mill 20 and a horizontal mill 22, respectively. Each of the tools at work units 18, 20 and 22 should be well-known to a person of ordinary skill in the art and, therefore, each will not be explained in detail.

Because work items have a tendency to move during machining processes, three clamps 42, 43 and 44 are provided, one at each of the three metal-removing stations S2, S3 and S4. Prior to a machining period, each clamp 42–44 automatically clamps a work item at an associated station in a position aligned with station tools for metal removal.

In an effort to simplify explanation of the present invention, aspects of the invention which pertain to the stations and associated tools will be described in the context of the fourth station S4 and the horizontal mill 22. However, despite obvious differences between the physical configurations of a turret mill 20, a drill 18, and a horizontal mill 22, a person of ordinary skill in the art should be able to apply the principles taught below to control either the turret mill or drill, or any other tool, for that matter. Hereinafter, whenever reference is made to the "present example", it should be assumed that the explanation is referring to the fourth station S4 and the horizontal mill 22 unless otherwise designated.

Figure 2:
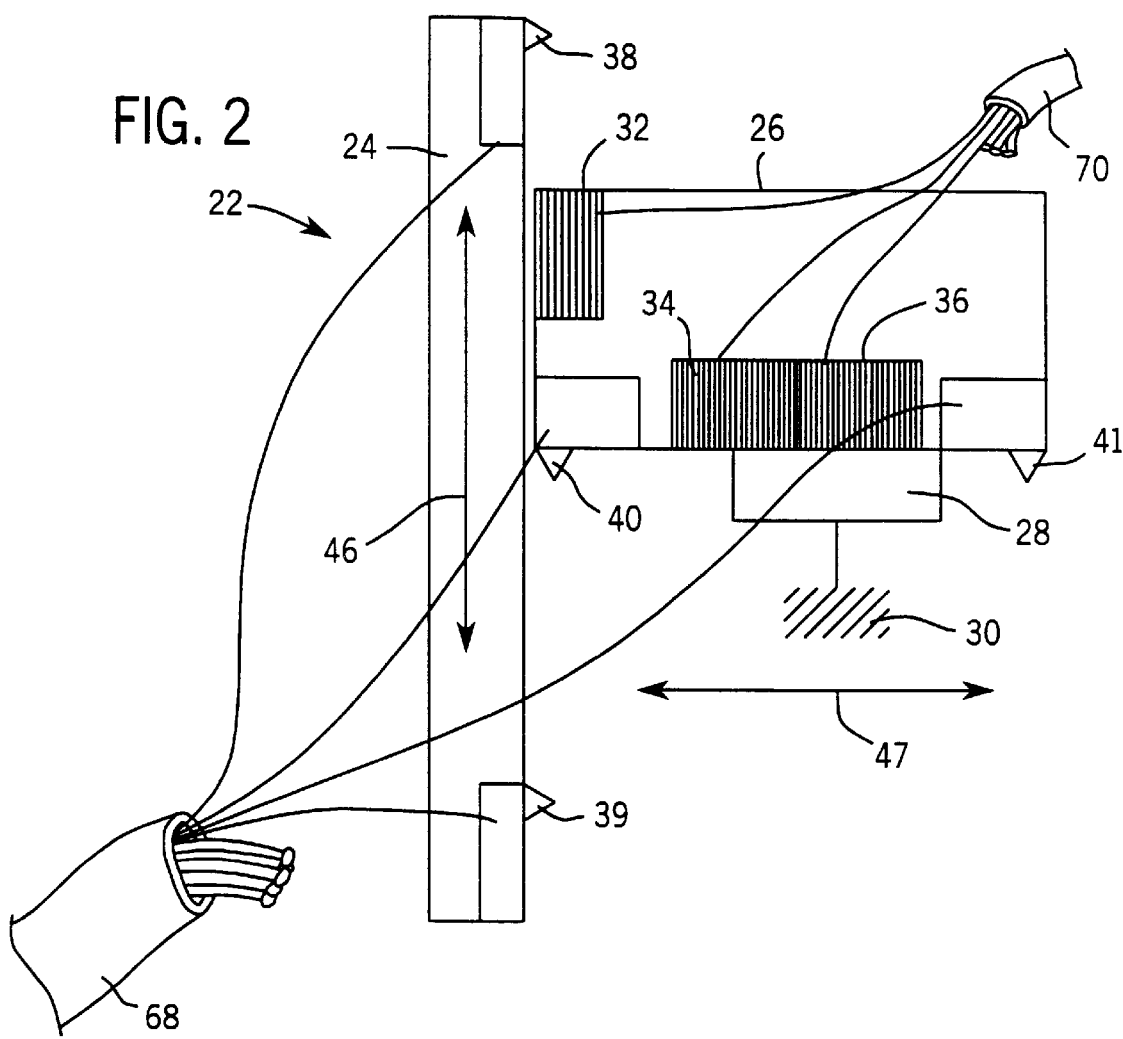
FIG. 2 is a side view of the horizontal mill of FIG. 1.

Referring to FIG. 2, the horizontal mill 22 includes a vertical support 24, a main slide subassembly 26, a cross slide subassembly 28, and a spindle 30. The vertical support 24 has a track (not shown) on which the main slide subassembly 26 is mounted for movement vertically along the track (i.e. along arrow 46) between returned and advanced positions near the top and near the bottom of the vertical support 24, respectively. The main slide subassembly 26 and vertical support 24 form what is referred to herein as a linear axis. The term linear axis (i.e. axis) will be used hereinafter to refer to an assembly of two or more mechanical components wherein one component (or sub-assembly) has freedom to move with respect to the others in a reciprocal manner along a single axis between two end points.

Referring still to FIG. 2, the horizontal mill 22 includes a second axis formed between the main slide subassembly 26 and the cross slide subassembly 28. The cross slide subassembly 28 is mounted on a track (not shown) to the bottom of subassembly 26 for horizontal movement (i.e. along arrow 47) between a returned position adjacent to the vertical support 24 and an advanced position at the distal end of the subassembly 28.

In addition to the two axes identified above, the horizontal mill 22 includes yet a third axis which is not as readily apparent as the first two. The third axis is related to a contractor required to start a motor used to turn the mill spindle 30. The contractor moves linearly from a de-energized position to an energized position and vice versa.

Each of the other work units 14, 16, 18 and 20 in FIG. 1 also includes one or more axes. The loader 14 includes a shuttle, the drill 18 includes a spindle and a slide, the turret mill 20 includes a spindle, a slide and a turret, and the unloader 16 includes an ejector.

The direction and velocity of the moveable portion of each axis with respect to an associated stationary component is determined by discrete control devices such as induction motors, hydraulic or pneumatic cylinders, etc., applied singularly or in combinations. The horizontal mill 22 includes three motors, a main slide motor 32 for moving the main slide subassembly 26 vertically, a cross slide motor 34 for moving the cross slide subassembly 28 horizontally, and a spindle motor 36 for turning spindle 30.

The horizontal mill 22 also includes four limit switches 38, 39, 40 and 41. A main returned switch 38 is positioned at the top of the vertical support 24 on the vertical track to delimit the returned position of the main slide subassembly 26. A main advanced switch 39 is positioned below switch 38 on the vertical track to delimit the advanced position of subassembly 26. When neither of the limit switches 38, 39 are switched, the subassembly is in an intermediate position somewhere between the advanced and returned positions.

Cross returned 40 and advanced 41 switches are separated along the horizontal track to delimit the returned and advanced positions of the cross slide subassembly 28. Again, when neither switch 40 nor 41 is switched, subassembly 28 is said to be in an intermediate position. Each of the subassemblies 26, 28 includes two dogs (not shown) for tripping associated switches 38, 39 and 40, 41 respectively.

Referring again to FIG. 1, in the metal-removing process example included here, a work item is loaded by loader 14 onto the transfer bar T1 at the first station S1. When all of the metal-removing processes at stations S2–S4 have been completed, associated tools are parked, the clamps 42, 43 and 44 are unclamped and parked, and the unloader 16 at station S5 is parked, the transfer bar simultaneously moves items at the fourth station to the fifth, the third station to the fourth, the second station to the third, and the first station to the second. Then, during a subsequent machining period, all of the tools at stations S2–S4 work simultaneously to perform their metal-removing processes while the following sequence of operations occurs: (1) the unloader 16 removes the workpiece from station S5, (2) the now empty transfer bar returns to its start position, then (3) the loader 14 loads another workpiece at station S1.

Referring again to FIG. 2, to execute its milling process, with its spindle 30 rotating, the horizontal mill 22 steps through a machine cycle which includes movement of both the main slide subassembly 26 and the cross slide subassembly 28. In keeping with standard industry nomenclature, a typical machine cycle can be divided into two sequences. A sequence is a correctly-orchestrated set of actions by one or more axes of motion that realizes some portion of a manufacturing process. These actions may be required to occur in series or in parallel with each other, and/or in any combination, possibly with some actions overlapping others. These actions may also be interlocked by and/or synchronized with other external states or events, which may themselves be derived from other sequences.

The two sequences in a cycle are always separated by a remembrance variable or latch, indicating that the first sequence is completed and that the second sequence can begin. The second sequence in a cycle necessarily inverts the actions performed by the first sequence. The order in which the actions of the second sequence occur is in no way constrained by this invention or related to the order in which the actions occurred in the first sequence. The important principle is that the actions in the second sequence return tools to the state they occupied prior to the beginning of the first sequence, typically returned states.

Figure 3:
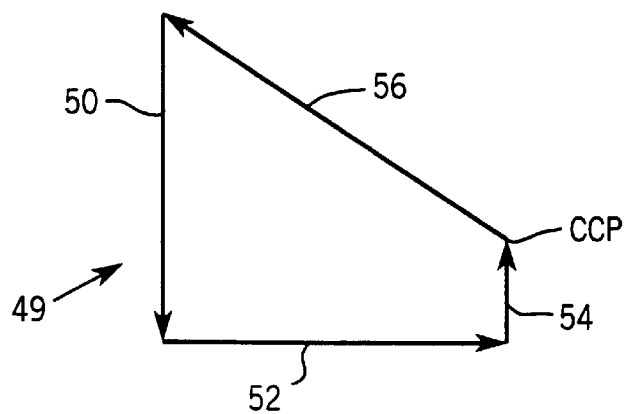
FIG. 3 is a diagram which depicts exemplary movements of the horizontal mill of FIG. 2.

Referring also to FIG. 3, a mill cycle 49 for the horizontal mill 22 includes four separate movements. A first movement is a main slide advance represented by vertical downward arrow 50. The second movement is a cross slide advance represented by horizontal arrow 52. The third movement is a main slide return and the fourth is a cross slide return. Arrow 54 corresponds to the beginning of a main slide return movement, the vertical component of arrow 56 corresponding to the end of the return movement. Similarly, the horizontal component of arrow 56 corresponds to the cross slide return movement. Thus, the last portion of the main slide return movement occurs in parallel with the cross slide return movement. The main and cross slide advance movements 50, 52 together form the first sequence of mill cycle 49, and movements corresponding to arrows 54 and 56 represent the second sequence.

At the beginning of a machine cycle, both the main 26 and cross 28 subassemblies are in returned positions with associated returned limit switches 38 and 40 tripped. After a workpiece is clamped into a machining orientation at the fourth station S4, the mill cycle 49 begins with main slide advance movement 50 bringing the spindle 30 down to a point laterally adjacent the workpiece. The main slide advance movement 50 is completed when the main advanced switch 39 is tripped.

At that point the cross slide advance movement 52 begins and the rotating spindle 30 is moved laterally into the workpiece until cross advanced switch 41 is tripped. During this movement the main advance switch 39 remains tripped. When cross advanced switch 41 is tripped and the main advance switch 39 is tripped, the metal-removing portion, or first sequence of mill cycle 49, is completed. The second sequence begins with the first portion of the slide return movement 54 moving the spindle upward and out of the workpiece. After a short distance, main advanced switch 39 becomes untripped at a cutter clear point CCP, indicating that the main slide subassembly 26 is in an intermediate position and that the spindle 30 is clear of the workpiece (i.e. will not impact the workpiece if moved horizontally toward a returned position). At the cutter clear point CCP, the cross slide subassembly 28 begins to move back to its returned position while the main slide subassembly 26 continues its ascent.

Ultimately, both subassemblies 26, 28 reach their returned positions and trip their returned switches 38, 40 respectively, indicating the end of the mill cycle 49.

Referring again to FIG. 1, in addition to all of the components identified above, most machine lines include at least one main control panel 58 including an assortment of buttons, switches and lights. Often, a machine 10 will include more than one control panel. In addition to main panel 58, the exemplary machine 10 includes a horizontal mill control panel 57. Each control panel 57, 58 includes an input/output bus (not shown) for receiving position signals and providing control signals as required.

Control panels are provided at various machine locations for three main purposes. First, a control panel allows a user to switch from automatic to manual operation or to locally turn off a section of the machine. Thus, a control panel allows a user to select different modes (e.g. automatic or manual) of operation.

Second, when a manual mode of operation is chosen, a control panel provides buttons and switches which are used in manual machine operation. Manual controls are typically push buttons that facilitate local control of cycle movements. For example, referring to FIGS. 2 and 3, a manual push button could be provided to drive the main slide subassembly 26 from the returned position at the top of vertical support 24 to the advanced position at the bottom (i.e. through the main slide advance movement corresponding to arrow 50). Similarly, another manual push button could move subassembly 26 back from the advanced to the returned position (i.e. through the main slide return movement associated with arrow 54 and the vertical portion of arrow 56). For most push buttons, successful operation of an associated component or subassembly is contingent upon the favorable positioning of interlocked components. For example, referring still to FIGS. 2 and 3, pushing a button associated with advancing the main slide subassembly 26 will result in motion only if the cross slide subassembly 28 is in the returned position. Other contingencies or safeties may apply as well.

Third, during manual operation of a machine or a section of a machine, indicators are often required to help a user identify machine tool positions (e.g. advanced, intermediate or returned positions). Thus, a control panel will often provide indicator lights to facilitate observation. For example, referring again to FIG. 2, when the horizontal mill 22 is in manual mode, a light may be required for indicating when the main slide subassembly 26 is in the advanced position or when it is in the returned position. With the present invention, all indicator lights indicate assembly positions regardless of modes of operation (i.e. auto, manual, etc.).

II. Programmable Controller

Referring again to FIG. 1, the actuators (typically motors, pneumatic devices, or hydraulic devices) associated with the entire machine 10 operate in response to control signals from a programmable controller 60.

The programmable controller 60 has a rack 62 containing a power supply 63, a processor module 64, an output module 65 and an input module 66. The processor module 64 executes a control program defined by the user which samples input signals received via the input module 66 along input bus 68 and based upon the status of those inputs, activates or deactivates appropriate output lines of output bus 70 connected to the output module 65. As shown in FIG. 2, the output bus 70 is connected to the main, cross, and spindle motors 32, 34, 36 to turn on and off the corresponding motors. Additional output lines from module 65 are connected to machine tools at other stations and to lights on the operator panel 58 to indicate machine status. Referring specifically to the horizontal mill 22 in FIG. 2, the input module 66 receives signals from all four limit switches 38, 39, 40 and 41 indicating the tripped status of each switch.

Figure 4:
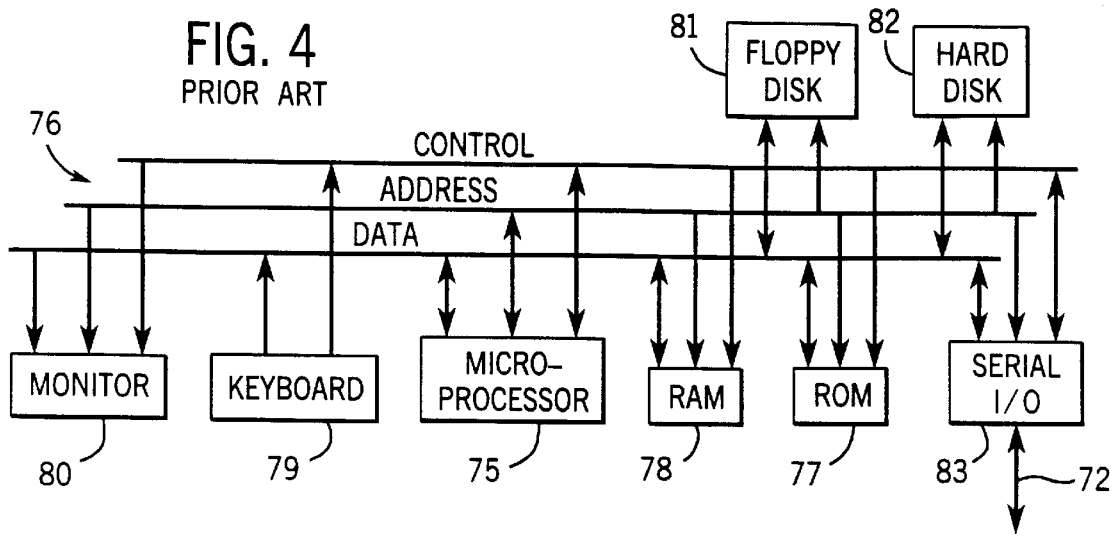
FIG. 4 is block diagram of the programming terminal of FIG. 1.

The processor module 64 is connected by cable 72 to a programming terminal 74 which the user employs to instruct the processor module how to operate the machine 10. The programming terminal 74 is a personal computer, the principal components of which are illustrated in FIG. 4. A microprocessor 75 is connected to a set of buses 76 comprising data, address and control buses. Programs for execution by the microprocessor 75 are stored in a read only memory (ROM) 77 and a random access memory (RAM) 78 is included for the storage of data. A keyboard 79 enables the user of the programmable controller to enter data. A monitor 80 is provided as a device for displaying information to the user. Data and programs also can be stored on a floppy disk drive 81 or a hard disk 82. A serial I/O interface circuit 64 couples the programming terminal 74 to the processor module 64 by cable 72.

III. Conventional Controls Engineering

Programming an industrial controller is a complex task in part due to the large number of tools that must be synchronized and simultaneously controlled. To simplify the programming process the industry has developed a number of different diagramming conventions that help a programmer visualize the process to be controlled and the relationships between various machine elements. Four conventional views are a machine floor plan, a work-unit control metaphor, a control panel specification and a bar chart (i.e. timing diagram).

The floor plan typically presents an aerial view of a machine detailing the special relationship between all machine tools and control panels. A user can use the floor plan to systematically step through the machine elements and design program sections for each element, later tying element control together when required.

Figure 5:
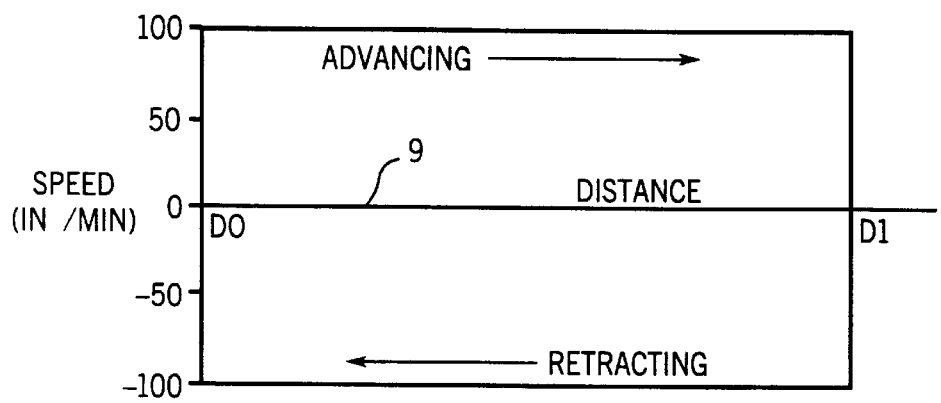
FIG. 5 is a control metaphor which depicts a motion profile of the horizontal mill axis of FIG. 2.

Referring to FIG. 5, a control metaphor for the main slide axis of the horizontal mill 22 can be observed. The abscissa of the metaphor represents the distance that the main slide subassembly 26 travels along the vertical track and the ordinate represents the speed of the travel with the zero speed axis represented by a central horizontal line.

Locations on the metaphor above the zero speed axis 9 designate the subassembly 26 advancing toward a workpiece whereas locations on the metaphor below the zero speed axis have a negative speed and denote retracting the subassembly 26 toward a returned position. As can be seen from the metaphor, the subassembly 26 advances toward a workpiece from the returned position at approximately distance D0 until it reaches distance D1 where the subassembly 26 stops until it is to be retracted. The retraction occurs until the subassembly has reached the full-returned position at distance D0 and coasts to a stop. The control metaphor illustrated in FIG. 5 is well-understood and conventionally used by control engineers to describe linear motion.

A control panel specification designates specific buttons, switches and lights that are required on a control panel to facilitate machine start up, local control and observation. In addition, for local control devices, a control panel specification identifies which movements the devices control or monitor. For example, referring again to the horizontal mill of FIG. 2, a light may be required to indicate when both subassemblies 26, 28 are in their returned positions (i.e. when returned switches 38 and 40 are tripped). In addition, a mode switch may be required to place the horizontal mill 22 in local mode for local control which would require a series of additional buttons to facilitate local or manual control. A typical control panel specification would include a list of device requirements or an actual panel image defining required devices.

A bar chart or timing diagram is a drawing which helps a programmer visualize the relationships among various tool movements in a cycle. Referring again to FIGS. 2 and 3, during the mill cycle 49, each of the main 26 and cross 28 slide subassemblies steps through an advance movement and a return movement, each separate movement being a function. Thus, during the mill cycle, four separate functions occur: a main slide advance, a cross slide advance, a main slide return and a cross slide return.

Figure 6:
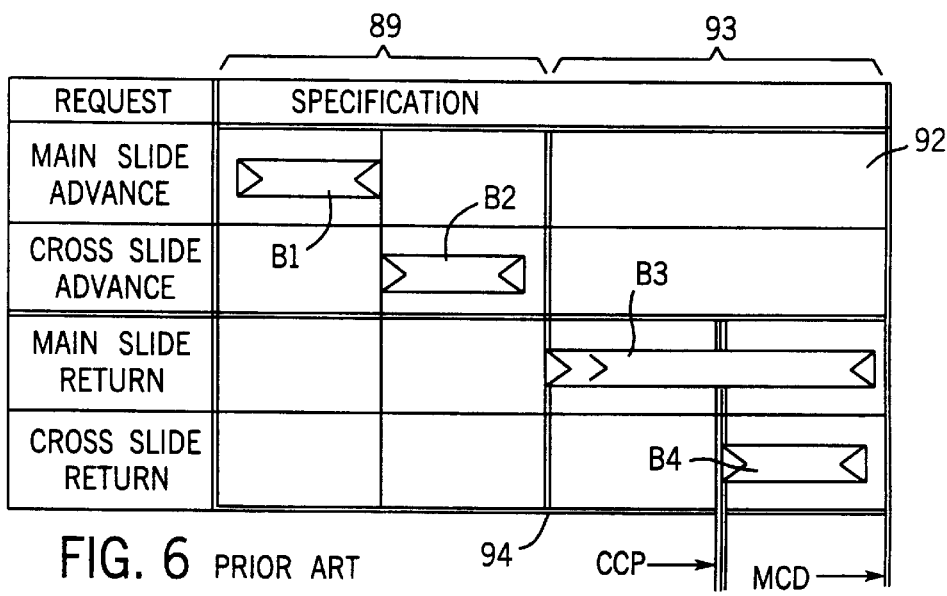
FIG. 6 is a bar chart image corresponding to the exemplary movements of FIG. 3.

Referring also to FIG. 6, each function that occurs during a cycle 49 is placed in a "request" column of a bar chart 92. The functions are usually arranged in order of occurrence. Next, horizontal bars B1, B2, B3, or B4, one representing each function, are placed in a specification section of the chart, an abscissa of the chart denoting temporal function relationships (i.e. bars placed farther to the right in the chart 92 represent functions that start later in time). Referring still to FIGS. 2, 3 and 6, the main slide advance movement begins cycle 49 and, therefore, a bar B1 corresponding to the main slide advance function appears first and is left justified. After the main slide advance is completed, the cross slide advance movement begins and, therefore, a bar B2 corresponding to the cross slide advance function starts immediately after the end of bar B1. The cross slide advance ends at a latch point 94 indicating the end of the first sequence in the mill cycle 49.

When the cross slide advance is completed, the main slide return movement starts and continues until the end of the cycle 49 at a mill cycle done (MCD) point. The main slide return is represented on the bar chart 92 by function B3. At a cutter clear point (CCP), when switch 39 is released, indicating that the mill spindle 30 is clear of the workpiece, the cross slide return movement begins. This is represented by bar B4. While bars B1 and B2 do not overlap and thus represent serial functions, bars B3 and B4 do overlap after CCP indicating parallel motion of two different axes.

Typically, a programmer will use all four above-described views together during programming to systematically step through a floor plan element by element, defining each axis separately, using a suitable control metaphor and using bar charts to tie axes together and form complete cycles.

IV. Template Language

In order to understand the template language concept, it is first necessary to understand that all machine attributes, including machine components, component physical and operational characteristics, and component movements, can generally be referred to as control-tasks and that there is a natural hierarchical relationship between various control-tasks. Any machine and associated industrial process can be subdivided into a network of separate, related control-tasks that form a hierarchy of control-tasks. For example, referring to FIGS. 1 and 2, the exemplary process represents a single machine having specific control-tasks (i.e. indexers, stations, work-units, and movements . . . ). While the machine 10 includes several different physical tools or control-tasks, one of its fundamental characteristics is that it includes a number of tools of the type indexer. Machine 10 includes only one indexer, transfer bar T1. There is a hierarchical relationship between the machine 10 and its indexer T1 and the machine 10 can be defined in part, by a list of its indexers.

Figure 7A:
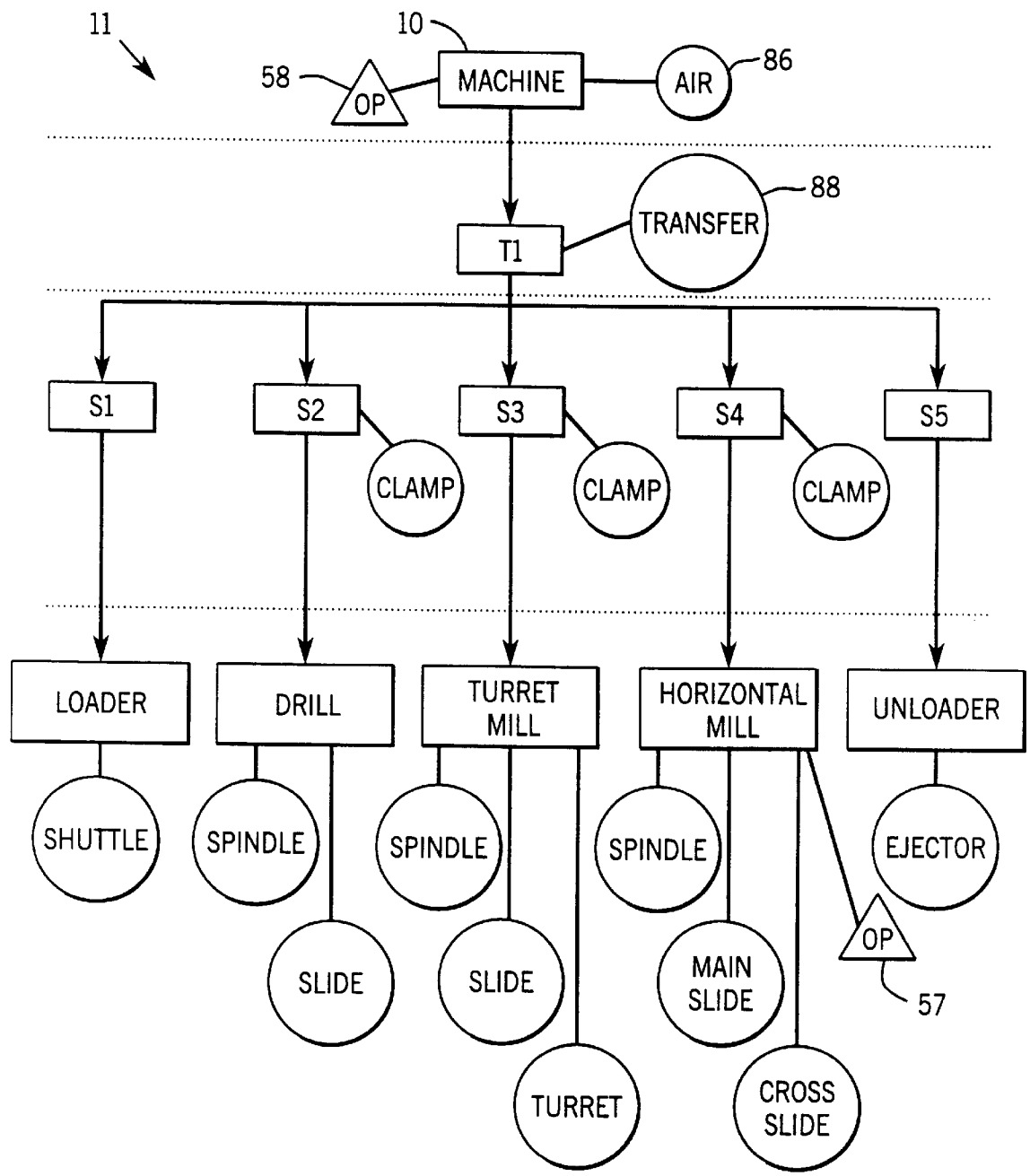
FIGS. 7A and 7B are block diagrams of a machine tree metaphor.

Referring to FIG. 7A, a machine tree 11 corresponds to machine 10 in FIG. 1 is illustrated. Tree components (i.e. control-tasks) in FIG. 7A that correspond to numbered machine components in FIG. 1 have been identically numbered in FIG. 7A so that the machine 10 and tree 11 can be easily compared. In FIG. 7A, direct connection between two elements signifies a parent/child relationship between two elements where the higher control-task in the tree is the parent and the lower control-task is the child. Where a parent/child relationship exists, the child control-task represents one fundamental characteristic of the parent control-task. In FIG. 7A, the hierarchical relationship between the machine 10 and the indexer T1 is illustrated at the top portion of the machine tree 11.

The most fundamental characteristic of indexer T1 is that it includes five stations S1–S5 and therefore, stations S1–S5 can be hierarchically related to the indexer as illustrated. Continuing, each work-unit is hierarchically related to its associated station and one or more axes are hierarchically related to each work-unit.

In addition to the hierarchical relationship identified above, each machine tree 11 component can also have a direct relationship to an axis. For example, all of the indexer T1, stations and work-units in machine 10 may require a pneumatic air source for operation. Where a machine-wide air requirement exists, the machine 10, as opposed to one of its child components, should control an air valve to provide air to all machine components. Thus, in addition to its list of indexers, other fundamental characteristics of a machine as a whole are axes that are directly connected to the machine 10. In FIG. 7A, in addition to being directly connected to its indexer T1, the machine 10 is also connected to an air axis 86 for opening an air valve.

Similarly, the indexer T1 is connected to a transfer axis 88 for controlling the transfer bar for all stations S1–S5. Moreover, each of the stations S2–S4 that includes a clamp is connected to a different clamp axis for controlling an associated clamp.

A third fundamental defining aspect of each tree component is whether or not the component requires a control panel. In the present example, the machine 10 includes a main control panel 58 for controlling the entire machine and therefore, a control panel 58 is shown on the machine tree 11 directly connected to the machine 10. In addition, the horizontal mill 22 includes a local control panel 57 for controlling only the mill 22. A control panel 57 is shown directly attached to the horizontal mill in tree 11.

Therefore, the entire industrial process shown in FIG. 1 can be viewed as a machine tree 11 made up of the hierarchically-related components or control-tasks shown in FIG. 7A. Each control-task can be entirely described by identifying its most fundamental characteristics, including control-tasks from the next hierarchical level, any directly-connected axis control-tasks and any directly-connected, control panel control-tasks. With this understanding of an industrial machine, template language can now be explained.

Template language guides a user to assemble from a set of programming units called modules a complete and correct machine tree 11. Individual modules are identified with templates, which include truly reusable control logic so that, when a template-based machine tree is compiled, a complete control program for an industrial process is produced.

A template is a model program unit available for repeated use as a pattern for many modules based thereon. A template can be analogized to a data entry form wherein form identification can refer to either a blank instance of a master copy or a completed instance. In this description, the term "template" is used to mean the essence of a pattern as well as a completed instance of the pattern referred to also by the term "module".

The template language includes two types of language statements. A first statement type includes statements that are wholly independent of the underlying control language form. A second statement type includes underlying control language form itself, plus extensions to that form, making the form more flexible. Typically, the underlying language form will be RLL. The second statement type is particularly useful where automated electronic editors are used to compile a template based machine tree, thus generating a control program in the underlying control language form. Each statement type will be explained separately.

A. Statements Independent of the Underlying Control Language Form

Referring again to FIGS. 1 and 7A, a typical set of templates used to provide a program for machine 10 will have a template type corresponding to each machine tree control-task type. For example, a template set for machine 10 would include machine, indexer, station, workunit, axis and control panel templates. In addition, the set would include other more detailed templates to further define each of the aforementioned templates. A template is a model program unit available for repeated use as a pattern for many modules based thereon.

Figure 8:
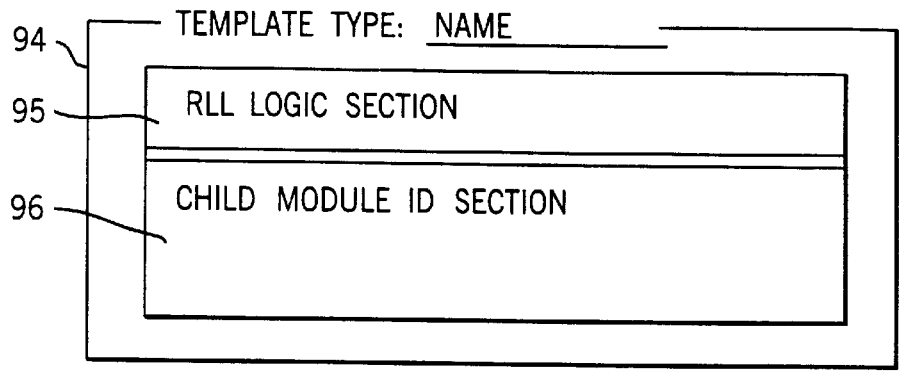
FIG. 8 is a diagram illustrating a template showing a possible arrangement of the contents of the template.

Referring to FIG. 8, a typical template includes a template type designation and may include a name field which must be filled each time a template is used so that the specific instance of the template can be differentiated from other modules, including other instances of the same template.

In addition, each template 94 may include RLL logic sections 95 having one or more rungs of RLL logic. The idea here is that for each specific template type 94 used to represent a specific control-task type in a machine tree 11, there will often be some logic, albeit in many cases minimal, that is always required for the specific control-task type. For example, for safety purposes, a master control panel will always include ON-OFF means for turning the machine on and off. Thus, every machine template will require ON-OFF RLL logic and an RLL logic section 95 will provide the universally required logic.

Each template 94 may also include child module specification sections 96. The contents of the child module specification section 96 represents one type of language statement that is wholly separate from the underlying control language form. In the child ID section 96, the template provides an area where a user can define module specifications that designate other modules required to further define the designating module.

The relationship between a designating module and a designated module is a parent/child relationship wherein the designating module is the parent and the designated module is the child. For example, a machine module for machine tree 11 would include a module specification designating an indexer module named T1. Similarly, in the present example, the machine module would include two separate module specifications to separately specify a "master control panel" module and an axis module named "air" which further detail the main control panel 58 and the air axis 86, respectively. The "master control panel", "air" and "T1" modules would all be child modules of the parent machine module.

Continuing, the indexer T1 module would include a child module specification designating five separate station modules, one for each of the five stations, S1–S5, as well as a module specification designating an axis module named "transfer" to control the transfer bar T1.

The fourth station module S4 would include a first module specification to a workunit module named "horizontal mill" and a second module specification to specify an axis module named "clamp". The clamp module would detail logic for controlling clamp 44 by either including complete RLL logic or designating other modules that would complete RLL logic for clamp control.

The work unit module named "horizontal mill" would specify axis modules named "spindle", "main slide" and "cross slide" as well as a control panel module to define control panel 57. Similarly, each of the other station and work-unit modules would specify other modules until every control-task in the entire industrial process has been completely defined and reflected in a template-based tree, mirroring machine tree 11.

Figure 7B:
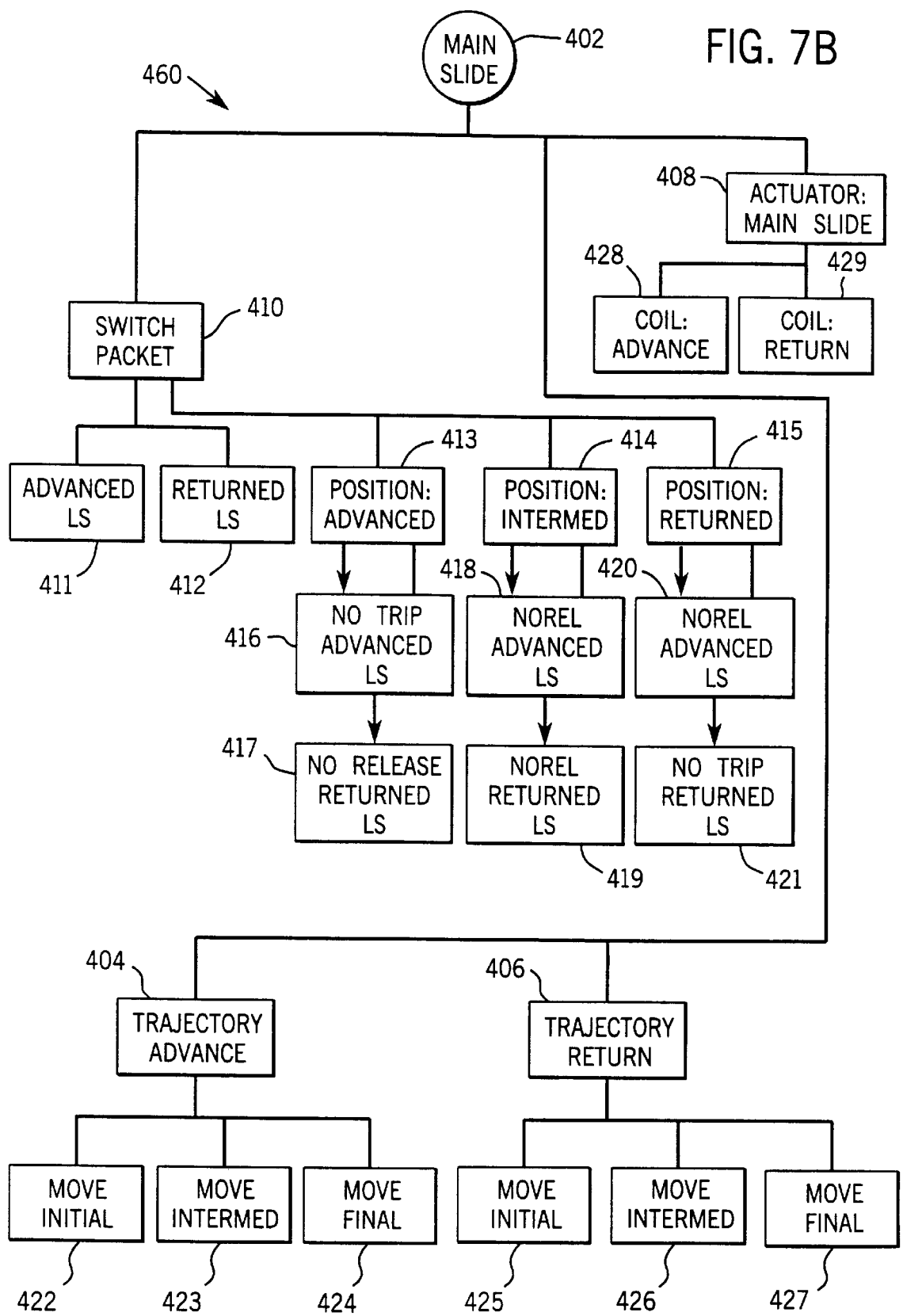

Referring to FIG. 7B, the machine tree 11 expands even further, each axis comprising a number of different control-tasks and corresponding modules. In FIG. 7B, only the main slide axis 402 associated with the horizontal mill 22 is shown. However, it should be understood that tree branches, like branch 400 in FIG. 7B, must be provided for each axis and each control panel. While the control panel branches will include modules based on templates that are different than the templates required to specify an axis, the process of populating modules with required lists to define parent modules is the same. FIG. 7B will be explained in detail below.

Moving down the machine tree, modules associated with lower tree control-tasks generally include an increasingly larger relative section of control logic. At the extreme, the final modules at the distal lower ends of the tree consist entirely of control logic and have no child specification sections.

Surprisingly, only a few dozen templates are required to provide modules that completely describe an industrial process. When compiled, so that RLL logic sections in child modules are plugged into their designating parent modules, a complete RLL logic program can be provided.

The preferred template language includes different kinds of module specifications which can be used to accommodate different circumstances. For example, one type of module specification is a module "list" which allows zero or more component modules of a specific type (i.e. associated with a specific template). Referring again to FIG. 7, an indexer module may include a module list called "station" which includes specifications to five modules, one for each of the five machine stations S1–S5. In this way, a single module specification can reference five station modules. Each station module in the list must be assigned a unique job-specific name to ensure that it can be different from other modules designated in a common list specification. In the example here, the stations and, hence station modules, are referred to as S1–S5.

Yet another kind of module specification is an "optional" module specification which results in either no instances or exactly one instance of the designated type. For example, a preferred indexer template includes an optional module specification for an indexer control panel. While it is not necessary to have an indexer control panel, where a machine line is unusually long, it is often advantageous to include an indexer control panel somewhere along the line to allow local indexer control. The optional module specification gives a programmer the option, based on job-specific requirements (i.e. the length of a machine line), to provide RLL logic for an indexer control panel when one is desired. In the present example, the indexer does not include a control panel and, therefore, no module would be created.

Another module specification kind is a "renameable" module specification which results in a single named component module of a designated type, but will also allow a job-specific name to override the default name.

Another kind of module specification is a "fixed" specification. Here, the template designated by the specification does not result in a child module. When compiled, fixed templates simply expand into the designating modules. Fixed specifications are not named.

Another kind of module specification is a "named" module specification which results in a single, named component module of the type identified in the specification. For example, for safety purposes, all machines require a master control panel. Thus, a preferred machine template includes a named module specification called "master control panel" which identifies a single instance of a master control panel template.

One final kind of module specification is a "choice" specification which makes a selection from a list of mutually exclusive module types based on job-specific information. For example, while a control panel requires some type of interactive device for a user to turn a machine on or off, a user may prefer either a push button or a selector switch. To this end, in a control panel template, a choice specification is provided which includes two fixed module specifications, one for a push button and another for a selector switch. Like a fixed module specification, the template associated with a chosen type is simply expanded when the machine tree is compiled (i.e. no module results from a choice specification).

A second type of language statement wholly separate from the standard RLL rung form includes data definitions. Data definitions are common in programming language and should be well-understood by a person of ordinary skill in the art. Therefore, data definitions will not be explained here in detail. Suffice it to say however, that in template language, data definitions are required to declare and reserve space for all PLC data table types such as inputs, outputs, timers, counters, etc., and allows the association of attributes with each declaration.

B. Extensions to the Underlying Control Language Form (RLL)

While some logic is always the same for a specific machine tree control-task type, other logic is job-specific and distinct to an associated given module and would be extremely difficult to furnish in prewritten RLL or other template sections. For example, one typical prerequisite for turning on a machine 10 to begin an industrial process is that all local control panels (i.e. control panels other than the master control panel) be in remote mode often called "automatic". Remote mode means that a control panel forfeits control over the local machine section to an operator panel located higher up in the machine tree, for instance the master control panel. Local mode (e.g. "manual"), disables the parent operator panel and permits only local control of a section of the machine. Thus, one RLL logic rung called "all child nodes remote" in a main control panel module should include a series of contacts, one contact for each local control panel. Each local control panel module would include a coil corresponding to its contact in the "all child nodes remote" rung. When the local control panel is in remote mode, the local panel module coil would be energized, thus closing the corresponding contact in the "all child nodes remote" rung. Thus, a coil at the end of the "all child nodes remote" rung would indicate when all local panels are in automatic or remote mode allowing the machine 10 to be turned on.

Prior to designing a machine there is no way of knowing how many local control panels will be required. One machine may not require any local control panels while another machine may require ten or more local control panels. The number of local control panels required for a machine is job-specific. This means that prior to designing a machine 10, there is no way to determine the number of contacts required in the "all child nodes remote" rung in a main control panel module. Unfortunately, standard RLL rung forms do not allow for variable numbers of contacts and, therefore, cannot adjust to job-specific requirements. While a programmer could alter the form of an "all child nodes remote" rung while manually programming using templates, when the programmer is using automated editors there is presently no easy way to change rung form to accommodate job-specific parameters.

To overcome this limitation, the template language includes both macro instructions and a symbolic expression language that are extensions to the standard RLL rung form itself.

One macro instruction is an "AND list" instruction which provides a mechanism by which variable numbers of series contacts can be provided in an RLL rung. The number of contacts can be tied to job specific requirements. For example, where four local control panels are required in an "all child nodes remote" rung, the "AND list" macro would provide four contacts, one for each local panel. In the alternative, where ten local panels are provided the "AND list" macro would provide ten contacts, one for each local panel.

The symbolic expression language is used with the macro instructions to designate macro operands. The symbolic expressions include single characters that may be concatenated with template-authored symbolic names (defined using Data Definition statements) to form reusable operand specifiers. These symbolic expressions may be used by placing them above RLL instructions in an RLL rung. A preferred set of symbols consists of three path specifiers and two separators.

Path specifiers indicate where relevant operand definitions can be found. Separators allow concatenation of more path information such as the name of a specific child module, data item, or attribute.

A first path specifier is the symbol "$". Specifier "$" indicates the name of the module that the specifier appears in. For example, if specifier "$" appeared in the master control panel module, the specifier would provide a path to the master control panel module. In addition, the specifier would also provide partial paths to all main control panel child modules.

A second path specifier is symbol "#". Symbol "#" indicates the instance of a particular member of a list. A third path specifier is symbol "^" which may be followed by a template type name. Symbol "^" represents the first ancestor (i.e. parent, grandparent . . . ) module whose type matches the type designated after the symbol.

A first separator is symbol ".". Symbol "." indicates that the text following is the symbolic name of a child module or data definition within the program unit designated by the path specifier preceding the separator. A second separator is symbol "\" indicating that the text following it is the symbolic name of an attribute associated with the entity designated by the path specifier preceding the separator. For the purposes of this explanation, attributes will include module list names.

Figure 35:
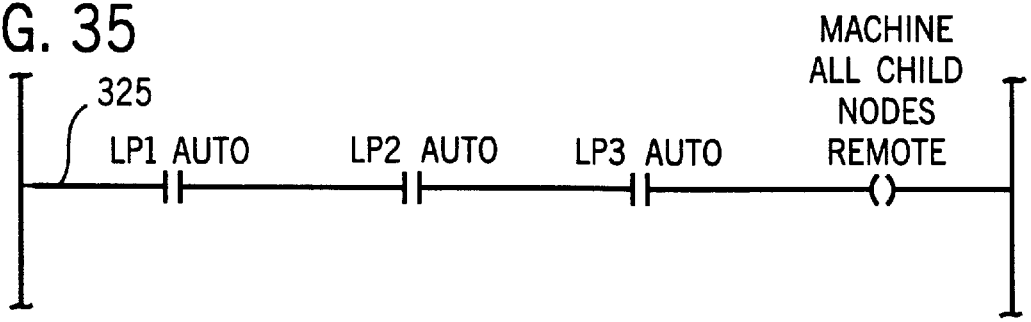
FIG. 35 is a diagram depicting an "all child nodes remote" RLL rung.

Referring to FIG. 35, a standard "all child nodes remote" RLL rung 325 that might appear in master control panel logic is illustrated. The rung 325 includes three contacts MACHINE.LP1.AUTO, MACHINE.LP2.AUTO and MACHINE.LP3.AUTO and a single coil named MACHINE.ALL CHILD NODES REMOTE. Each of the three contacts "MACHINE.LP1.AUTO", "MACHINE.LP2, AUTO", and "MACHINE.LP3.AUTO" corresponds to a separate local control panel (not shown).

Figure 36:
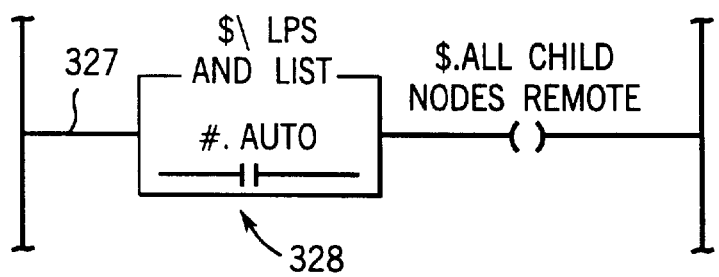
FIG. 36 is a diagram depicting an AND list macro corresponding to the rung in FIG. 35.

Referring also to FIG. 36, the symbolic expression language described above can be combined with an "AND list" macro to provide an RLL rung 327 that can expand into rung 325 having three contacts when compiled. An AND list macro 328 and a single "all child nodes remote" coil make up rung 327. The "AND list" macro 328 includes symbol "$" which specifies a path to the present module. The "\" symbol indicates that the symbolic name "LPS" that follows is an attribute associated with the present module. In this case "LPS" is a module list associated with the main control panel module. Thus, the expression "$\LPS" represents a module list in the main control panel module. The module list provides operands to the "AND list" macro. The "AND list" macro 328 includes the condition "Auto" with the path specifier "#". Specifier "#" indicates that the "Auto" condition should be concatenated with the operands above the "AND list" command.

When compiled by an automated compiler (or by hand), the "AND list" macro 328 expands into series contacts, one contact for each reference in the module list "LPS." For example, assuming the module list "LPS" included a job-specific membership of three instances name "LP1," "LP2" and "LP3," rung 327 would expand into rung 325. Similarly, if the module list "LPS" included a job-specific membership of ten instances, rung 327 would expand into a rung having ten series contacts, each contact named for a different one of the ten instances in the list. Thus, using the symbolic expression language in conjunction with the "AND list" macro, the number of series contacts can vary, depending upon job-specific parameters.

Figure 37:
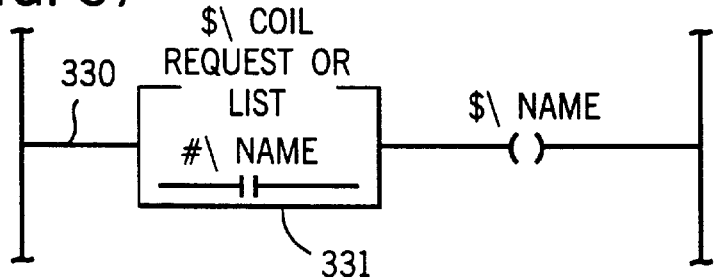
FIG. 37 is a diagram depicting an OR list macro.

A second macro instruction is an "OR list" instruction. The "OR list", like the "AND list", when combined with the symbolic expression language, provides for variable rung forms, depending upon job-specific parameters. However, instead of providing series contacts, the "OR list" macro provides variable numbers of parallel contacts. An exemplary rung 330 including an OR list macro 331 is illustrated in FIG. 37. "$\Coil Requests" specifies a module list named "Coil Requests" having a job-specific membership. Each instance in the "Coil Requests" list is to be concatenated with a coil request name and all instances are to be placed in parallel in rung 330 when the rung 330 is compiled. Therefore, if module list "Coil Requests" includes three job-specific instances, three parallel contacts (one contact named for each instance) will replace the "OR list" macro 331 when compiled. If the module list "Coil Requests" includes ten job-specific instances, the "OR list" macro 331 would be replaced by ten, uniquely named parallel contacts.

The "OR" and "AND list" macros are extremely powerful and add a level of flexibility to programming in the template language that cannot be provided using the standard RLL rung form. Using the macros in conjunction with the symbolic expression language facilitates templates that refer to variable job-specific parameters and to data items defined in other modules by associated templates even before the job specific parameters and data items are defined.

In addition to the macros and symbolic expression language, there is one other type of extension to the standard RLL rung form itself called pseudoinstructions. Pseudoinstructions take three forms: XPC, XPO and OTX which correspond to standard XIC (examine if closed), XIO (examine if open) and OTE (output enable) RLL instructions. XPC and XPO stand for examine predicate closed and examine predicate open, respectively. OTX stands for output expansion.

One of the problems with any RLL programming shortcut based on a modular library of RLL logic components is that logic must be provided to accommodate all possible requirements. Therefore, in many cases logic that is not required in a specific application will be provided to cover general requirements. Moreover, sometimes logic required in general applications is not permitted in specific applications.

For example, typically there is less danger associated with movements in a cycle's second half than with movements in the first half and therefore, a reduced set of conditions may be provided for second half-cycle movements than for first half-cycle movements. Referring again to FIG. 3, the mill cycle 49 includes first and second half-cycles wherein the first half-cycle is represented by arrows 50 and 52 and the second half-cycle is represented by arrows 54 and 56. The first half-cycle includes movements that shift the mill spindle 30 toward or into a workpiece. The second half-cycle includes movements that shift the spindle 30 out of and away from the workpiece.

Prior to any axis movement there is typically a set of conditions that must be met to ensure a safe move. In the present example, on one hand, because the spindle 30 is moved into a workpiece during the first half-cycle (i.e. moves 50, 52) a full set of conditions is required for each movement in the first half-cycle. On the other hand, because the spindle 30 is moved out of and away from a workpiece during the second half-cycle (i.e. movements 54, 56), there is relatively less danger during a second half-cycle than during a first. Therefore, a reduced set of conditions can apply to second half-cycle movements, the reduced set reflecting the reduced possibility of danger.

The preferred template set includes only one template type corresponding to axis movement. Therefore, the axis movement template must include logic for both the full set of conditions used in the case of a first half-cycle movement and the reduced set of conditions used in the case of a second half-cycle movement.

Referring to FIG. 38, a required full set of conditions will show up in an RLL logic rung 334 as a full set 333 of series-connected contacts C1–C5. When all of the conditions are met, all of the contacts C1–C5 are closed and an associated output coil OUT is energized, indicating that an associated axis movement can begin.

The reduced set of conditions corresponding to the second half-cycle shows up in RLL logic as a branch 335 parallel to the full set 333 of contacts, the branch including a reduced set of contacts C6, C7; one contact for each condition in the reduced condition set. Thus, the axis movement template provides RLL logic 333, 335 for movements in both the first and second half-cycles. While both the full and reduced logic sets may be applicable to movement in the second half-cycle, they are not both applicable to movements in the first half-cycle. In other words, if an axis movement module corresponds to a first half-cycle movement, branch 335 including the reduced logic set is not permitted, but branch 335 is required for a second half-cycle movement.

XPC and XPO pseudoinstructions are used to examine compile time constants representing configuration options such as the ones shown in FIG. 38. The effect of the evaluation will be either a short or an open circuit in the generated program, depending on evaluation result. For instance, the result of an XPC on a true condition is a short circuit while the result of an XPO on a true condition is an open circuit. In FIG. 38, an XPC contact 336 identifying a second half-function is provided in series with the logic of branch 335. The XPC contact 336 shorts when rung 334 is associated with a second half-cycle movement and is an open circuit when rung 334 is associated with a first half-cycle movement. Therefore, upon compiling, the XPC contact 336 leaves branch 335 in rung 334 when a corresponding movement is in a second half-cycle and removes branch 335 when a corresponding movement is in the first half-cycle.

A side effect of the compile time evaluation of pseudo-instructions can be further optimization of the generated logic. For instance, an open circuit in series with other input instructions renders the other instructions unnecessary. A branch that is shorted renders parallel branches unnecessary. With the XPO and XPC instructions, unnecessary instructions can be removed from their associated circuits without changing the meaning of the circuit. Upon compilation, optimization can ripple recursively through a program, potentially causing entire rungs, including coils, to be discarded.

Template language allows expression and encapsulation of that, and only that, which is universally true of a particular machine component or operating characteristic. A side effect of this is that the granularity of some of the templates can be very fine. This means that the topology of some of the circuits after expansion can be very inefficient. For example, referring to FIG. 38, the redundant branch 333 including contacts C1–C5 would be produced for second half functions. To rectify this, the OTX pseudoinstruction enables the template author to instruct the compiler to optimize certain circuits. When the compiler encounters an XIC or XIO instruction whose contact is an OTX coil, it will replace the instruction with an in-line expansion of the actual contents of the rung associated with the OTX coil.

For example, referring to FIG. 38-1, a first RLL rung 520 includes contacts A and B and an OTX coil C. A second RLL rung 522 includes contacts C and D and other "stuff" where contact C corresponds to the OTX coil C. When compiled, coils A and B corresponding to OTX coil C are expanded into the coil in branch 522 yielding branch 524 as shown in FIG. 38-2. This provides the template author with a large degree of control over the resulting topology of the generated circuits.

Referring now to FIGS. 9–14, and 23–29 an exemplary set of templates is provided which can be used to better understand template language generally. The preferred template group in FIGS. 9–14 and 23–29 is a subset of a template set specifically designed for the metal-removal industry. A complete template set for metal-removal is provided as Appendix A to this specification.

Figure 9:
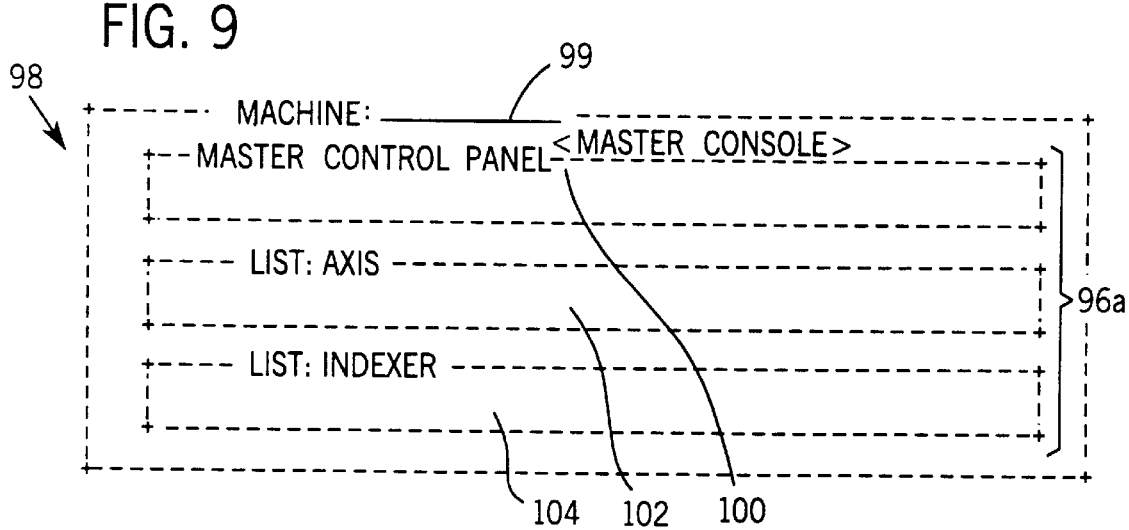
FIGS. 9–14 are diagrams of various template types.

Referring to FIG. 9, a machine template 98 includes the template type designation "machine" and a blank name field 99 that has to be filled in to identify a specific machine module. The machine template 98 itself does not directly include RLL logic and hence, has no RLL logic section. Instead, the machine template has a child module specification section 96a including several module specifications including a named module specification called "master control panel" 100 and both axis- and indexer-list module specifications 102, 104, respectively. Because each machine must include at least one control panel for safety purposes, every machine template (and hence every machine module) must include a master control panel specification 100.

Figure 10:
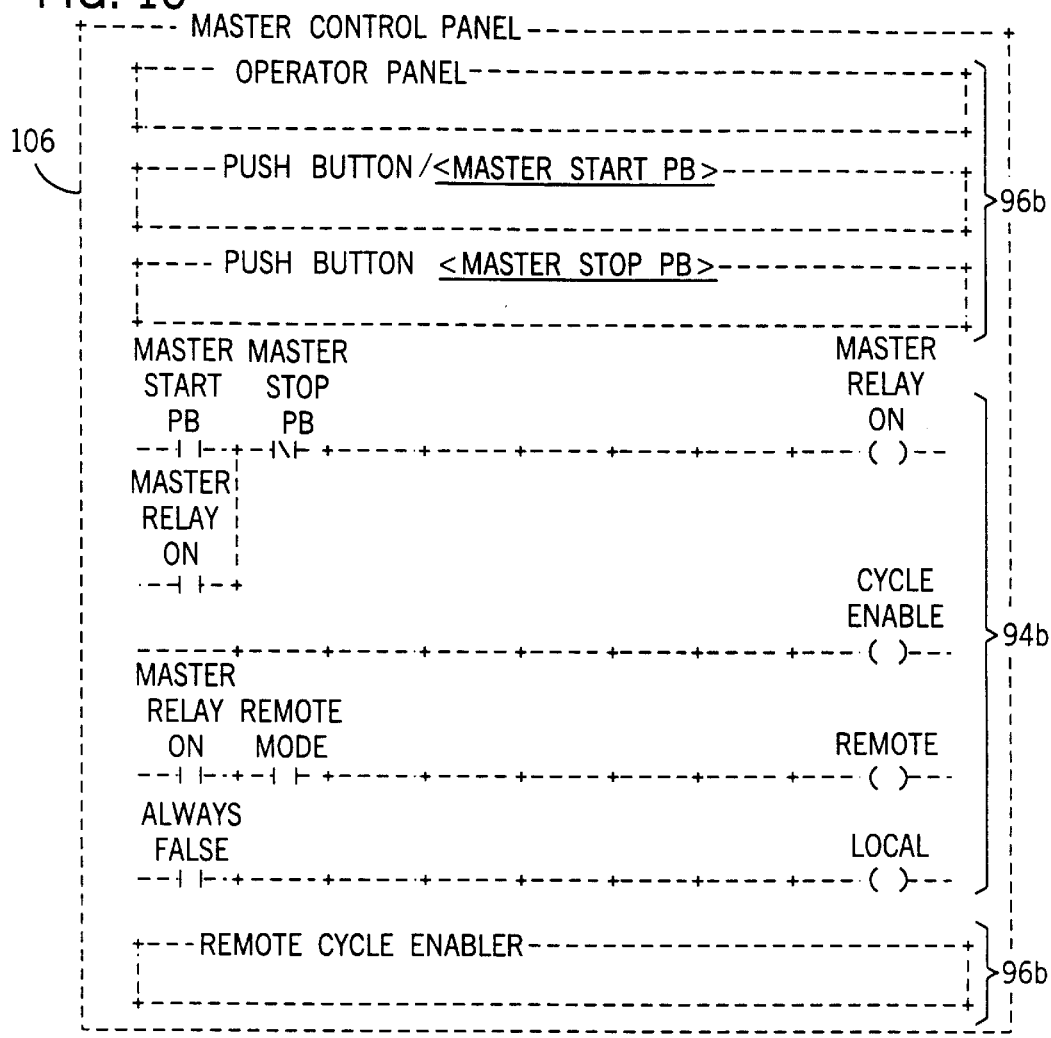

Referring to FIG. 10, a master control panel template 106 includes an RLL logic section 94b required for start and stop push buttons. The logic in section 94b is universally required for all master control panels. In addition, the master control panel template 106 includes a child module specification section 96b that references other modules using module specifications. The modules designated in the child module specification section 96b may be required to completely provide RLL logic to control the master control panel 58. Whether or not modules must be designated in the child ID section 96b depends on job specific requirements. Note that named module specification "remote cycle enabler" and fixed module specification "operator panel" are required attributes of any master control panel module.

Referring again to FIG. 9, the module list named "axis" 102 includes a list of all machine-wide axes. In the present example, the "air" axis is the only machine-wide axis and therefore, the axis-module list specification would include only a single specification called "air".

Figure 11:
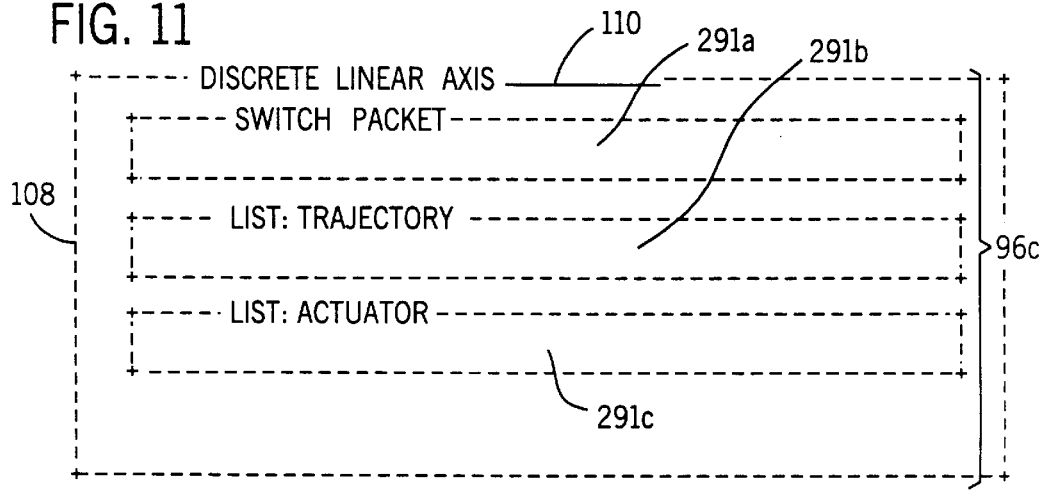

Referring to FIG. 11, an axis template 108 includes an axis template designation, a name field 110, and a child module specification section 96c having three separate module specifications for switch packet, trajectory and actuator, all of which have to be detailed to completely define an axis.

Referring again to FIG. 9, the indexer module list specification 104 includes a list of indexer modules, one for each machine indexer. In the present example, there is only a single indexer T1 and, therefore, only one indexer entry, identifying indexer module T1, would appear in the indexer list specification.

Figure 12:
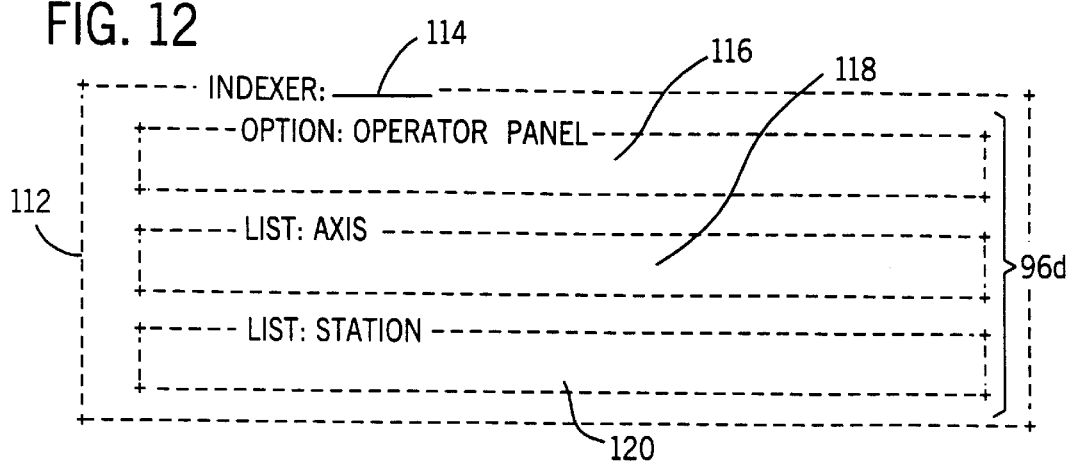

Referring to FIG. 12, an indexer module includes an indexer template designation, name field 114, and a child module specification section 96d. The module ID section 96d includes an optional module specification 116 for a control panel and two module list specifications, one for axis 118 and another for station 120. In the present example, because there is no indexer control panel, the optional control panel would not be designated. Because we have one indexer axis (i.e. "transfer"), there would be one specification in the axis module list specification 118 named "transfer". In addition, because there are five stations, there would be five specifications in the station module list specification 120. Each station designated in module list 120 would identify a different station module corresponding to a different one of the five stations S1–S5.

Figure 13:
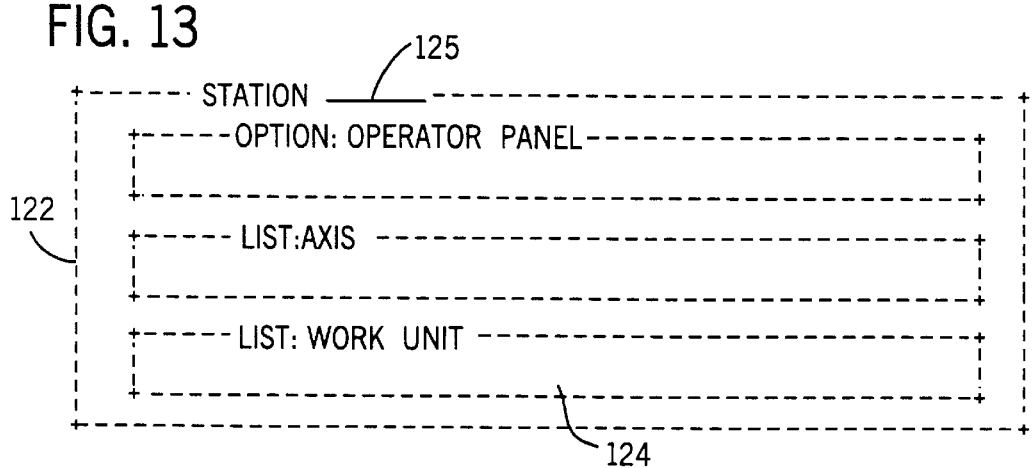

Referring now to FIG. 13, the station template 122 is nearly identical to the indexer template 112 of FIG. 12, except that, instead of having a station module list specification, the station template 122 includes a work-unit module list specification 124. In the present example, there would be five separate station modules like the one in FIG. 13, each module identified by a different name in the name field 125 and corresponding to a like-named station in the station module list 120 of the indexer module named "T1".

Figure 14:
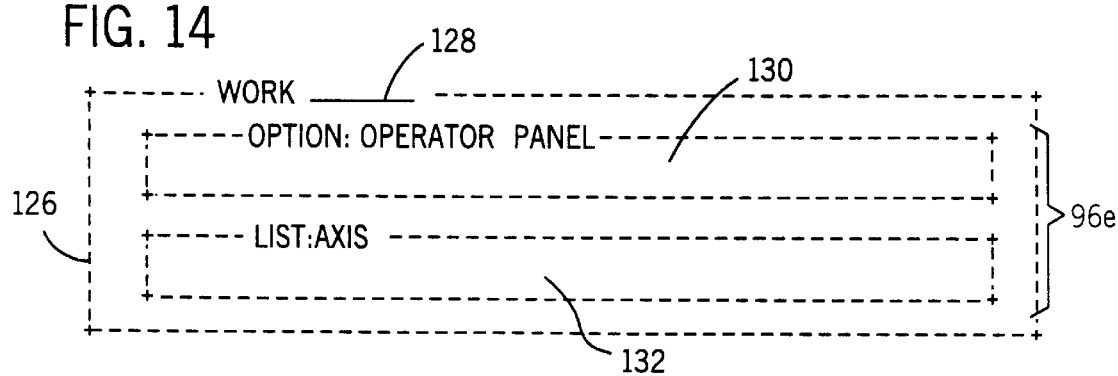

Referring now to FIG. 14, a work-unit template 126 includes a work-unit designation, a name field 128, and a child module specification section 96e having only two module specifications, an optional operator panel module specification 130, and an axis module list specification 132 identifying all axes associated with a work-unit. In the present example, because the horizontal mill 22 includes three axes (spindle, main slide, and cross slide), three separate specifications would be included in the axis module list specification 132 identifying three separate and distinctly named axis templates like the one in FIG. 11. In addition, because the horizontal mill 22 includes a local control panel 57, the optional operator panel module specification would be designated.

The templates in FIGS. 23–29, represent all of the templates required to completely specify an axis. To specify an axis, it is necessary to define all positions associated with an axis and switches that indicate positions. The switches act as controller inputs for the axis. In addition, it is necessary to define possible axis-movement requests, herein referred to as trajectories. Moreover, it is also necessary to define actuators used to effect trajectories and how a controller will communicate with the actuators (i.e. coils and coil requests). Coils and coil requests act as controller outputs to the actuators.

Referring also to FIG. 7B, a template-based tree branch 400 for one axis, the main slide axis of the horizontal mill, is illustrated showing the hierarchical relationship between modules required to define the main slide axis.

Referring also to FIG. 11, to accommodate all the information required to specify an axis, the axis template 108 includes a child ID section 96c having a named "switch package" module specification 291a and sections 291b and 291c for trajectory and actuator module list specifications, respectively. Referring also to FIG. 2, there are only two main slide requests, "advance" and "return". Therefore, in module list specification 291b, the trajectory list would only include two specifications, one for "advance" and one for "return". In FIG. 7B, the "advance" and "return" trajectories are shown as child modules 404 and 406.

Referring still to FIGS. 2 and 11, the main slide subassembly 26 includes only a single motor 32, which is the main slide actuator. Therefore, only one actuator "motor" will be designated in the actuator module list specification 291c. In FIG. 7B, the main slide actuator is shown as child module 408.

Figure 23:
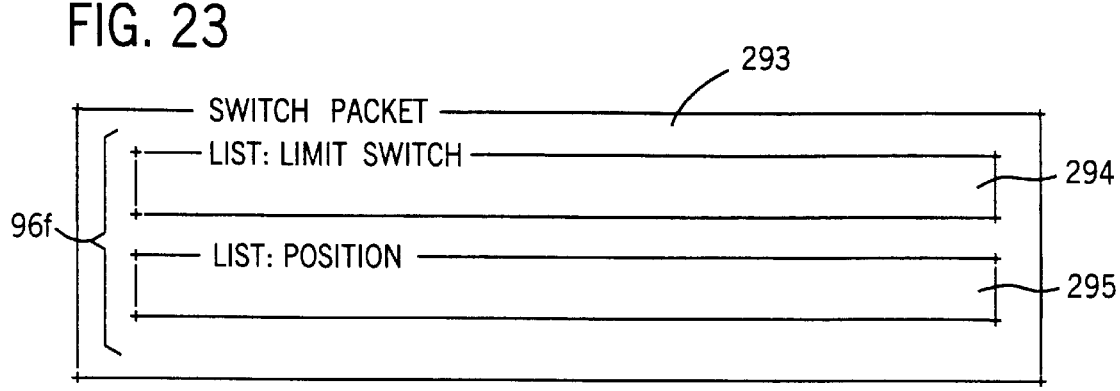
FIGS. 23–29 are diagrams of various template types.

Switch package module 410 is also a child module of main slide axis module 402. Referring also to FIG. 23, the switch package template 293 includes child ID section 96f having two module list specifications 294 and 295. A "limit switch" module list specification 294 is used to specify axis switches. The main slide axis includes advanced switch 39 and returned switch 38. Thus, switch module list specification 294 would specify two switches shown in branch 400 as switch package child modules named "advanced LS" 411 and "returned LS" 412.

The two switches 38, 39 define three main slide positions named "advanced," "intermediate" and "returned." Therefore, position module list specification 295 would specify three positions shown in branch 400 as switch package child modules named "advanced" 413, "intermediate" 414, and "returned" 415.

Figure 24:
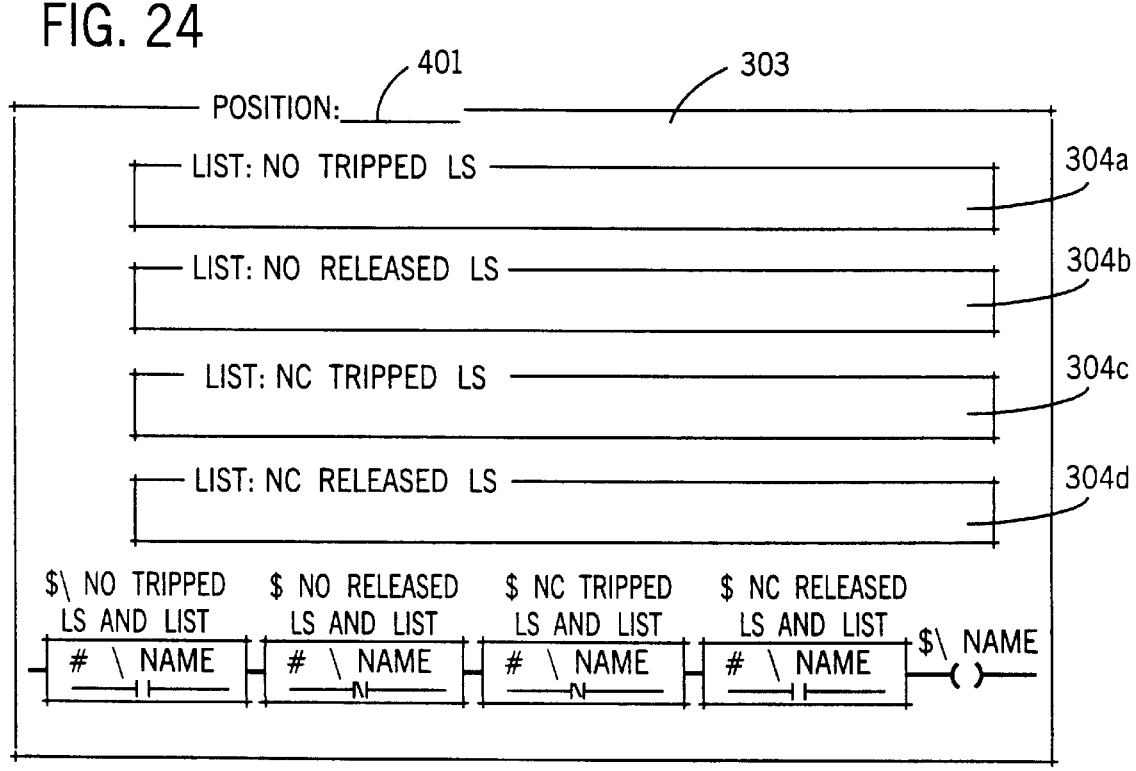

Referring to FIGS. 23 and 24, a position template 303 is used to provide a position module for each position designated in position list section 295. Each position template 302 includes a name field 401 for identifying the specific position modules (i.e. in the present case "advanced", "intermediate" and "returned"). In addition, each position template 303 includes four separate module list specifications 304a, 304b, 304c and 304d corresponding to two possible types of limit switches and two possible states of each type of switch (i.e., normally open (NO) tripped, NO released, normally closed (NC) tripped, and NC released).

Each of the lists 304a, 304b, 304c and 304d is populated with switches from switch module list specification 294 that are in a corresponding state (i.e., tripped or released). For example, referring again to FIG. 2, when the main slide subassembly 26 is in the advanced position, the advanced switch 39 is tripped and the returned switch 38 is released. Assuming both switches are wired normally open (NO), the advanced switch 39 would be listed in the NO tripped LS module list specification 304a while the returned switch 38 would be listed in the NO released LS module list specification 304b (in this case no switches would be listed in module list specifications 304c and 304d). Referring again to FIG. 7B, the NO tripped advanced switch and NO released returned switch are shown as child modules 416 and 417 for the position module 413 named "advanced."

Similarly, position templates for the "intermediate" and "returned" positions would be populated with appropriate switches. In FIG. 7B intermediate position module 414 has two child modules, "NO released advanced LS" 418 and "NO released returned LS" 419 while returned position module 415 has child modules "NO released advanced LS" 420 and "NO tripped returned LS" 421.

Figure 25:
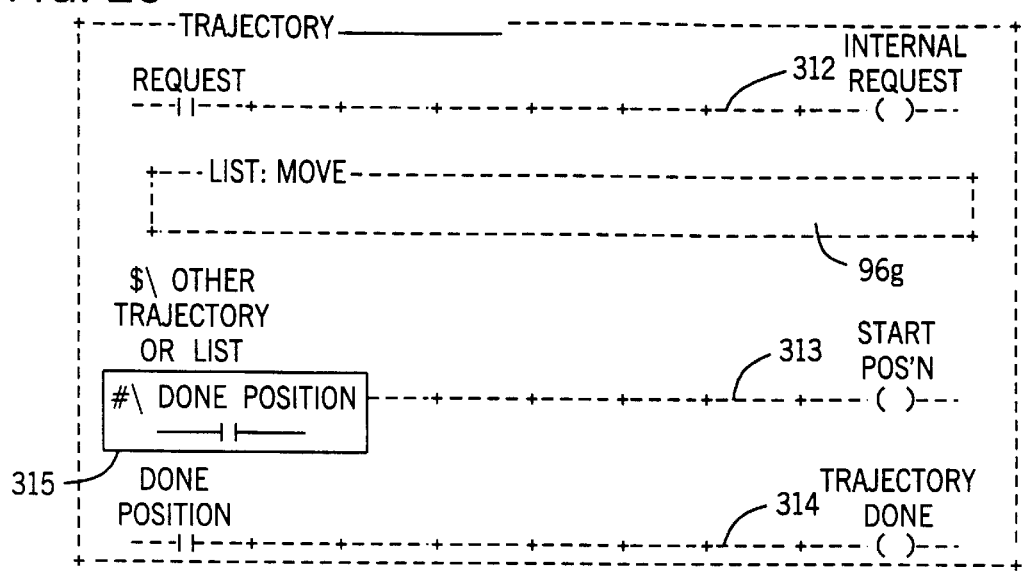

Referring to FIGS. 11 and 25, a trajectory template 309 would have to be designated and populated for each axis trajectory (i.e., each movement request). For the horizontal mill main slide, there are two trajectories, "advance" and "return". Therefore, there would be two trajectory modules, one named "advance" and a second named "return" which are shown as child modules 404 and 406, respectively, in FIG. 7B.

Each trajectory can be divided into various moves. A simple single speed linear trajectory includes three moves. An "initial" move begins trajectory motion followed by an "intermediate" move between two positions, the trajectory ending with a "final" move that stops the motion. Thus, referring still to FIG. 25, the trajectory template 309 includes a child module specification section 96g for a move module list specification. Referring also to FIG. 7B, the "advance" trajectory module 404 includes "initial" 422, "intermediate" 423 and "final" 424 move child modules. The "return" trajectory 406 includes similar child modules 425, 426, 427.

Figure 26:
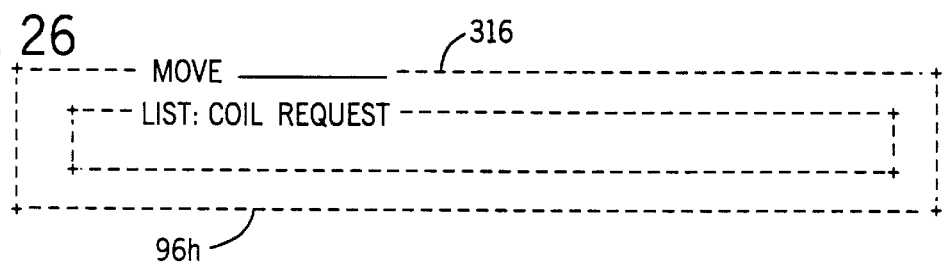
Figure 27:
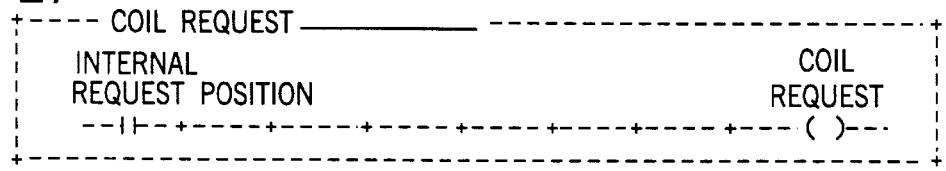

Referring to FIG. 26, a move module based on move template 316 must be provided for each move in child module specification section 96g. Each move template 316 includes a child module specification section 96h for a coil request module list specification. A coil request is a request to a specific coil to actuate an actuator (e.g. motor) when a specific position associated with a move has been reached. For example, on a two speed motor, one coil may drive the motor at one speed to facilitate one move. A second sequential move, however, may require excitement of two coils to activate two motors to achieve a greater speed once an intermediate position has been reached. Thus, a single move may require two or more different coil requests. A coil request module based on the coil request template shown in FIG. 27 must be provided for each coil request designated in the child module specification section 96h of a move module.

Figure 28:
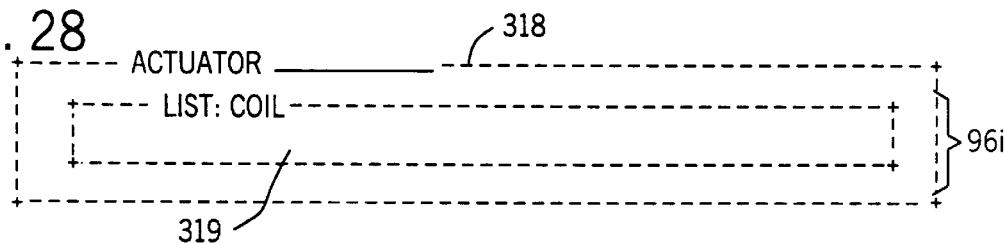
Figure 29:
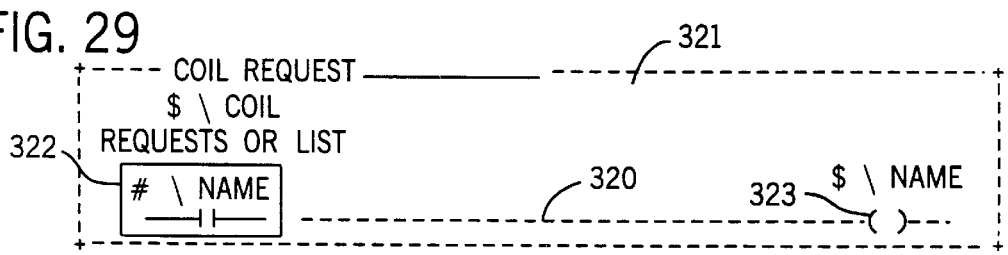

Referring to FIGS. 11 and 28, for each actuator designated in actuator module list specification 291c, an actuator module based on actuator template 318 must be provided. Each actuator module must be named to distinguish specific modules. The actuator template 318 includes a child module specification section 96i for designating a coil module list specification 319. A coil is an output to drive a motor or the like. Referring also to FIG. 7B, for the horizontal mill main slide there are only two coils, a "work" coil and a "home" coil shown as child modules 428 and 429. Referring to FIG. 29, a coil module based on coil template 321 must be provided for each coil module designated in a specification 319.

Once all the trajectories, actuator, limit switches, positions, moves, coil requests, and coils have been identified and associated module list specifications have been populated and required modules have been provided, the tree branch and corresponding RLL logic required to completely control the axis has been designated. Modules based on all of the templates illustrated in FIGS. 23–29 are required to define each axis.

C. Function Contingencies

Using a complete template set it should be fairly easy for one skilled in the art to construct a complete template-based machine tree using the template set. However, at least one template-based programming aspect is not entirely intuitive based upon a perusal of the complete template set. This complex template programming aspect is how the function template 436 in FIGS. 39A and 39B which controls function performance is to be used.

Function performance must be limited by the instantaneous characteristics of other functions in the same cycle. These instantaneous characteristics can be gleaned from a bar chart.

For the purposes of referring to various functions in this explanation, where one function is observed from the perspective of another function, the function observed will be referred to as an observed function and the other function will be referred to as the observing function.

Referring again to FIG. 6, there are four separate functions represented by bars B1–B4 in bar chart 92. Four separate relationships exist between any two of the four functions, (or, more precisely, between the action of the observing function and the done condition of the observed function). A first relationship is a "stable/unstable" relationship. Stable simply means that an observed function does not start or stop during an observing function. In FIG. 6, function B4 is stable from the perspective of function B1. However, function B4 is unstable from the perspective of function B3.

A second relationship is a "cancel by other/cancel by me" relationship. Where an observed function is unstable from the perspective of an observing function, the state of the observed function is changed either by the observing function or by some other condition. When the observing function changes the observed function state, the observed function is said to be canceled by the observing function. From the perspective of the observing function, the second function is categorized as "canceled by me". When some condition other than the observing function changes the observed function state, from the observing function perspective, the observed function is "canceled by other".

Referring still to FIG. 6, the state of function B4 changes during function B3. From the perspective of function B3, function B4 is "canceled by me" because the beginning of function B4 is conditioned upon the state of function B3. No "canceled by other" relationships are illustrated in FIG. 6.

A third relationship is a "my half-cycle/other half" relationship. "My half-cycle" means that an observed function starts before an observing function in the observing function's half of a cycle. "Other half" means that the observed function is either in the opposite half-cycle as the observing function or, if both observing and observed functions are in the same half-cycle, the observed function starts after the observing function. For example, referring still to FIG. 6, from the perspective of function B2, function B1 is "my half-cycle" while functions B3 and B4 are both "other half". However, from the perspective of function B1, all other functions B2, B3 and B4 are "other half".

The fourth relationship is a "position/latch" relationship. This relationship deals with the nature of the observed function itself. A function can have one of three different natures, position, latch or a combination of both. Functions of the position nature will end when a specific axis position is reached. For example, referring again to FIGS. 2 and 6, when the main slide advanced position is reached and switch 39 is tripped, function B1 is completed. Therefore, from the perspective of functions B2–B4, function B1 has a "position" nature.

Functions of the latch nature end when a latch is set or reset. For example, although not shown on FIG. 6, an additional function could be included between the main B1 and cross B2 slide functions that references a first half-cycle of another cycle. Referring also to FIG. 2, one logical first half-cycle might be a first half spindle cycle to turn on spindle 30. In this case, the spindle cycle would also include a second half-cycle for turning off the spindle 30, the first and second half-cycles being separated by a latch at the end of the first half-cycle. From the perspective of functions B1–B4, the spindle first half-cycle would end with a latch and therefore, the spindle first half-cycle function would have a "latch" nature. For the purposes of the function templates, a latch-type function must relate to the latch of a different cycle (i.e. the first half-cycles of a different cycle).

Figure 40:
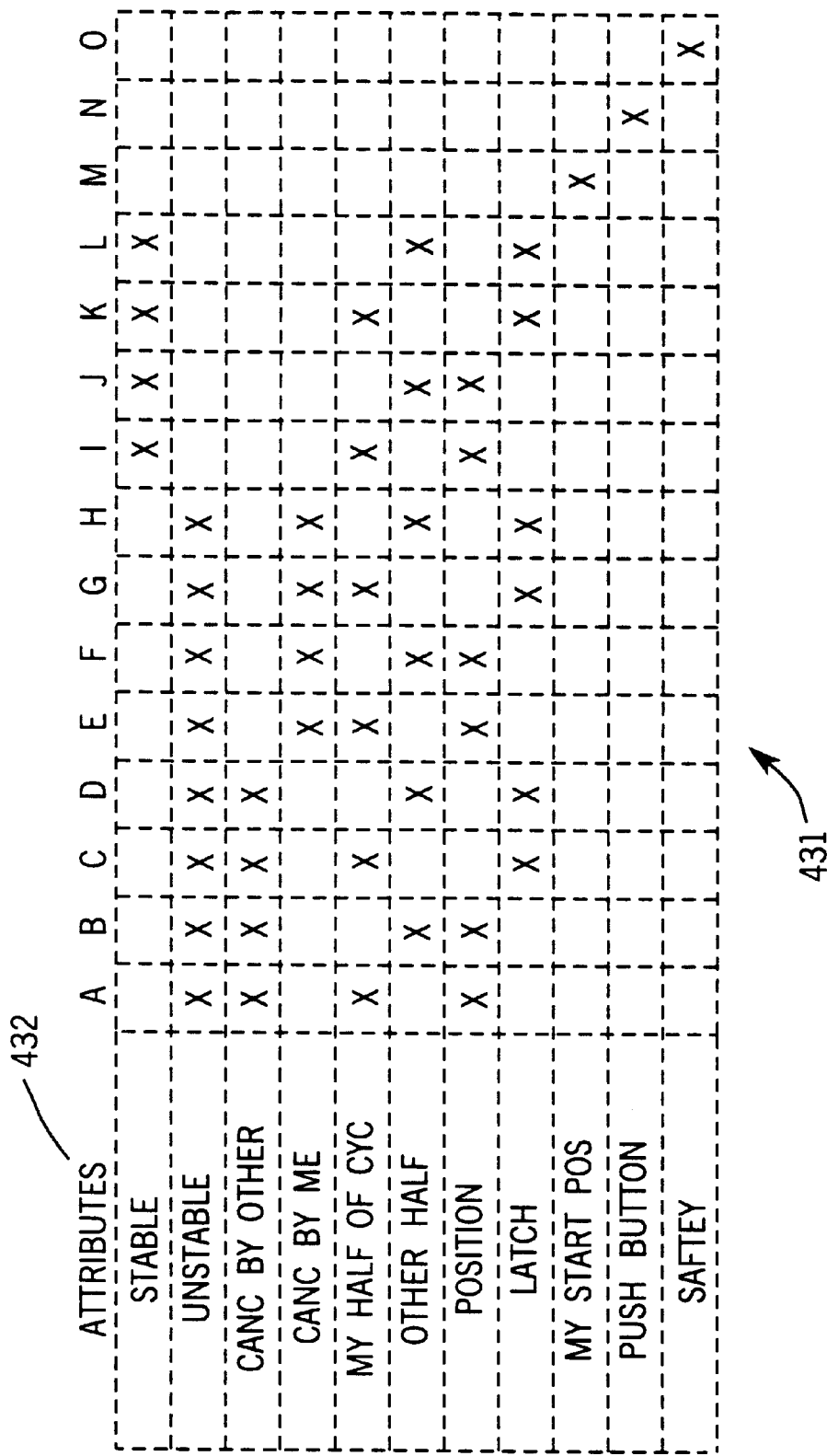
FIG. 40 is an attributes table used to identify control logic required for a function.

Referring now to FIG. 40, an attributes table 431 is illustrated that includes an attributes column 432, twelve "bucket" columns A–L, and a list of the possible function attributes described above. A user can employ this table 431 to categorize, from the perspective of an observing function, all other observed functions in a cycle into one of the twelve buckets A–L. For example, referring to FIG. 6, when function B1 is the observing function, observed function B2 is a stable, other half, position function which places function B2 in bucket J. Similarly, with function B1 observing, observed functions B3 and B4 would be placed in bucket J.

With function B2 observing, observed function B1 is a stable, my half of cycle, position function which places function B1 in bucket I. With function B2 observing, both observed functions B3 and B4 go in bucket J.

With function B3 observing, observed functions B1 and B2 are stable, other half, position functions placed in bucket J while observed function B4 is an unstable, canceled by me, other half, position function placed in bucket F. With function B4 observing, functions B1 and B2 go in bucket J while function B3 is a stable, my half-cycle, position function in bucket I. Note that with function B4 observing, function B3 is considered "stable" because the cutter clear position CCP, once achieved, is not reversed until after function B4 has been completed.

Referring still to FIG. 6, for every function B1–B4, there is an inverse function in an opposite half-cycle that is stable and is a position. For example, function B3 is the inverse of function B1 while function B2 is the inverse of function B4. Thus, all cycle functions can be divided into two groups, a first group being the inverse of the other. Gathering information about both function groups requires duplicative effort. Therefore, when defining a function by its relationships with other cycle functions, only a function corresponding to the first group, or, in the alternative, the second group, is required. For example, referring to FIGS. 6 and 41, when bucketing functions with function B1 observing, a user would work backwards through the cycle 92 bucketing functions until a duplicative function is encountered. Working back, as explained above, observed function B4 would be placed in bucket J. Observed function B3, however, is the inverse of function B1 and therefore represents duplicative information. Here, because function B3 is the inverse of function B1, B3 could not possibly be performed during B1 and therefore, B3 need not be bucketed. As for function B2 information, that information is reflected in the bucketing of function B4 and is not needed.

Thus, for each function in cycle 92, only one other function would be bucketed (i.e. B4 bucketed for B1, B3 for B4, B2 for B1, and B1 for B2). Obviously, the present example is extremely simple. However, one of ordinary skill in the art should easily be able to apply these teachings to bucket functions for complex cycles.

In addition to instantaneous characteristics of other functions in the same cycle, commencement and continuance of a function is also contingent upon three other conditions. A first condition is that a function will not start in an automatic sequencing mode of operation unless it is in its start position. For example, referring to FIGS. 2 and 6, the main slide advance function B1 may not start until the main slide subassembly 26 is returned to its start position 38.

A second contingency is that a function will not start in a manual discrete stepping mode of operation until all required control buttons have been triggered by a user. A third contingency is that a function will not start in any operating mode unless prescribed safety requirements are met.

Referring again to FIG. 40, the attributes column 432 includes attributes "my start position", "push button", and "safety" corresponding to each of the three contingencies identified above. Three additional bucket columns M–O are provided, each column corresponding to a different one of the three conditions. Each instance of a condition is bucketed into an appropriate column, M–O.

Figure 39A:
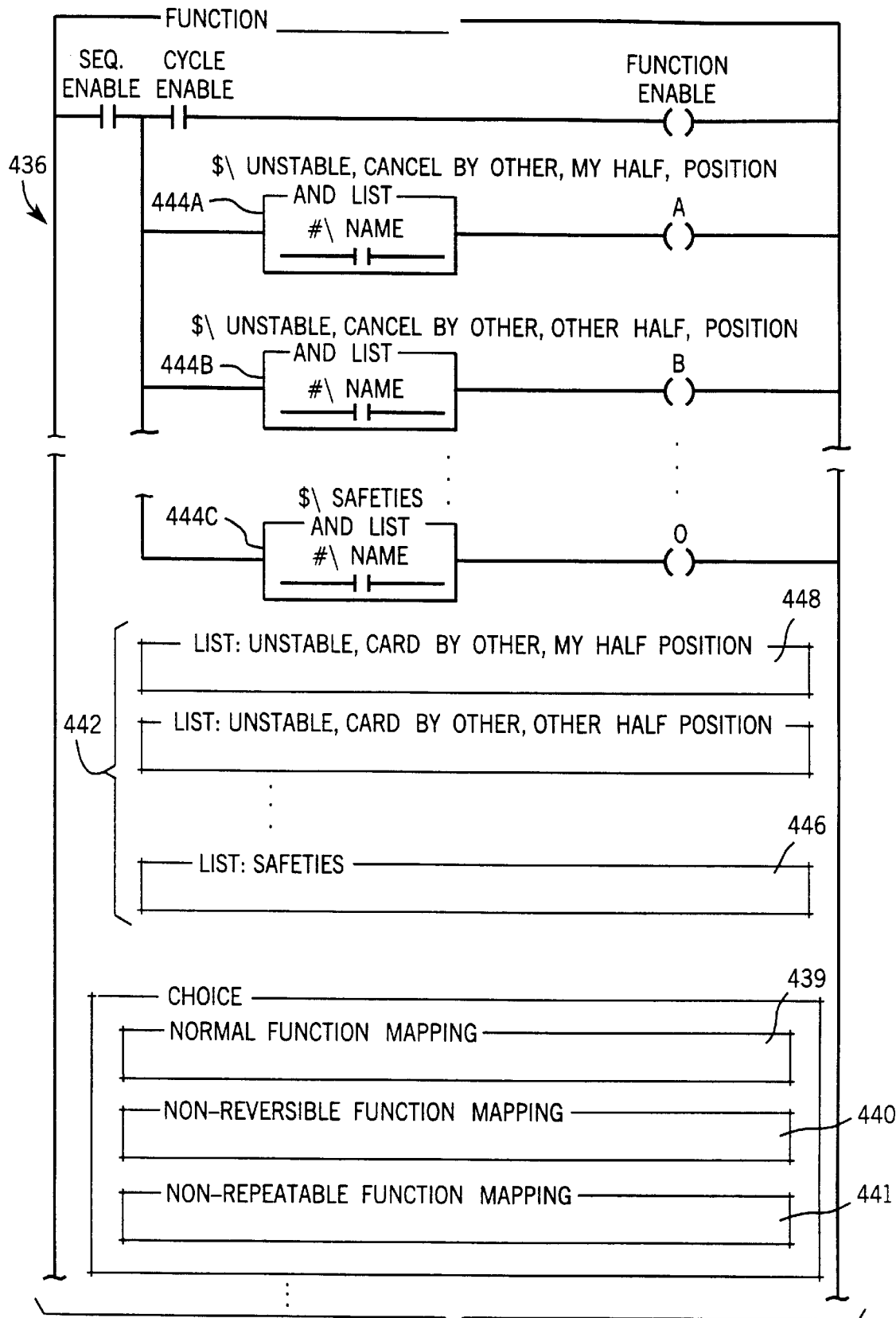
FIG. 39A and 39B illustrates preferred function template form.

Referring to FIGS. 39A and 40, after all functions and contingencies that must be bucketed have been bucketed according to attributes table 431, they can be used to populate lists in a module list specification section 442. The list specification section 442 includes one module list specification for each bucket A–O in table 431. Each module list should be populated with functions or other contingencies corresponding to the list name.

Referring to FIG. 39A, the function template 436 also includes a plurality of "AND list" macros 444A–444O, one macro corresponding to each module list specification in section 442. When expanded, each "AND list" macro 444A–444O expands into a series-connected set of contacts, one contact for each member in an associated module list specification. The coils in series with the macro are excited only when each contact in the series is true. Thus, coil "A" will not be excited unless all functions bucketed and placed in the "unstable, canceled by other, my half, position" module list specification 448 are true. Similarly, coil "O" will not be excited unless all safeties in safety module list specification 446 are true.

In addition to the instantaneous characteristics of other functions in the same cycle and the other contingencies identified above, function performance may also depend on the physical characteristics of an axis. Physical characteristics of an axis or an industrial process can put additional constraints on the manner in which a function can safely be performed. Functions can be divided into three types based on the kinds of constraints placed on them.

A first function type is a normal function. Normal functions can be performed either in forward or reverse directions without damaging a workpiece or an associated machine's components. Performing a function in reverse means making the axis move in the opposite direction of the trajectory related to the function. This may produce the same effect as, but in terms of function logic is not the same as, performing the functions inverse function.

A second function type is a non-reversible function meaning that, after the function has been performed in whole or in part, in the forward direction, it cannot be reversed and performed in the other direction. An example of a non-reversible function is a transfer bar forward movement function which cannot be reversed once it has started forward as it might cause damage to workpieces or a fixture's axis components.

The third function type is a non-repeatable function. A non-repeatable function cannot be started forward a second time once it has been performed to completion. For example, where an axis device places a pin in a hole while performing a function, after the function is performed, the function cannot again be performed because the hole is already blocked by the first pin. Hence, the function is non-repeatable.

To accommodate the three separate function types (i.e. normal, non-reversible and non-repeating), template 436 includes a choice module specification 438 having "normal function mapping" 439, "non-reversible function mapping" 440 and "non-repeatable function mapping" 441 specifications. Depending upon function types, a user would choose one of said specifications 439–441 and provide an associated mapping module.

The only other function characteristic that must be determined to completely define the function template 436 is to specify in which half-cycle a function occurs, first or second. Cycle half specification is required for contact 450 in FIG. 39B.

Figure 41:
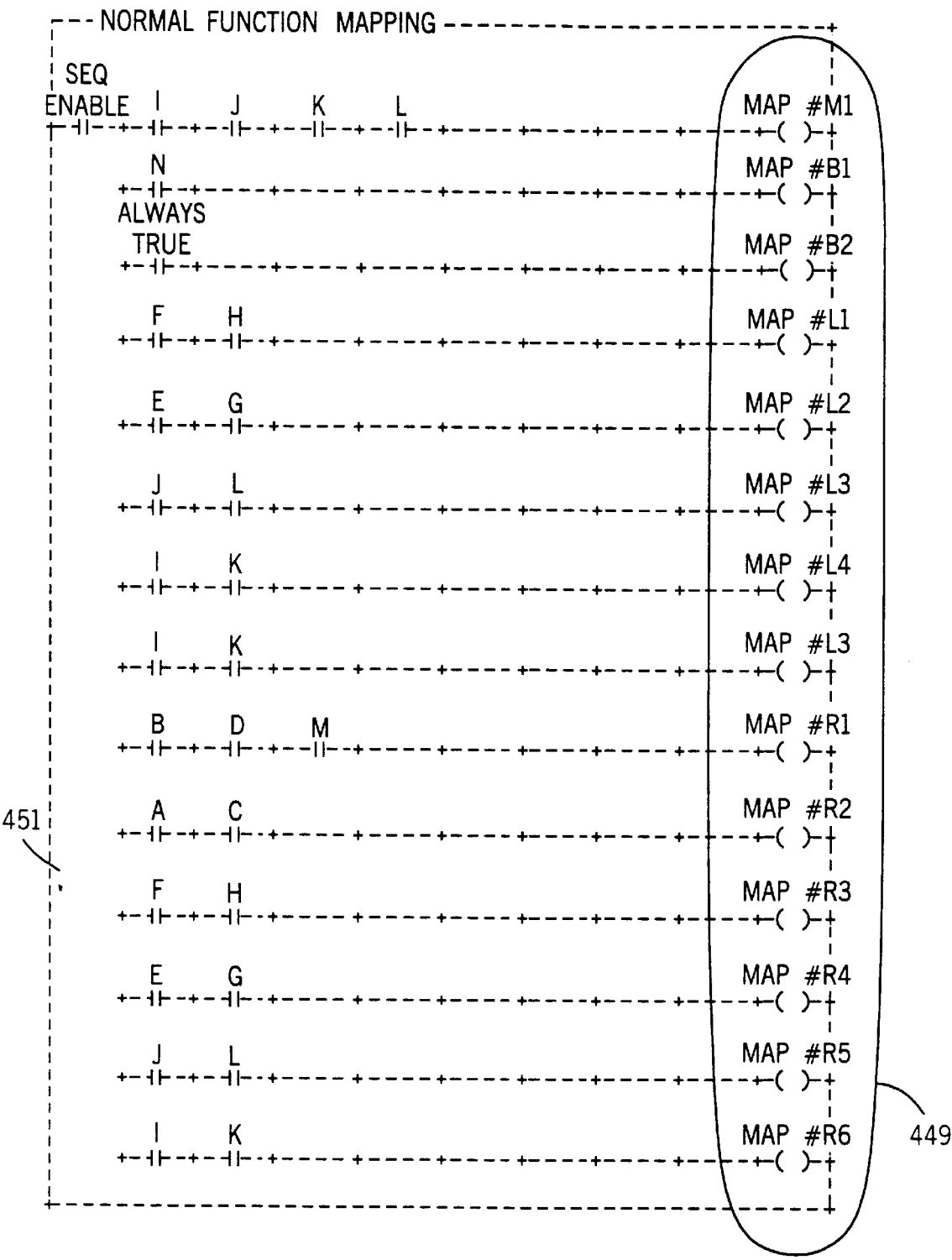
FIG. 41 is a normal function mapping template.

After all of the module specifications have been designated for the function template 39A, 39B, the user is done programming control of the specific function. Referring to FIGS. 39A and 41 when normal function mapping is chosen in template 436, the bucketed functions and conditions from table 431 are mapped into mapping coils 449 according to a normal function mapping template 451. Similarly, where the non-reversible or non-repeating mapping choices are made in template 436, other mapping templates are used to map bucketed functions and conditions slightly differently. Thus, using a template set, function performance can be made contingent upon axis physical characteristics, instantaneous characteristics of functions sharing a cycle, the state of a cycle itself, the state of any control means associated with the function, and whether or not job-specific safeties associated with a function have been met.

D. Editors

In addition to providing truly reusable subsets of control logic, a template set makes automated programming possible wherein programming editors mirror the diagramming conventions which are already widely used in industrial control programming.

Figure 15:
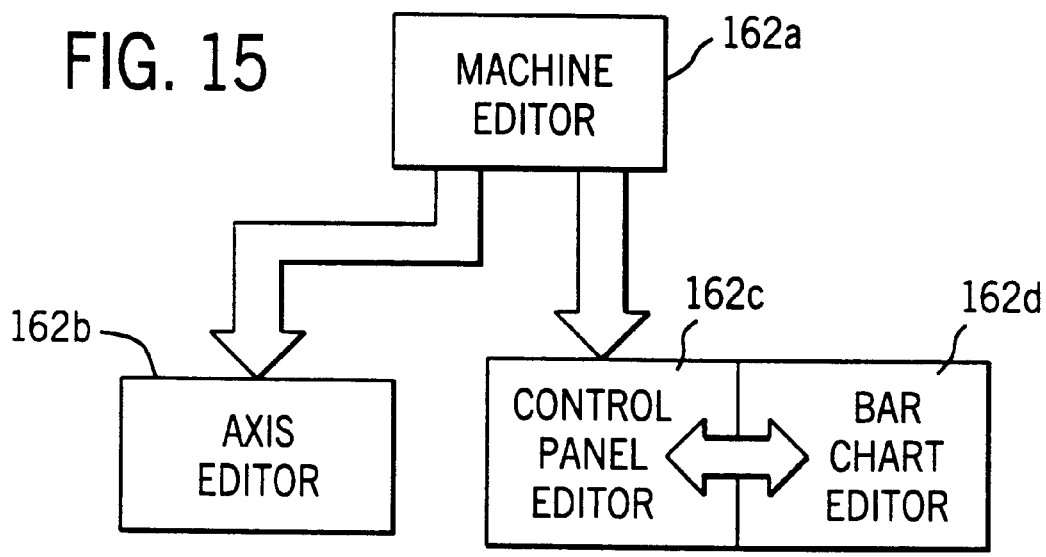
FIG. 15 is a block diagram showing the relationships between template-based editors.

The editors allow a user to construct images that are similar to conventional diagrams and documentation. During image construction, the editors use information from the images to create modules and populate specifications in existing modules. After a user has used the editors to describe all aspects of a machine, all required modules have been populated and a complete template-based machine tree is formed in editor memory. Then, a computer is used to compile the machine tree and provide required RLL control logic. Referring to FIG. 15, the four editors are referred to herein as a machine editor 162a, an axis editor 162b, a control panel editor 162c, and a bar chart editor 162d.

In addition to imitating traditional diagrams, each of the editors has been designed to incorporate conventional computer interface features that most programmers should already be comfortable using. Conventional features include an interactive computer terminal 74 that presents programming options in pull down menu form and allows option selection using a mouse 81 or other similar selection means.

1. Machine Editor

The machine editor 162a allows a user to build a floor plan image directly on a computer monitor 90. During image construction, the machine editor 162a constructs a template-based machine tree reflecting the floor plan image. In addition, while a user is constructing a template-based tree, the editor 162a is simultaneously gleaning information from the tree and either creating new template-based modules or populating existing modules so as to provide a template-based tree specification.

The machine editor 162a only facilitates construction of the floor plan and the portion of a machine tree corresponding thereto. The machine editor 162a itself cannot specify specific aspects of an axis, an operator panel, or a sequence of events. Specification of these more detailed aspects of a machine are reserved for the axis 162b, control panel 162c, and bar chart 162d editors, respectively. As depicted in FIG.

15, the machine editor 162a accesses the other special editors when specific detail is required.

Figure 16:
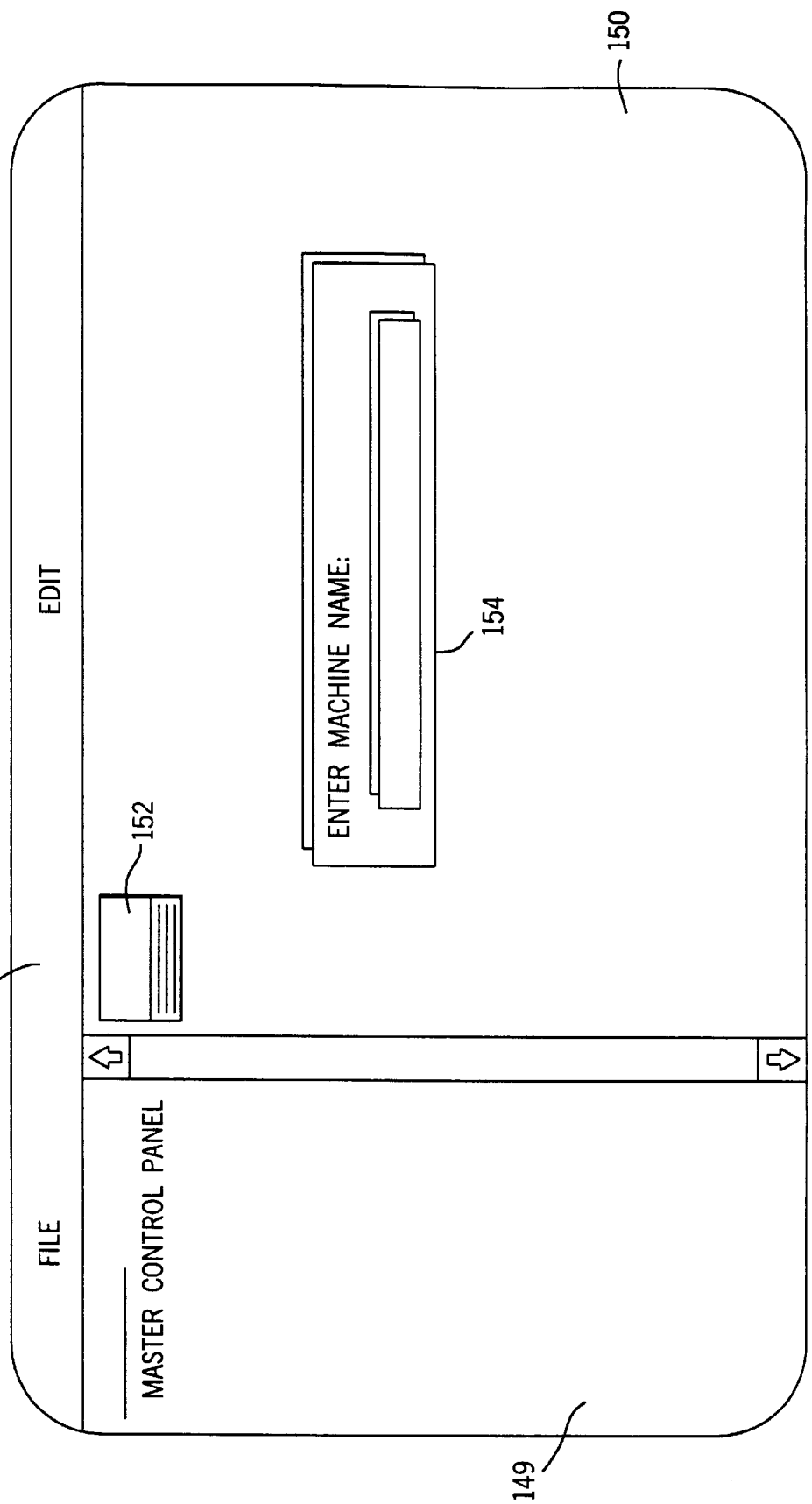
FIG. 16 shows a screen display at start-up of a programming session using a preferred machine editor.

Referring now to FIG. 16, an initial machine editor image 142 that is displayed on the monitor 80 at the beginning of a programming session includes a menu bar 144 at the top of the image 142 and a split screen having a tree section 149 and a floor plan section 150. The tree section 149 provides an area wherein the editor 162a visually displays a template machine tree as a corresponding floor plan is constructed. The floor plan section 150 is where the floor plan itself is constructed.

The menu bar 144 includes two choices, FILE and EDIT. The FILE choice allows a user to store, retrieve, and delete files from memory. The FILE choice operates in a manner that should be familiar to an artisan of ordinary skill in the art and therefore will not be explained here in detail. The EDIT choice allows a user to simultaneously construct and edit both a floor plan in the floor plan section 150 and a template-based tree in the tree section 149.

Initially, a single icon 152 corresponding to a main control panel appears in the upper left-hand corner of the floor plan section 150 and both a machine module reference and a master control panel reference appear in the upper left-hand corner of the tree section 149. The master control panel reference is below the machine module reference and indented to show a hierarchical parent-child relationship. These initial entries are provided to a user because they are always required as designated in the templates. Every template-based tree must begin with a machine module and every machine must have a master control panel for safety purposes. The machine module reference corresponds to the entire floor plan as constructed in the floor plan section 150. The master control panel module corresponds to the control panel icon 152.

Furthermore, to uniquely identify the machine, the editor 162a initially provides a floating name box 154 prompting the user to enter a machine name. The machine name is used by the editor 162a to identify the correct machine module for a given industrial process. In the example above, the process is named "AB1" and therefore, the machine module name is AB1 and AB1 is eventually placed at the top of the tree representation in tree section 149 (see FIG. 17).

After entering the machine name, a user can start building a floor plan by selecting the EDIT choice from menu bar 144. When EDIT is selected, the editor 162a provides a menu of possible programming options for further detailing whatever item in the floor plan section 150 is selected. At the beginning of a programming session, there are only two possible items that can be selected, the machine itself or the master control panel. To select the master control panel, the user would click on the master control panel icon 152. To select the machine, the user would click on an area of the floor plan section 150 that does not include an icon. Typically, a user would wait until near the end of a programming session to detail the master control panel because he would know more about the machine at that time.

Figure 17:
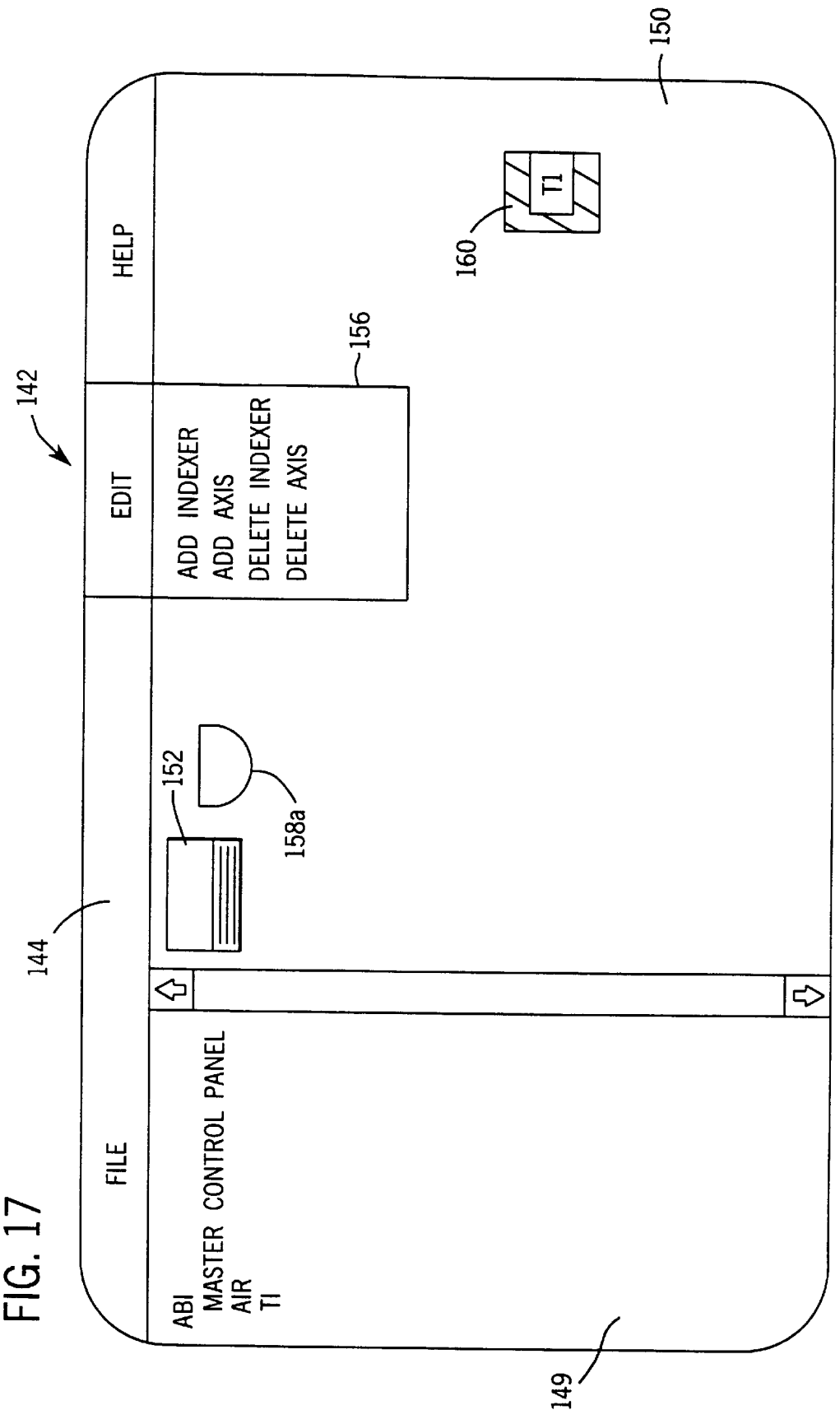
FIGS. 17, 19 and 20 show additional screen displays using the preferred machine editor.

Referring now to FIG. 17, with the machine selected for editing and the EDIT choice chosen, a pull-down menu 156 appears providing options for editing the machine module AB1. Referring also to FIG. 9, a machine template 98 can only be edited by adding to or subtracting from the axis 102 or indexer 104 module list specification. Therefore, the pull-down menu 156 includes the only four possible machine module options: ADD INDEXER, ADD AXIS, DELETE INDEXER, and DELETE AXIS. (Delete options are only provided after an axis or indexer has already been added.) Referring also to FIG. 7A, in the present example, because the machine requires a single directly-connected axis, the user would select ADD AXIS from the menu 156. Because each axis requires a unique name, after selecting ADD AXIS, the editor 162a would request a name for the new axis using a floating name box (not shown).

In the present case, a user would enter "air" as the name of the axis. Then, the editor 162a would provide an axis module reference named "air" below the AB1 module reference in the tree section 149 and would also provide an air axis icon 158a next to the master control panel icon 152 in the floor plan section 150. The "air" module reference, like the master control panel reference, will be indented from the AB1 module reference to show a parent/child relationship.

Figure 18:
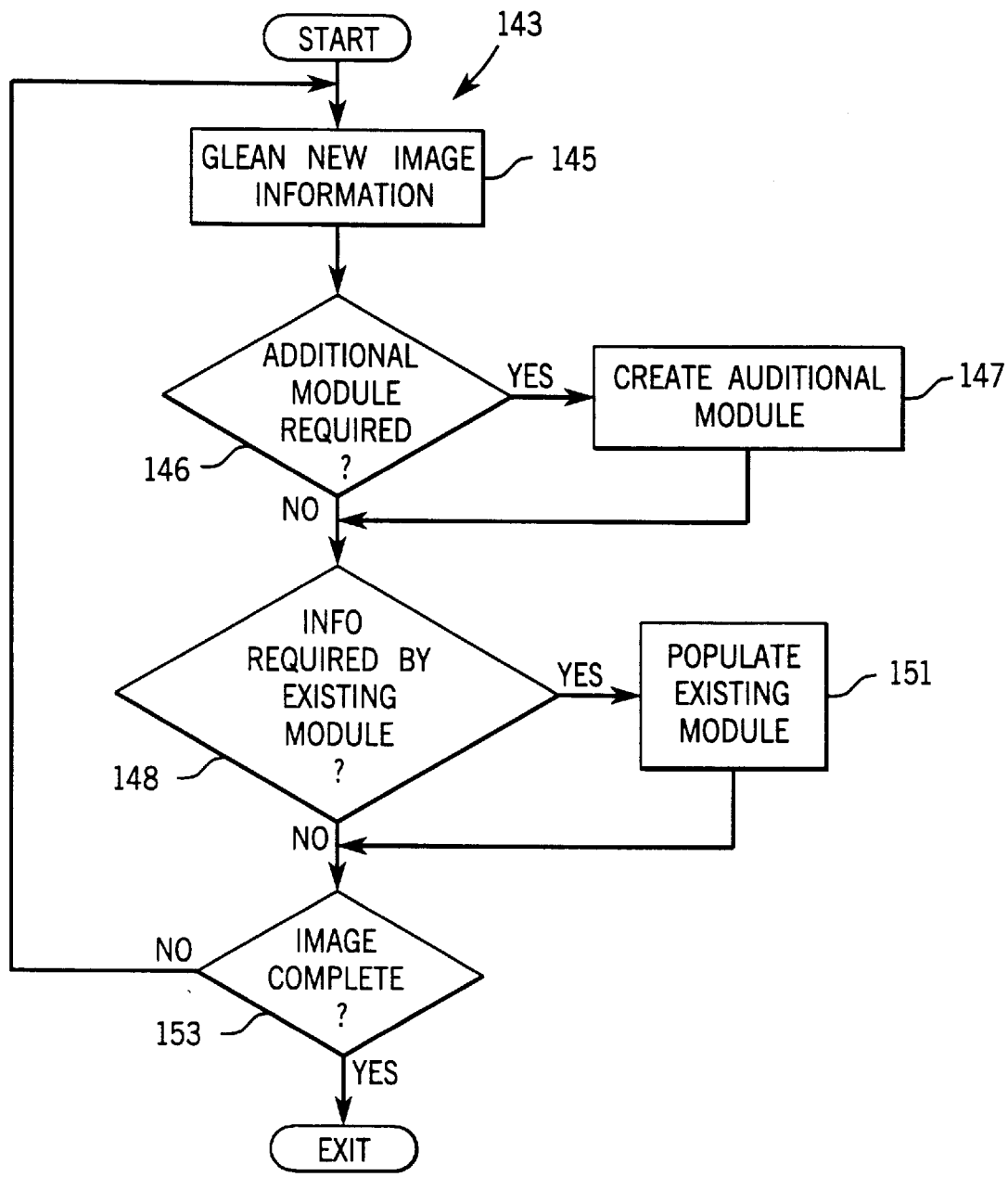
FIG. 18 is a flow chart showing editor operations.

While the editor 162a is forming the floor plan in floor plan section 150, the editor 162a is also creating modules and populating existing module specifications. Referring to FIG. 18, the method 143 of creating and populating begins at process block 145 where the editor 162a gleans new image information from the image. Where an "air" axis image has been added to the floor plan and named, the editor 162a would identify a new axis designated "air".

At decision block 146 the editor 162a determines if the new information requires an additional module. Where an additional module is required, at block 147 the editor 162a creates an additional module. Here, after the "air" axis has been named, the editor 162a creates an axis module named "air". Next, at decision block 148, the editor 162a determines if the newly-gleaned information is required to populate an existing module. If so, at block 151 the editor 162a populates the existing module.

After required modules have been created and existing modules populated, at block 153 the editor 162a determines if the image in section 150 is complete. Typically image completion will be signaled when a user stores an image via the FILE option in menu bar 144. When the image is complete, the editor 162a exits process 143. If the image is not complete, the editor 162a cycles back to process block 145 and continues to glean new image information used to create additional modules and populate existing modules.

After the "air" axis has been added to the floor plan and named, the user again selects EDIT from the menu bar 144, this time selecting the ADD INDEXER choice to add an indexer T1. When ADD INDEXER is selected, because each indexer module requires a unique name, the editor 162a would request an indexer name using another floating name box.

After entering "T1" to identify the indexer in the present example, the editor 162a would provide a "T1" module reference below and indented from the AB1 module reference in the tree section 149 and would also provide an indexer icon 160 in the floor plan section 150. Using the mouse 81 the programmer could click on the indexer icon 160 and drag it into a desired position suitable for building the desired floor plan. In FIG. 17, the indexer icon 160 is shown in the right hand portion of the floor plan section 150. Referring again to FIG. 18, each time new information is added to the floor plan image, the editor 162a follows process 143 to create new modules and populate existing ones.

If needed, a user can again select EDIT and add additional indexers and axes to provide a template-based machine tree and floor plan that corresponds to any machine configuration. For example, if a machine requires a source of pressurized coolant in addition to the air source, a coolant axis could be added to the machine module by again selecting ADD AXIS in the EDIT menu. In the present example, however, the machine includes only one axis ("air"), one indexer ("T1") and the required master control panel. Thus, at this point, fundamental characteristics (i.e. axis, indexers, and control panel) of the machine module have been identified.

Next, the user can further specify either the indexer "T1" or the "air" axis. To further specify the indexer T1, the user selects the indexer icon 160 with the mouse 81 and then again selects EDIT. Referring again to FIG. 12, the indexer template 112 can be edited only by adding an operator panel, a station or an axis specification, or by deleting a station or axis specification. Therefore, referring to FIG. 19, in this case, the EDIT menu would provide five options: ADD STATION, ADD AXIS, ADD OPERATOR PANEL, DELETE STATION, and DELETE AXIS (delete options are only provided after station or axis has been added). At the indexer level an operator panel is optional and should only be provided when required to meet job specific characteristics.

As with the machine module, here, where an axis is to be added to the indexer T1, the user would select ADD AXIS and name the axis. The editor 162*a* would then provide an axis module reference below the indexer module reference T1 and indented in the tree section 149 and provide an axis icon in the floor plan section 150. In the present example, the indexer T1 includes a "transfer" axis shown below the indexer "T1" reference in section 149 and shown as transfer icon 158*b* in section 150 of FIG. 19. The transfer icon 158*b* initially appears near the top of the floor plan section 150 and is dragged down next to the indexer icon 160 to signify the relationship therebetween.

To add a station to the indexer, the user selects ADD STATION and names the specific station. The editor 162*a* then provides a station module reference in the tree section 149 and a station icon in the floor plan section 150 which can be dragged into its proper location next to the indexer icon 160. Additional stations are selected in the same manner but must be provided different names.

Figure 19:
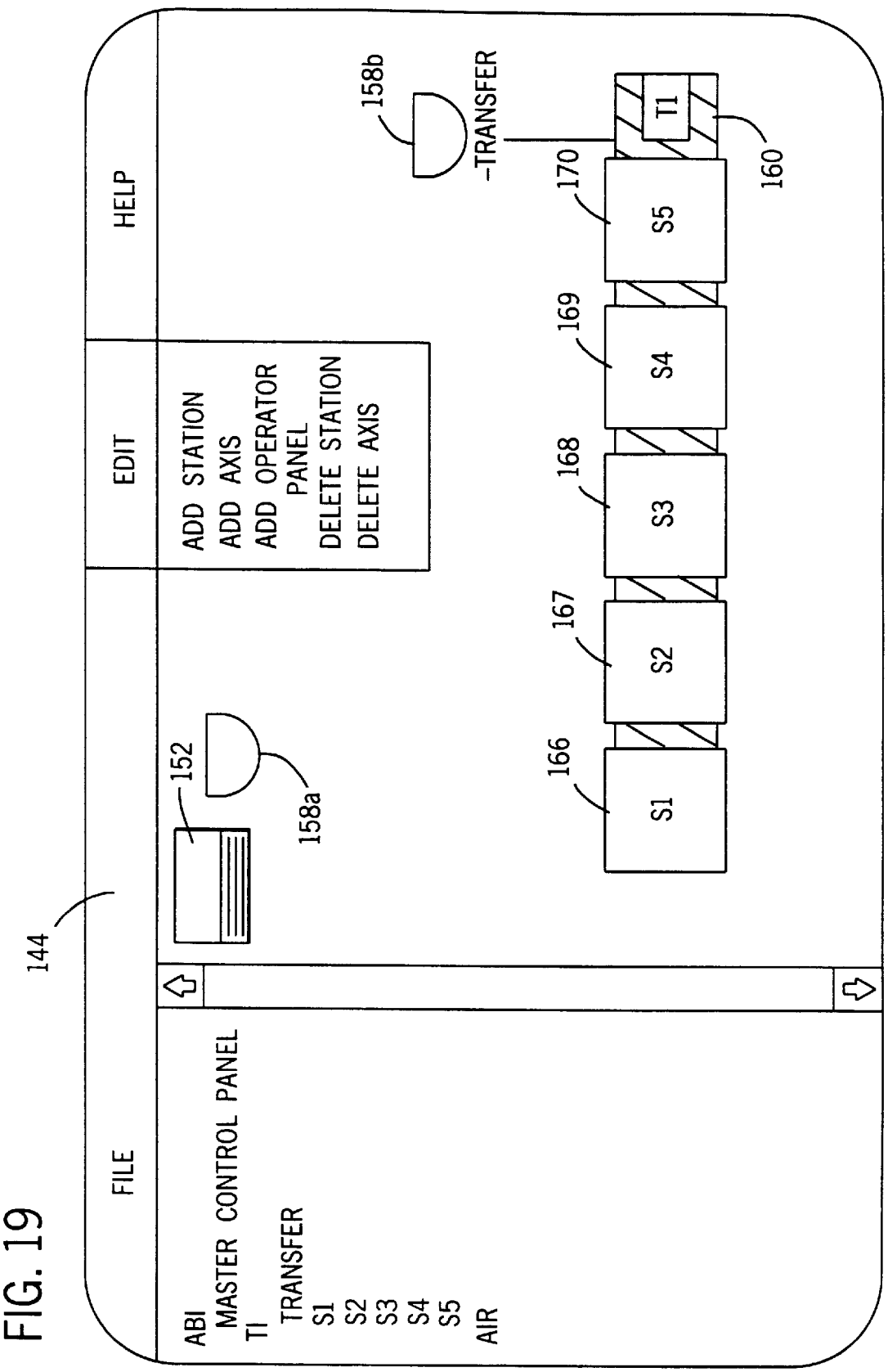

In the present example, because there are five separate stations, the user adds five separate stations to the floor plan, each of which is individually represented in both the tree 149 and floor plan 150 sections. In FIG. 19, all five stations, named S1–S5, are shown as five separate icons 166, 167, 168, 169 and 170. The icons have been positioned to show machine component relationships.

This process of selecting and naming menu items to construct both the template-based machine tree and the floor plan continues until the floor plan is completely designated, from the machine level down to the axis level. A complete floor plan for the process of FIG. 1 is shown in FIG. 20 including icons representing the indexer, five stations, a work-unit named "LH" at the first station corresponding to loader 14, a work-unit named "LV" at the second station corresponding to drill 18, an LV unit at the third station corresponding to turret drill 20, an LV unit at the fourth station corresponding to the horizontal mill 22, an "RH" at the fifth station corresponding to the unloader 16, the operator panel 57 represented by icon 500, the master control panel 58 represented by icon 152, and a separate icon for each axis.

In the tree section 149, LH stands for "left horizontal" meaning the work-unit is positioned on the left hand side of its associated station and moves horizontally with respect to the station. Similarly, LV stands for "left vertical" meaning movement is along a vertical axis and RH stands for "right horizontal" meaning the work-unit is positioned on the right hand side of its associated station and moves horizontally with respect to the station. Despite the drill, turret drill, and horizontal mill all having the name LV, each is distinguishable because of their parent/child associations with different parent stations. Importantly, the parent/child associations are recognized by the compiler.

Figure 20:
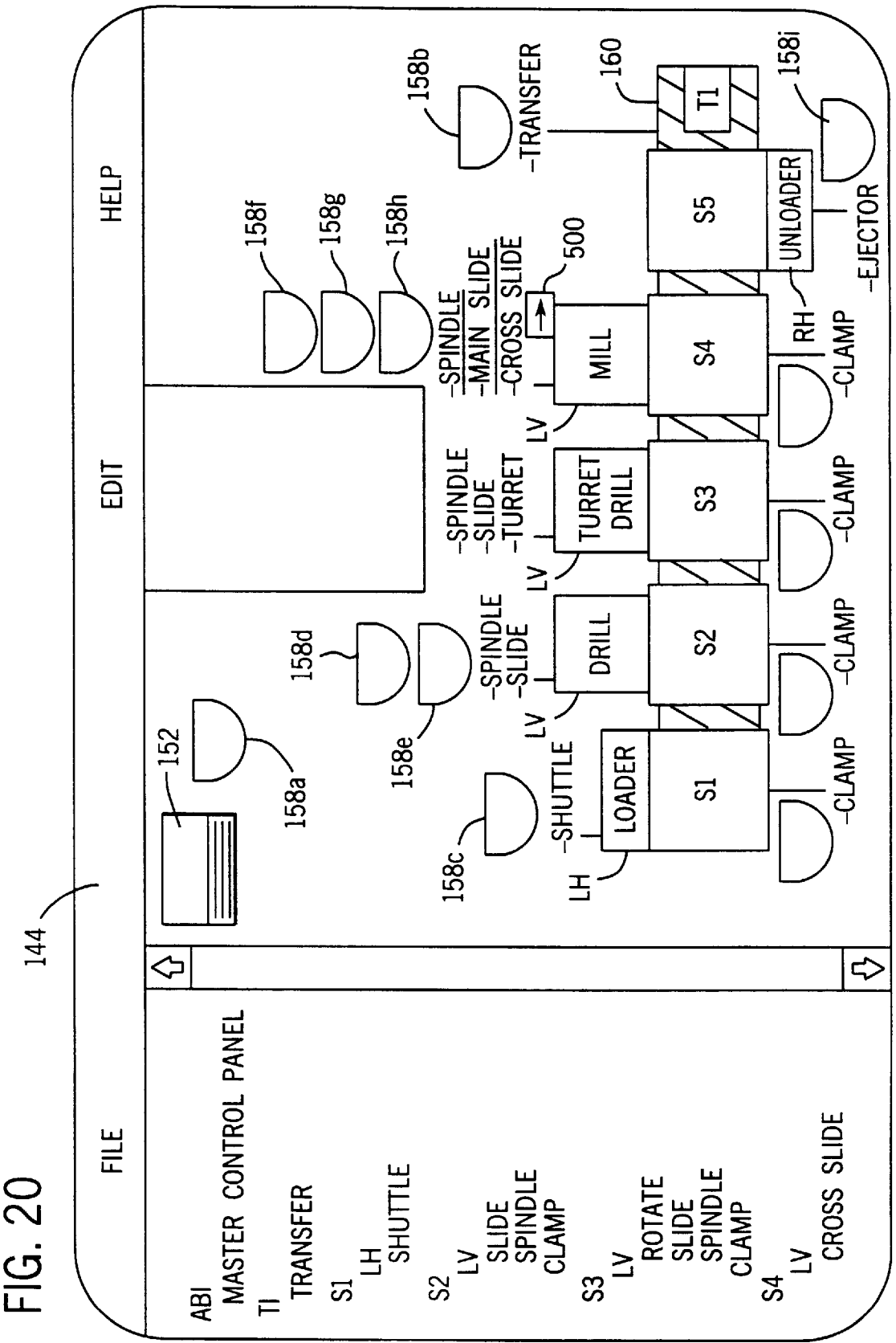

As in FIG. 7A, the loader at station S1 in FIG. 20 includes a single axis named "shuttle" 158*c*. Similarly, the drill at station S2 includes two axes named "spindle" 158*d* and "slide" 158*e*, and the turret drill at station S3 includes axes named "spindle", "slide" and "turret" (icons not shown). The mill includes axes named "spindle" 158*f*, "main slide" 158*g* and "cross slide" 158*h*, and the unloader includes an axis named "ejector" 158*i*.

When the floor plan is completed, the portion of the template-based machine tree in tree section 149 is completely designated. Next, the special editors can be used to define the characteristics of each axis 158*a*–158*i* and the control panels 57, 58, as well as define sequences of axis movement.

Referring to FIGS. 2 and 20, the horizontal mill 22 is represented in the floor plan image as the fourth station S4 and all other components connected thereto. Thus, station S4 includes a left vertical mill LV having a local control panel represented by icon 500 and spindle, main slide and cross slide axis represented by axis icons 158*f*, 158*g*, 158*h*.

2. Axis Editor

Referring again to FIG. 20, when an axis icon is selected, the machine editor 162*a* switches editing control to the axis editor 162*b* which allows a programmer to specify axis characteristics.

Referring again to FIG. 18, the axis editor 162*b*, like the machine editor 162*a*, follows the same process for gleaning new image information to create new modules and populate existing modules. The only difference is that the axis editor 162*b* and machine editor 162*a* glean required information from different images and create and populate different module types.

Figure 21:
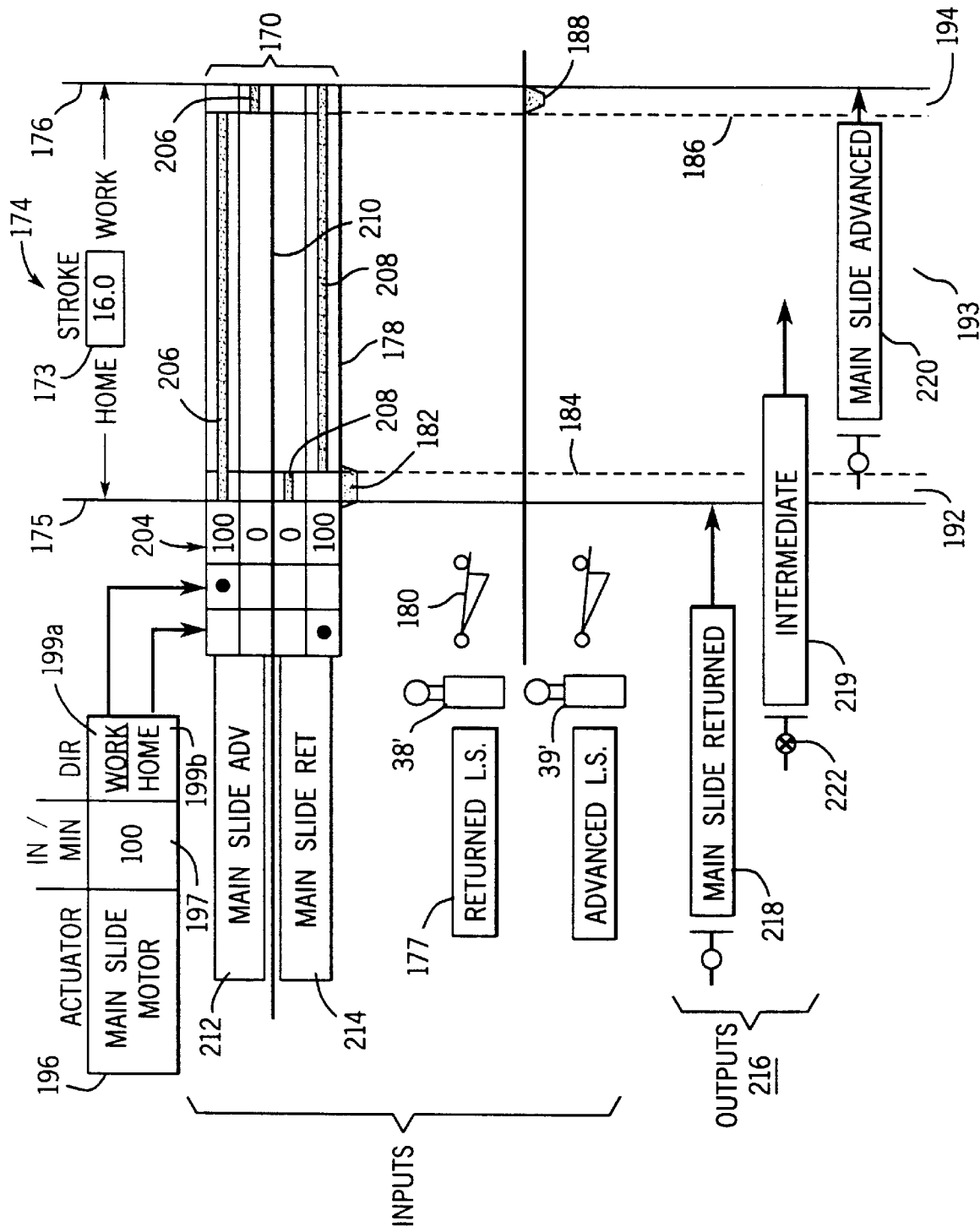
FIG. 21 is a control diagram which a user uses to define the operation of a linear axis.
Figure 22:
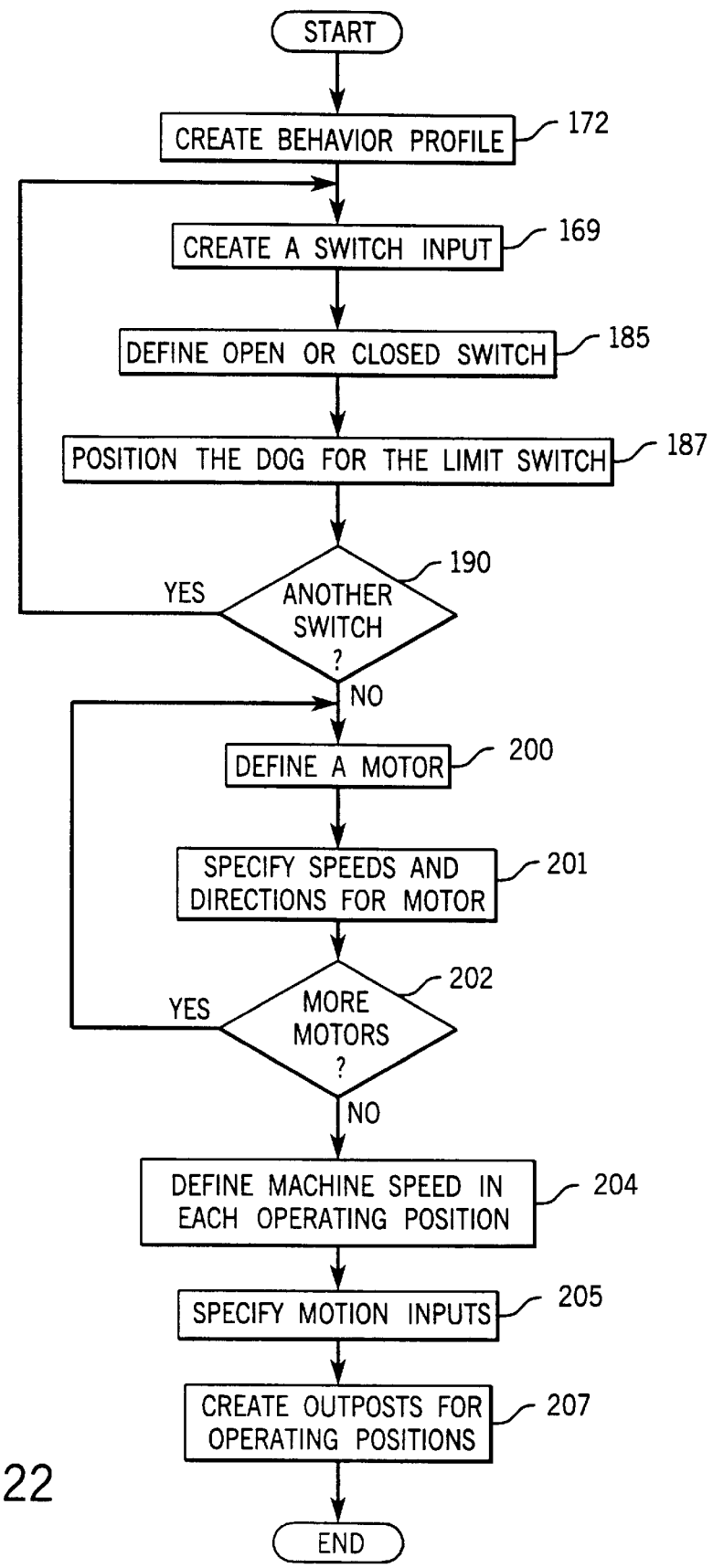
FIG. 22 is a flow chart of the process by which program editor software enables a user to create the control diagram of FIG. 21.

FIG. 21 depicts a control diagram 174 for the main slide linear axis metaphor shown in FIG. 5, as displayed on the programming monitor 80, along with additional information required to derive data for a template compiler. A flow chart of the process by which the user creates the control diagram is depicted in FIG. 22. Initially at process step 172, the user constructs a behavior profile 170 that is similar to the control metaphor for the desired machine cycle. The behavior profile 170 is illustrated in the upper right portion of the display in FIG. 21 between lines 175 and 176 representing the extremes of the linear motion. The remainder of the display designates "physical attributes" of the axis, which attributes constitute the input and output signals required to operate the machine according to the behavior profile.

At the outset of defining the operation of the main slide axis, a blank behavior profile is displayed with only the outer lines 175 and 176 that correspond to the extremes of the linear movement of the main slide subassembly 26. An EDIT choice appears at the top of the profile in a menu bar which, when selected, provides a menu of items that can be used to define the axis. In particular, the menu will include switches, actuators, and work requests. A box 173 in which the user enters the length of the machine stroke, i.e. the distance between positions D0 and D1 also appears. In the present example, the stroke distance is 16.0 inches and can be entered in the box 173 by selecting the box 173 and entering an appropriate stroke via a keyboard.

Referring also to FIG. 2, at step 169 in FIG. 22 the user uses the edit menu to select a menu item on the terminal screen to define one of the limit switches 38 or 39, for example switch 38 for the fully returned position of the subassembly 26. Upon that selection, a limit symbol 38' is displayed on monitor 80 and box 177 appears to the left of the symbol 38' within which the user enters the switch name, such as "returned LS". A schematic representation 180 of the limit switch appears adjacent to its symbol 38' to indicate whether the limit switch contacts close or open when struck, or tripped, by a subassembly dog. A dog symbol 182 also appears on a horizontal line 178 which represents the linear axis of movement. One end of the dog symbol 182 initially abuts the LEFT vertical line 175 and another vertical line 184 appears at the other end of the dog symbol.

The graphical representation 38' of the limit switch 38 indicates when the limit switch is sending an active input signal to the programmable controller 60 with respect to the positions of travel by the main slide subassembly 26. At step 185, the user indicates whether the switch is normally opened or closed. This is accomplished by using a mouse 81 or the keys on keyboard 79 to place the cursor over the schematic symbol 180 and press the button to toggle the symbol open or closed. In a similar manner at step 187, the user "grabs" the dog symbol 182 to position the symbol along line 178 to indicate positions on the axis where the dog trips the limit switch 38'. The length of the dog symbol 182 can be changed by using the cursor to grab one end of the symbol and stretch or contract the dog symbol. As the position and length of the dog symbol changes, so does the position of the vertical line 184 which indicates the location along the linear axis at which the dog engages and disengages the corresponding limit switch 38. The dog symbol 188 for the advanced limit switch 39 also is created on the control diagram in this manner by the user again selecting the limit switch menu item at step 190. Defining the other limit switch 39' (i.e. "advanced LS") also creates an additional vertical line 186 on the control diagram 166.

The definition of the two limit switches 38' and 39' divides the stroke length into three segments referred to as positions 192, 193, and 194. The location and length of the dog symbols 182, 188 designate in which of these positions 192–194 the corresponding limit switch will be tripped by a carriage dog. In the present example, the returned limit switch 38 is tripped by the dog when the subassembly 26 is stopped in the "returned" position 192. The advanced limit switch 39 is tripped by the dog only when the subassembly 26 is at the "advanced" position 194. When neither the advanced nor returned LSs 38, 39 are tripped, the subassembly 26 is in an "intermediate" position.

As the limit switches are employed to signal when subassembly motion should be stopped, the operational positions 192–194 relate to different sections of the control metaphor in FIG. 5. Specifically, "returned" position 192 corresponds to the stopped position at distance D0 and position 193 corresponds to the subassembly 26 moving between distances D0 and D1. Similarly, position 194 corresponds to the fully advanced position when the subassembly 26 is stopped at distance D1. The terms "position" and "operational position," as used herein, refer to physical locations at which the machine has different operating characteristics, for example movement speed and direction. A position may be a single physical location or a region of physical locations, such as the region between distance D0 and D1.

After defining the signals for the two limit switches 38 and 39, the user then specifies the number of actuators (motors) which are employed to drive the subassembly 26. A separate block 196 is created each time the user selects an ADD ACTUATOR menu item from the program editor software at step 190. This enables the user to specify the number of motors, in this case one for the main slide motor 32. Each block 196 is subdivided into three boxes for actuator name, speed (IN/MIN) and direction. The blocks 196 may be subdivided further depending upon the types of actuators, i.e. . . . single speed-single direction, single speed-two direction, two speed-single direction, or two speed-two direction motors. In the present example, the main slide motor 32 is a single-speed, two-direction device and thus its block 196 has a single-speed box 197 and two-direction boxes "work" 199*a* and "home" 199*b*. At step 200, the user enters the speed of the slide motor in box 197 but does not designate direction since both the advancing and retracting motions are provided by this actuator type. The editor software loops through steps 200–202 until information has been provided for each actuator selected.

Each time an actuator block 196 is added, removed or edited, the graphical editor has a column for every direction and/or speed coil for the motors and a line which corresponds to all of the possible combinations of motor speeds going toward and away from the workpiece. The exemplary main slide motor can advance the subassembly 26 toward a workpiece at 100 inches per minute. Similarly, the motor can be used to retract the subassembly 26 from a workpiece at 100 inches per minute. A black dot in various matrix locations indicates which of the motors are energized and their direction to produce the speed listed in the right column of the matrix 204.

When the matrix 204 is formed, separate horizontal bars 206 and 208 are created across the behavior profile 170 above and below the zero speed axis 210. Each of the horizontal bars 206 and 208 is formed by individual segments within each of the operational positions 192–194. At step 204, the user grabs the segments of the horizontal bars 206 and 208 in the behavior profile 170 and positions the segments vertically to indicate the advancing and returning speed at which the subassembly 26 is to move within each of the positions 192–194. For example, when an advance request is received, the subassembly 26 is to move from the returned position 192 through the intermediate position 193 at a speed of 100 inches per minute. Upon the subassembly 26 reaching the advanced position 194 at distance D1, the speed goes to zero by stopping the motor 32. Thus, the portion of the behavior profile 170 above the zero speed axis 210 corresponds to moving the subassembly toward a workpiece. A similar representation in FIG. 21 is given for the speed of the subassembly away from the workpiece by locating the segments of horizontal bar 208.

Referring still to FIGS. 21 and 22, the user then provides the names of separate request signals which indicate when the subassembly 26 is to advance toward the workpiece and when it is to return. These names are placed into boxes 212 and 214 as request signals to be used by the linear axis editor as described below. In the example these request signals have been named simply "advance" and "return".

Next, the user is afforded an opportunity at step 207 to define composite position signals, which are signals energized when an axis is within a specified region defined using a subset of operational positions 192–194. A composite position definition label box CCP' is added to section 216' of diagram 174 each time a user selects an ADD COMPOSITE POSITION menu item. For each composite position added a user must enter a name in the label box CCP' and must select one or more operational positions by clicking the mouse-controlled cursor in the vicinity of the intersection of an imaginary horizontal line, extending from the center of the label box CCP', and one of the operating position regions 192, 193 or 194, each selection recorded by the axis editor as a graphical arrow 218', 219'. In the example, a composite position named "cutter clear" is defined to be energized whenever the main slide subassembly 26 is in either the "returned" or "intermediate" position. Referring also to FIGS. 3 and 6, a "cutter clear" composite position CCP' defined in section 216' of diagram 174 is precisely the signal required to initiate and maintain a cross slide return action B4 once a main slide return action B3 reaches a cutter clear position CCP, permitting parallel motion 56 of the main slide and cross slide axes.

As the user creates the control diagram 174 of FIG. 21, the axis editor 162b converts icons and images from the diagram 174 into module specifications required to define an associated axis module. Referring again to FIG. 11, to completely define both physical and operating characteristics of an axis the editor 162b must glean information from the axis diagram 174 to populate the module specification named "switch package" 291a and two module list specifications named "trajectory" 291b and "actuator" 291c.

Referring to FIGS. 11, 18 and 21, to define the axis module 108 so as to correspond to control diagram 174, while a user is constructing the diagram 174, the editor 162b identifies all limit switches, positions, composite positions, actuators, trajectories, and moves from the diagram 174, one at a time, at block 145.

Each time a user designates a limit switch, request, actuator, position or composite position, the editor 162b identifies the designation and populates an appropriate module or creates a new module. In the main slide control diagram of FIG. 21, the editor 162b would identify both the returned limit switch 38' and advanced limit switch 39', both the main slide advance 212 and return 214 requests, the main slide motor actuator 196, the main slide positions including "returned", "intermediate", and "advanced" 192, 193 and 194 respectively, the composite position "cutter clear" CCP' and various moves corresponding to both the return 214 and advance 212 trajectories. The advance trajectory 212 would include an "initial" move corresponding to position 192, an "intermediate" move corresponding to position 193 and a "final" move, which slows the subassembly 26 to zero speed, corresponding to position 194.

At block 151, after each of the axis designations, the editor 162b populates corresponding lists, placing limit switches in the limit switch module list specification 294, positions in the position module list specification 295, trajectories in the trajectory module list specification 291b, actuators in the actuator module list specification 291c, composite positions in the composite position module list specification 291d and moves in the associated move module lists 96g in FIG. 25. In addition, for each list entry, the editor 162b creates a new module at block 147. For example, referring to FIGS. 21 and 23, for the main slide control diagram 174 the limit switch module list specification 294 in FIG. 23 would include module references named "returned LS" 38' and "advanced LS" 39' while the positions list 295 would include module references named "returned" 192, "intermediate" 193 and "advanced" 194. Referring to FIGS. 21 and 11, the trajectory module list 291b would include module references named "advance" and "return" corresponding to requests 212 and 214 respectively and the actuator module list specification 291c would include a single module reference named "motor" of the type actuator corresponding to designation 196. Referring to FIG. 25, the module list specification named "move" for the module of type trajectory named "advance" would include references to "initial," "intermediate" and "final" moves and the list named "move" for the module of type trajectory named "return" would also include references to "initial," "intermediate" and "final" moves. Each list entry would correspond to a different module.

Referring to FIG. 24 the position template 303 includes four separate lists 304a, 304b, 304c and 304d corresponding to the two possible types of limit switches and the two possible states of each type of switch (i.e. normally open (NO) tripped, NO released, normally closed (NC) tripped, and NC released.) Referring also to FIG. 21, the editor 162b correlates positions 192, 193 and 194 with tripped and untripped switches and switch type (i.e. NO or NC) to populate each of the module list specifications 304a–304b with switches in conditions that correspond to a position.

For example, referring again to FIGS. 2 and 21, when the subassembly 26 is in the returned position the "returned LS" 38' is tripped and the "advanced LS" 39' is released. Assuming both the returned 38' and advanced 39' switches are normally open (NO), the returned position 192 would include one normally open and tripped returned LS 38' and one normally open and released advanced LS 39'. Recognizing this, the editor 162b would populate the NO tripped LS module list specification 304a with the returned LS 38' and would populate the NO released LS module list specification 304b with the advanced LS 39'. The other two list specifications 304c and 304d in the position template 303 would be left empty.

Referring to FIGS. 21 and 24A, axis editor 162b creates a composite position module based on template 303a for each composite position in section 216' of diagram 174. The editor provides each module a name 401a corresponding to the name in label box CCP' and provides a "selected positions" module list specification 304e corresponding to the names of the selected operational positions 218' and 219'. The single rung in template 303a generates a simple logic circuit that energizes a signal whose name corresponds to module name 401a whenever any one of the positions in the selected positions module list specification 304e is energized.

Referring to FIGS. 11 and 25 the editor 162b creates a trajectory module based on trajectory template 309 for every trajectory referenced in the trajectory module list specification 291b.

The second rung 313 determines if the trajectory associated with the specific module is at its start position. This is done by using an OR list macro as explained above. The OR list macro and associated logic 315 determines if any other trajectories are done. Where any other trajectory is done, it is assumed that the present trajectory is at its start position. The third rung 314 simply checks if the trajectory associated with the module is completed and is used by other trajectory modules to determine if they are at their start positions. The start and done status of each trajectory is used by the bar chart editor 162d as described in more detail below.

Referring now to FIG. 26, a move module based on move template 316 is provided by the editor 162b for each potential move designated in a trajectory module. Each move template 316 includes a unique module list named "coil request". The editor provides a coil request module based on the coil request template shown in FIG. 27 for each coil request referenced in a move module 316.

Referring to FIG. 28 the editor 162b creates an actuator module based on actuator template 318 for each actuator module referenced in the axis template 108. Each actuator module 318 includes a module list 319 called coil wherever a list of uniquely named coils are provided for the actuator associated with the parent actuator template 318.

Because the axis editor gleans information from diagram 174 while a user is constructing the diagram and simultaneously constructs the portion of the template-based machine tree corresponding to the axis being designated, by the time diagram 174 is completed, all of the information required to provide RLL logic to specify the axis is complete. This process must be repeated for each axis on the floor plan 150.

3. Control Panel and Bar Chart Editors

Referring again to FIG. 20, at this point the only icons on the floor plan image that have not been completely defined are the main control panel 152 and horizontal mill control panel 500.

In addition, while all of the separate axes for each machine element have been designated at this point, none of the axis movements have been linked together. For example, referring again to FIG. 6, the cycle 92 therein includes movements of two separate axes (i.e. main slide subassembly 26 and cross slide subassembly 28) that are linked via their sequential and parallel relationships. These relationships have to be designated by a user.

To specify a control panel, a user must designate mode selection, manual control, and indicator devices. In addition, for each manual control device and each indicator device, the user must designate both the cycle and the specific function in the cycle to which the device relates.

To this end, although the control panel 162c and bar chart 162d editors are separate, they must be used together. Initially, the control panel editor 162c is used to identify modes of operation, mode selector switches corresponding to the modes of operation, and various cycles that are controllable via the control panel. Then, the bar chart editor 162d is used to define the different functions and their temporal relationships that make up each cycle that is controllable via the control panel. Finally, after the cycles are completely defined, the control panel editor 162c is again used to identify manual control devices, including lights, buttons and switches, that correspond to desired functions in the defined cycles.

To define the horizontal mill control panel 57, a user selects icon 500. When icon 500 is selected, editing control passes from the machine editor 162a to the control panel editor 162c.

Referring yet again to FIG. 18, the control panel 162c and bar chart 162d editors, like editors 162a and 162b, follow process 143 to glean information from screen images to create new modules and populate existing modules during image construction. There is one exception to this general rule and that is that the bar chart editor must also perform a bucketing step using the attributes table 431 of FIG. 40 after a cycle has been defined to populate function lists in the module list specification sections of associated function modules. This will be described below.

Figure 30:
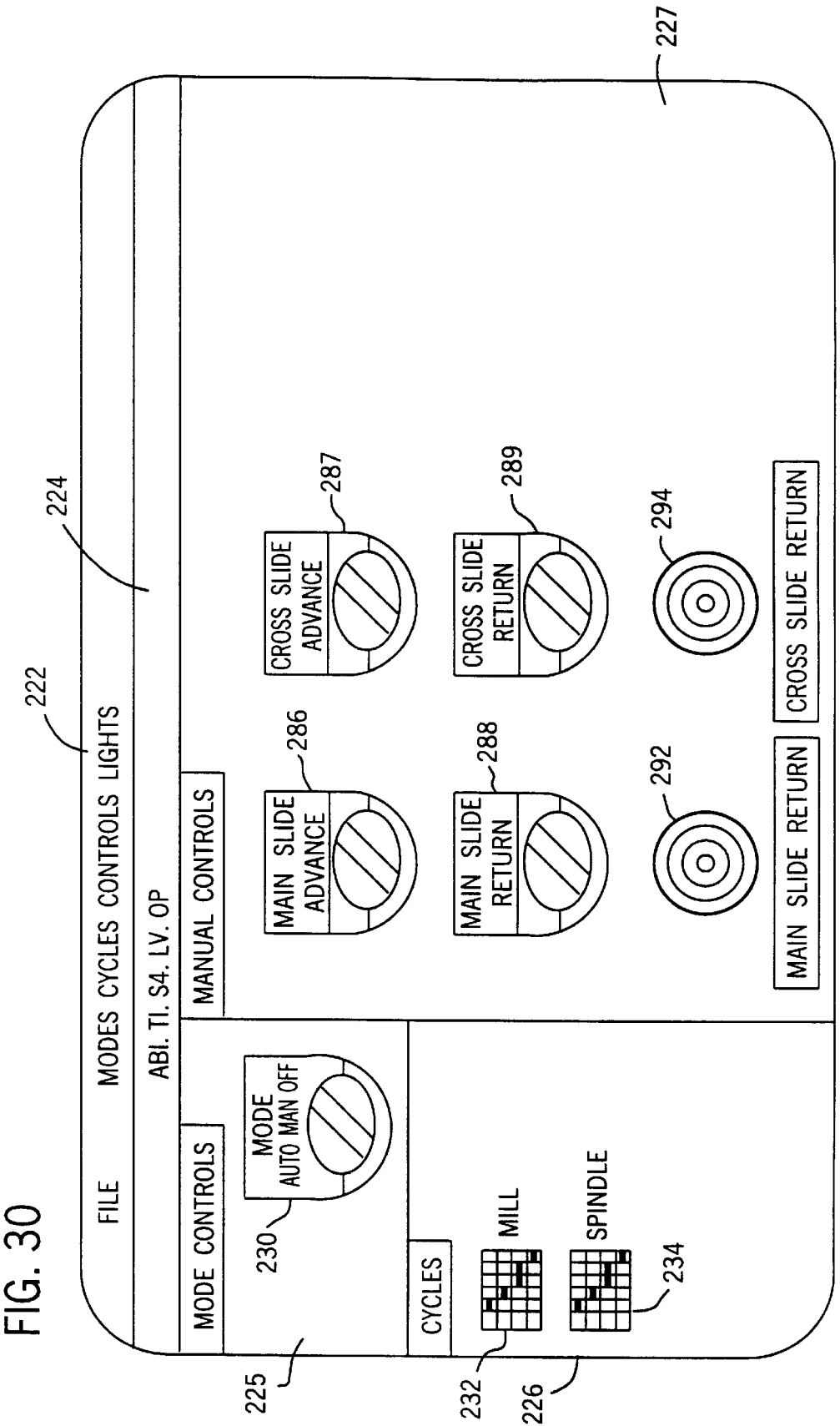
FIG. 30 shows a screen display of a preferred control-panel editor including a control-panel specification which a user defines using the control-panel editor.

Referring now to FIG. 30, the initial display for a preferred control panel editor 162c includes a menu bar 222, a name field 224, and three specification fields: MODE CONTROLS, CYCLES, and MANUAL CONTROLS referred to by numerals 225–227, respectively.

The menu bar 222 includes five options, a conventional FILE option and MODES, CYCLES, CONTROLS and LIGHTS options that can be used to add or delete modes of operation, cycles, specific controls, or lights respectively.

Because all control panels have at least local and remote modes of operation, the control panel editor 162c initially designates a single three-pole selector switch represented in the MODE CONTROLS field 225 by icon 230 which can be used to choose either a remote mode (AUTO), local mode (MAN), or an off state (OFF). If desired, a user can use the MODES option in menu bar 222 to pull down a mode menu for creating other modes (tool change or service modes). If a third mode is designated via the modes menu, the icon 230 is automatically altered to show a four-pole selector switch in the MODE CONTROLS field 225.

Other than icon 230, initially there are no other designations in fields 225, 226 and 227. Because manual controls have to be related to some cycle function, prior to designating manual controls, machine cycles, like the one shown in FIG. 6, have to be defined. To this end, a user can choose the CYCLES option from menu bar 222 to pull down a cycles menu to designate required cycles. When a single cycle is added, the editor 162c prompts the user to name the cycle. When a cycle is added, an icon including a user-assigned name is placed in the CYCLES field 226. In the present example, the horizontal mill control panel 57 includes only two cycles, a mill cycle including movements of the main slide 26 and cross slide 28 subassemblies, and a spindle cycle for turning on and off spindle 30. Therefore, two cycle icons 232 and 234 corresponding to mill and spindle cycles are referenced in field 226.

Figure 31:
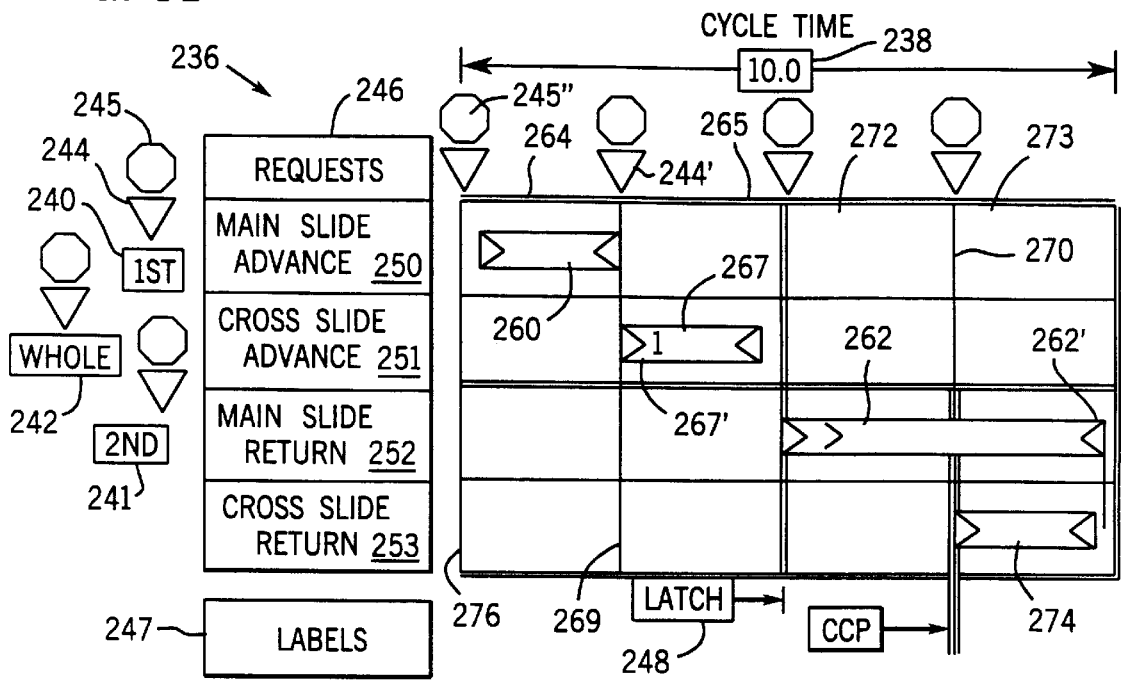
FIG. 31 is a bar chart which a user creates to define sequencing of related axes.

To define each cycle, the user separately selects each of the cycle icons 232, 234 to enter the bar chart editor 162d two different times. Referring to FIG. 31, a bar chart image 236 that would be constructed for the mill cycle of FIG. 6 using the bar chart editor 162d is depicted. It should be readily apparent that the bar chart image 236 constructed using the bar chart editor 162d is very similar to the conventional chart 92 shown in FIG. 6 having a few additional features that help tie together various cycles as will be described below. The similarity between a conventional bar chart 92 and image 236 is meant to make it easy for a user trained in the use of conventional diagrams to use the bar chart editor 162d.

When a user enters the bar chart editor 162d, the initial image only includes basic required bar chart designations. Required designations include the cycle time box 238, first sequence 240, second sequence 241 and whole cycle 242 icons, interlocking yield 244 and stop 245 symbols corresponding to icons 240, 241 and 242 and REQUESTS 246 LABELS 247 and LATCH 248 headings.

The editor 162d also provides a menu bar (not shown) including a REQUESTS option which allows a user to add or delete requests from the bar chart and a LABELS option allowing a user to label specific locations in the bar chart.

To construct the bar chart image 236, a user selects an ADD REQUESTS option from a pull down request menu. Thereafter, the editor 162d provides a complete listing of every possible request associated with the horizontal mill 22. For example, possible requests for the horizontal mill 22 would include: cross slide advance, cross slide return, main slide advance, main slide return, spindle run, and spindle not run. In addition, other possible requests would include whole cycle, reset, first sequence, and second sequence requests to any other cycle, exclusive of the cycle depicted on the bar chart, defined subordinate to the horizontal mill in the machine tree 11 (in this case, the spindle cycle 234 identified in the cycle field 226 of FIG. 30).

The bar chart editor 162d gleans the axis request options directly from the axis images for the horizontal mill that were constructed using the axis editor 162a. For example, referring again to FIG. 21, main slide advance and return requests were designated in boxes 212 and 214. The cross slide advance and return requests would have been designated when the user constructed an axis image like the one in FIG. 21 for the cross slide subassembly axis. The spindle requests would have been designated when the user constructed an axis image for the spindle axis.

Figure 32:
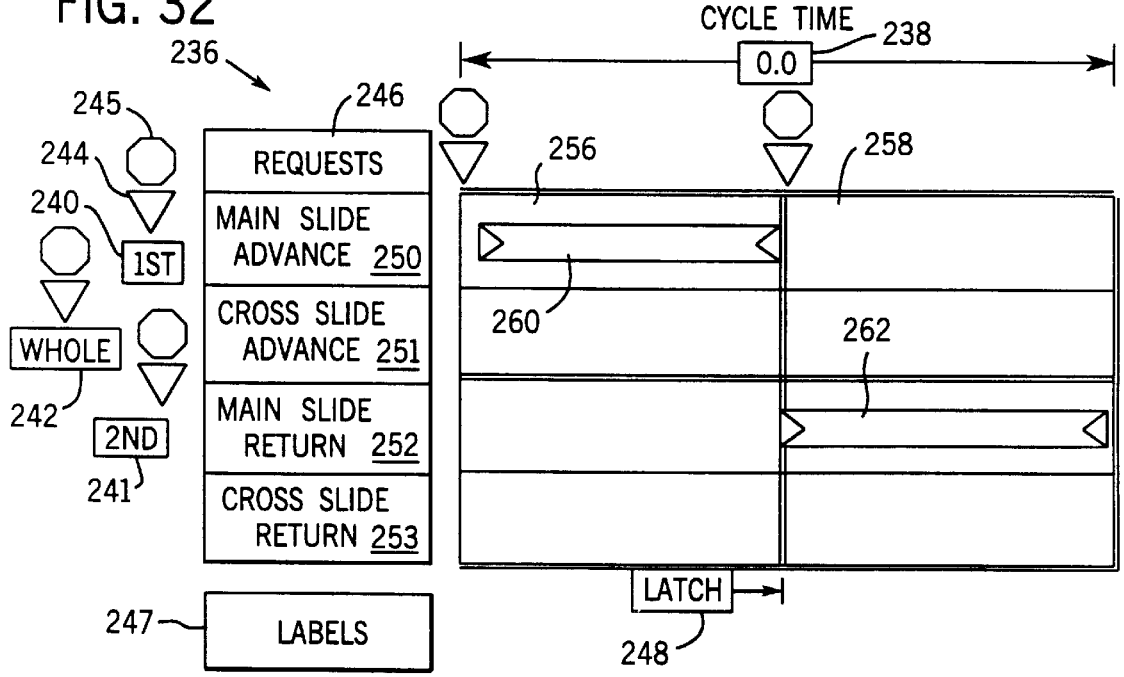
FIG. 32 is an incomplete bar chart like the one in FIG. 31.

To specify a mill cycle like the one in FIG. 6, the user selects requests from the request menu for main slide advance, cross slide advance, main slide return and cross slide return. Each time a request is selected, the editor provides a request box 250, 251, 252 or 253 under the REQUESTS heading. In addition, referring also to FIG. 32, the editor 162d provides two blank sequence boxes to the right thereof under the CYCLE TIME designation 238, the sequence boxes divided by the LATCH designation indicating division between first and second sequences. Thus, there are two separate columns 256, 258 next to the request boxes 250–253, a first sequence column 256 and a second sequence column 258.

With all of the requests selected, the user begins to order the sequence of requests by selecting the box in the first sequence column 256 corresponding to the first request in the cycle. In the present example, the sequence of requests is main slide advance, cross slide advance, main slide return and cross slide return. Therefore, the user would first select the box in the first sequence column corresponding to the main slide advance request in box 250. The editor 162d would respond by placing a bar 260 adjacent request box 250 in the first sequence column 256.

Next, the user would select the box in the second sequence column corresponding to the first request in the second sequence. In the present example, the first request in the second sequence is main slide return. The user would select the box in the second sequence column 258 corresponding to the main slide return. The editor 162d then places a function bar 262 in the selected box. At this point, the beginning requests in the first and second sequences have been identified.

Next the user must select the second requests in the first and second sequences. In the present example, the second request in the first sequence is the cross slide advance request in request box 251. To place a function bar for the cross slide advance request, the user selects box 251 and drags a ghost image (not shown) of the box into first sequencing column 256. To place the cross slide advance request after the main slide advance request, the user drags the ghost image until it is clearly in the second half of the first sequence column 256. The user then releases the ghost image. To place the cross slide advance request in front of the main slide advance request, the user would release the ghost in the first half of the first sequence column 256. The ghost image is depicted as a cross hair to aid the user in this process.

Referring again to FIG. 31, when the ghost image is released, the editor 162d divides the first sequence column into first and second columns 264, 265 using a vertical "done" line 269 and provides a bar 267 corresponding to the cross slide advance request in box 251. In addition, the editor 162d shortens bar 260 so that bar 260 ends where bar 267 begins, indicating that functions related to bars 260 and 267 do not overlap. In other words, the function related to bar 260 is done at done line 269.

A function bar for the cross slide return request may be placed in the second sequence in a similar fashion, but closer inspection reveals that correct placement of the cross slice return function bar requires another technique.

In this case, referring again to FIG. 6 and also to FIG. 3, the cross slide return action B4 is expected to start as soon as the main slide reaches the intermediate cutter clear position CCP, and is expected to continue in parallel with the remainder of the main slide return action until both actions are complete. So, referring again to FIGS. 31 and 32, before a function bar for the cross slide return request can be correctly placed, as represented in FIG. 6, it is necessary to indicate on bar chart 236 an intermediate "done" line bisecting the extent of the main slide return function bar 262 that represents the achievement of the cutter clear position CCP.

A bar chart editor 162d, although capable of gleaning information from its functions about intermediate positions, is not capable of determining which of many such positions are needed on the display 236, while displaying all such positions is clumsy and detracts from the overall usefulness of the display. In the preferred embodiment, a user is required to assist the editor 162d by choosing, on a function by function basis, which intermediate positions in each function need to be indicated on the display 236. This is done through a function dialog that is activated by clicking between the end triangles of a function bar with the mouse-controlled cursor.

Referring again to FIGS. 31, 32 and to FIG. 21, a user first selects the bar 262 associated with the main slide return request. A function dialog (not shown) gleans information about outputs 216 and composite positions 216' from a control diagram 174 of the main slide axis captured by an axis editor 162b. The function dialog presents this information to a user in a list of "positions" traversed by the main slide return trajectory—initial, intermediate, and final—in chronological order of traversal. A user may select one or more intermediate, positions for display. In this case, a user indicates that the composite position "cutter clear" CCP' is needed on the display. The bar chart editor 162d then creates a vertical line 270, bisecting the main slide return function bar 262, and splitting the second sequence column 258 into columns 272 and 273.

From here it is a simple matter for a user to select the box at the intersection of the row containing the cross slide return request box 253 and the newly created column 273. The bar chart editor 162d then creates the cross slide return function bar 274 in the selected box such that the leftmost end of bar 274 meets the intermediate position line 270 and the rightmost end of bar 274 meets the vertical line 276'.

Initially, all functions provided on a bar chart image 236 using the editor 162d are assumed to be normal functions (i.e. can be performed in either forward or reverse directions and can be repetitively performed during manual operation in a single cycle). However, the preferred editor 162d allows a user to specify non-reversible or non-repeatable functions. This is accomplished by again activating the function dialog by clicking between the end triangles of a function bar and making the appropriate selection in the function type section of the dialog. For example, by clicking bar 267 and selecting "non-repeatable" in the function type section of the function dialog (not shown), the function associated with bar 267 can be made non-repeatable. Similarly, a bar can be made non-reversible by activating the function dialog and selecting "non-reversible" in the function type section. A non-repeatable function is designated by a bar having the number "1" adjacent its leftmost triangle. In FIG. 31, bar 267 is so designated. Similarly, a ">" appearing adjacent to the leftmost triangle indicates a non-reversible function (see bar 262). This information is gleaned by the editor 162d for choosing function mapping in function modules (see FIG. 39A).

Referring to FIG. 31, as a user creates different functions on the bar chart image 236, the editor 162d creates additional stop and yield icons corresponding to various image elements. In particular, at the beginning of each separate function 260, 267, 262, 274 the editor 162*d* provides both a stop 245 and a yield 244 icon above the bar chart grid. The stop 245 and yield 244 icons allow a user to condition functions on the completion of other functions, cycles or other system input sequences. For example, to limit the possibility of spindle damage, it may be desired to make performance of the cross slide advance request contingent upon the horizontal mill spindle 30 being in an "on" state. Either of the stop 245 or yield 244 symbols can be used for this purpose.

Figure 33:
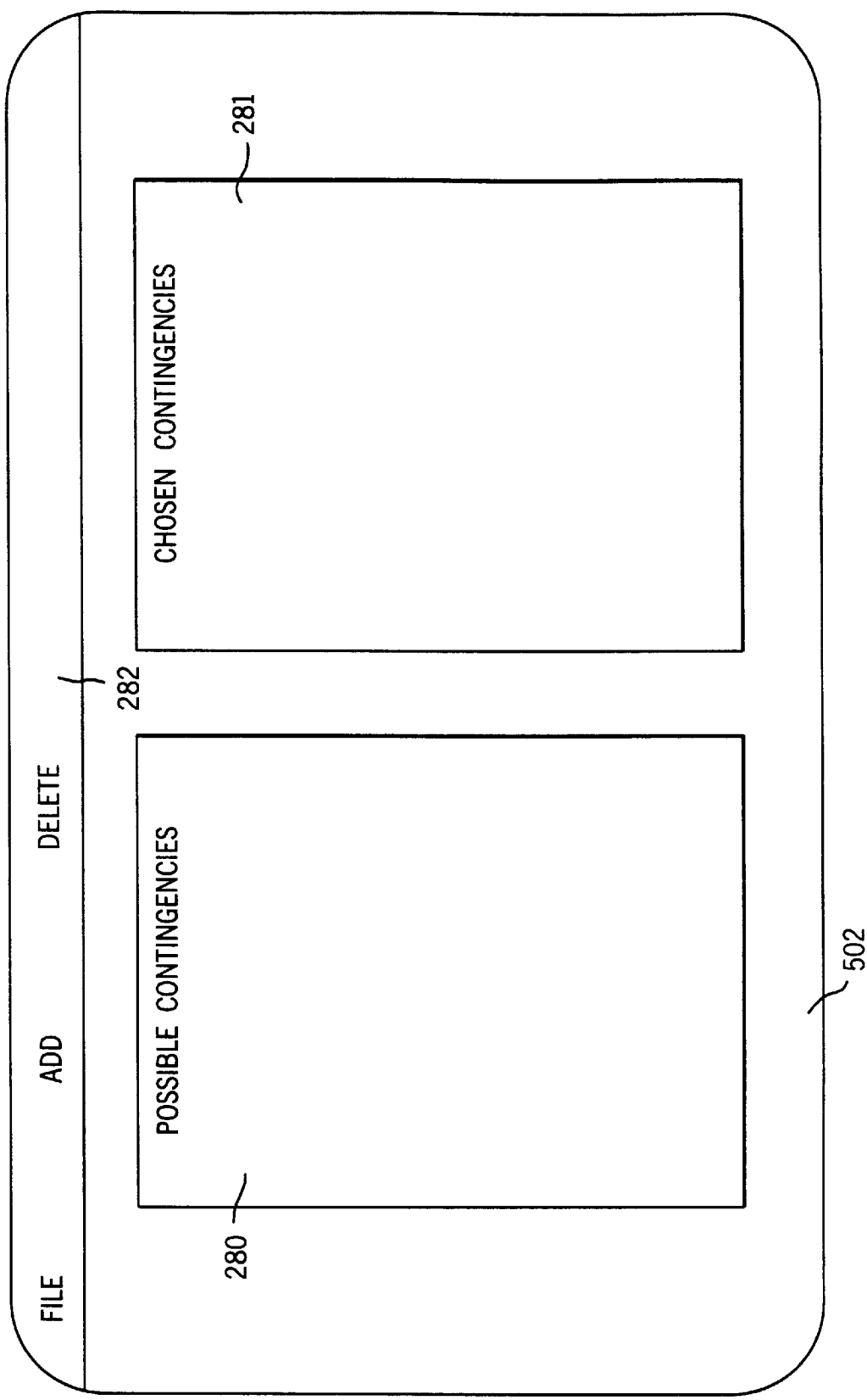
FIG. 33 is a screen display used to make the bar chart function of FIG. 31 contingent upon other occurrences.

To define contingencies for the cross slide advance request in request box 251, a user may select yield icon 244' which would provide a contingency screen 274 allowing a user to add or remove contingencies from a contingency list. Referring also to FIG. 33, one embodiment of a contingency screen would include two separate fields, one field 280 listing all possible machine contingencies. The other field, a CHOSEN CONTINGENCY field 281, would list selected contingencies. In addition, the screen 502 would include a menu bar 282 allowing a user to add and delete contingencies to and from the CHOSEN CONTINGENCY field 281. To make the cross slide advance contingent upon a spindle on state, the user selects a spindle on contingence from field 280. The editor then adds the "spindle on" contingency to field 281. Once a complete contingency list has been formed, the user saves the list and performance of the cross slide advance of FIG. 31 is then conditioned upon all contingencies in the list associated with yield icon 244' being completed.

The stop symbols 245 are similar to the yield symbols in that a list of contingencies can be formed which must be satisfied prior to continuing a sequence. However, whereas yield symbols 244 apply only to functions beginning at the yield icon, a stop symbol 245 applies to all functions beginning at or after the stop icon but before the end of an associated half-cycle sequence. For example, contingencies referenced in a contingency list associated with stop symbol 245" must be met at line 276 and at line 269.

In addition to contingencies on functions, sometimes it is necessary to put contingencies on the performance of the first and second sequences of a cycle. This kind of contingency affects the performance of a sequence independently of the contingencies on the functions making up that sequence. In other words, these are contingencies on "cycling" a cycle.

Contingencies specified using a stop sign 245 are conditions needed in order to initiate and continue performance of the first sequence of the cycle. In contrast, contingencies specified using a yield symbol 244 are conditions needed only to initiate performance of the first sequence of the cycle, but are not required thereafter.

For example, a user may select yield icon 244 associated with first sequence request 240 causing the bar chart editor to provide a contingency screen 274 for the first sequence. By placing a "spindle on" condition in the CHOSEN CONTINGENCY field 281, the user makes initiation of the first sequence conditional upon the spindle being in an "on" state. This contingency is in addition to a similar, but different, contingency placed on the cross slide advance request, which is a function performed as a part of the first sequence.

Both the function and first sequence contingencies apply the same "spindle on" condition, but the meanings are different and, what's more, complementary. Sequence contingencies are used to avoid initiating, continuing, or resuming performance of a sequence of operations that have little or no hope of being completed successfully or safely. In this case, if the spindle state is not "on" when a first sequence request is made, there is little or no hope that the spindle will be "on" when the cross slide advance request requires it to be so. Specifically, the first sequence contingency avoids advancing the main slide when it is already known that the cross-slide cannot advance. This avoids necessary machine activity that wastes time, energy, and may require the attention of a machine operator to undo before that cycle can be restarted. Sequence contingencies specified using a stop symbol also prevent unintended "spontaneous" resumption of sequence performance and, therefore, any requested functions that may have stopped due to a related function contingency, should a required condition that was lost suddenly be rectified.

Similarly, second sequence contingencies may be specified using stop and yield symbols associated with a second sequence request icon 241, while sequence contingencies may be specified common to both sequences using stop and yield symbols associated with whole cycle request icon 242.

Referring again to FIG. 41, preferably, after a complete cycle has been defined using the bar chart editor 162*d*, the editor 162*d* gleans information for each individual function from the bar chart image 236 and assigns buckets, start positions, and safeties to each function according to attributes table 431. Every start position is uniquely named and placed in a bucket M while every safety designated using icons 244 or 245 is placed in a bucket O.

Figure 42:
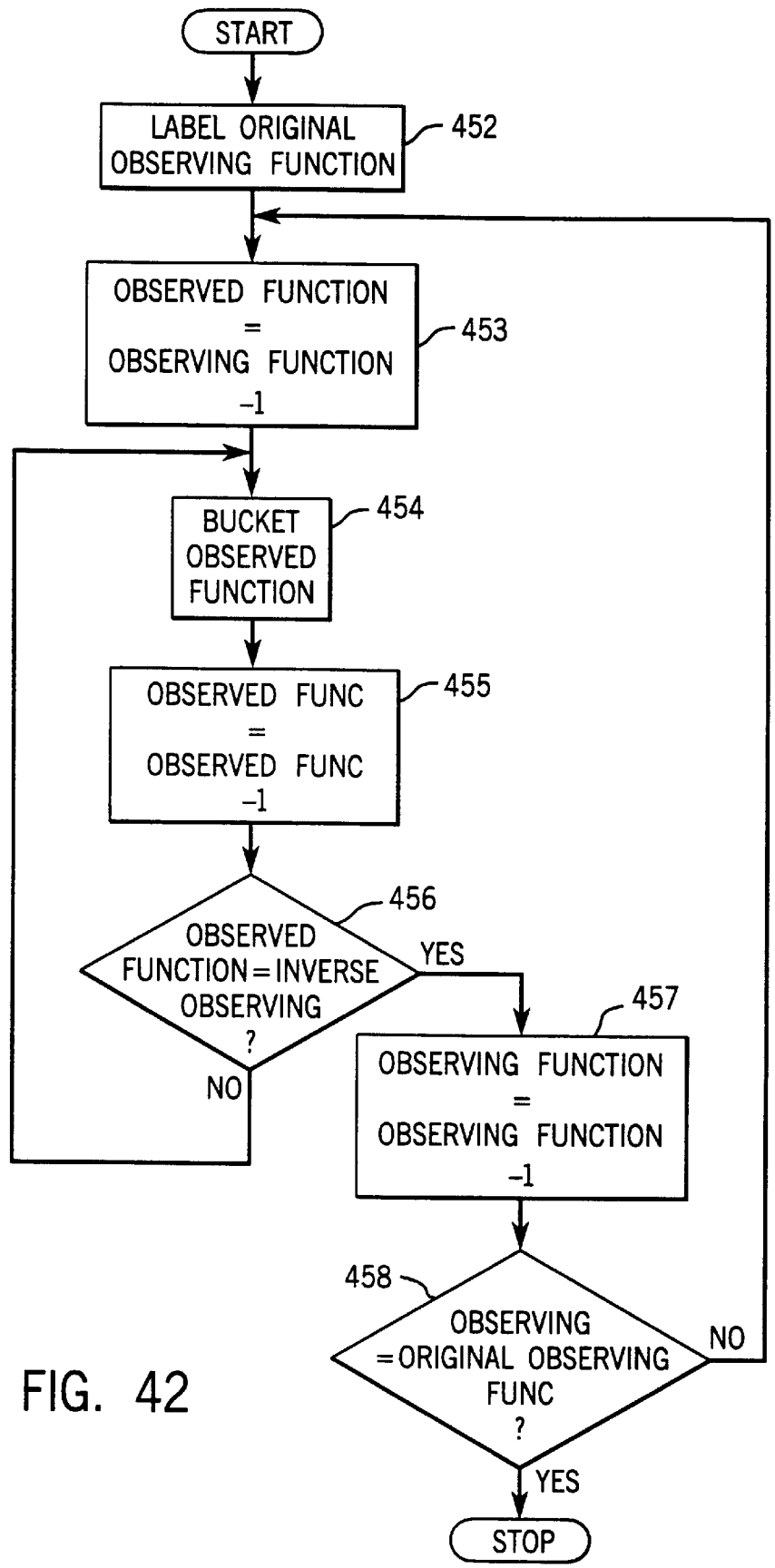
FIG. 42 is a program flow chart showing bar chart editor operations.

Referring to FIG. 42, to assign buckets for all functions, the editor 162*d* starts with the first function in a bar chart, labels that function an original observing function at block 452, and works backward to bucket all other cycle functions until it reaches the inverse of the observing function. Referring also to FIG. 31, to assign buckets for functions 260, 267, 262 and 274, the editor 162*d* would first label function 260 the observing function. Then at block 453, the editor 162*d* would label the function prior to function 260, in this case function 274, as the observed function. At block 454, the editor 162*d* assigns the observed function 274 to a bucket of the observing function 260 according to the attributes table 431 illustrated in FIG. 40. The bucketing process is explained below with reference to FIG. 43.

At block 455, the editor 162*d* labels the function prior to the instantaneous observed function as the next observed function. In FIG. 31, function 262 would be labeled the observed function. At decision block 456 the editor 162*d* determines if the observed function 262 is the inverse of the observing function 260. Where the observing function 262 is not the inverse, the editor 162*d* returns to block 454 and buckets the observed function. The editor 162*d* repetitively cycles through blocks 454–456 until the observed function is the inverse of the observing function.

In the preferred example, the observed function 262 is the inverse of observing function 260 and therefore, at decision block 456, the editor 162*d* branches to block 457 and labels the function prior to the instantaneous observing function as the observing function. In the present case, function 274 would be labeled the observing function. At decision block 458, the editor 162*d* determines if the observing function is the original observing function. If this condition is met, the editor 162*d* stops the bucketing process. If the observing function is not the original observing function, the editor 162*d* passes control back up to block 453 and begins the process over again. Thus, the editor 162*d* assigns to buckets all of the needed required functions for every function in a cycle.

Figure 43:
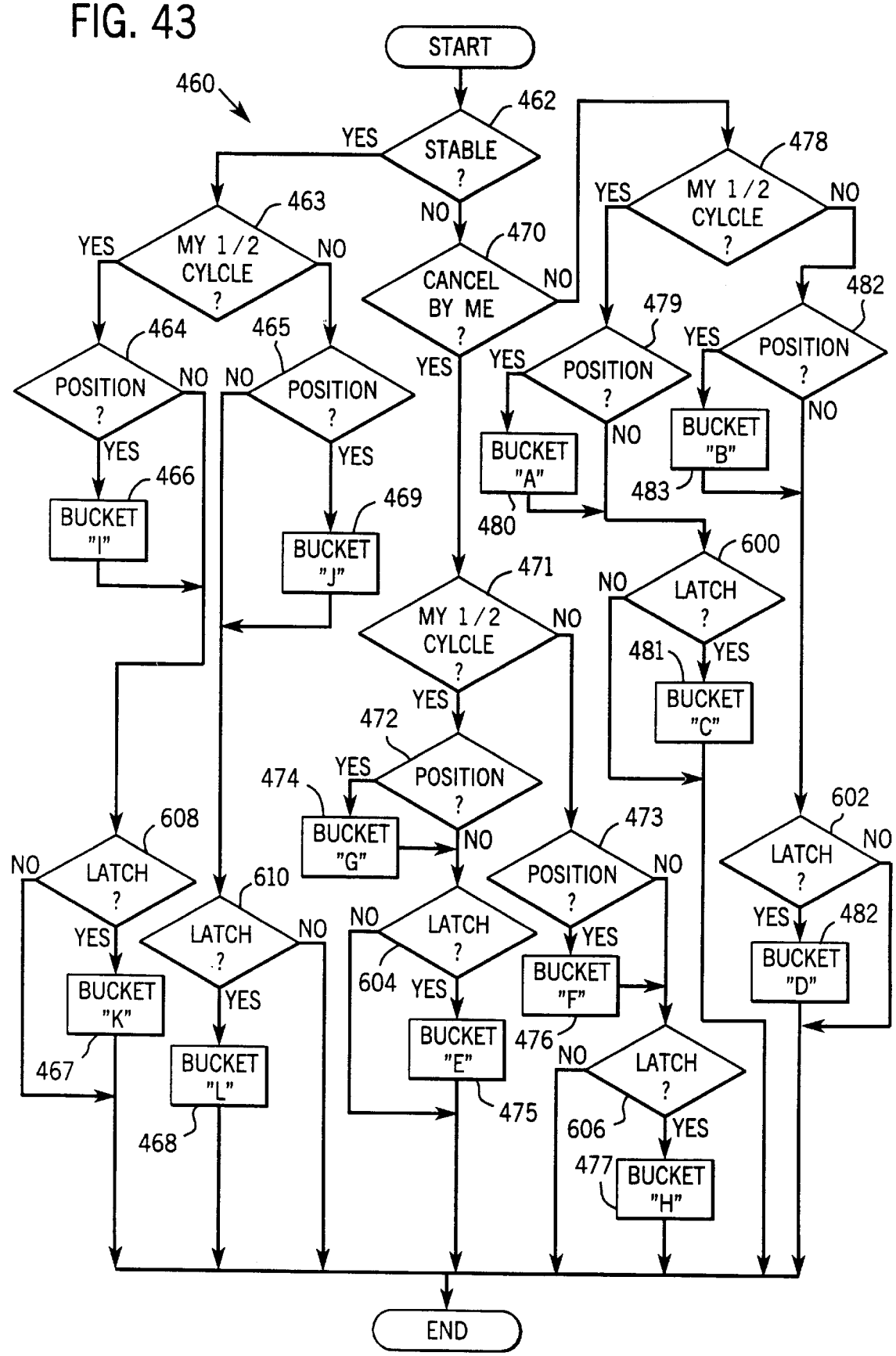
FIG. 43 is a program flow chart showing bar chart editor operators.

Referring now to FIG. 43, the bucketing process of block 454 is illustrated as process 460. To bucket an observed function, the editor 162*d* first determines whether or not the observed function is stable relative to the observing function at decision block 462.

Where the observed function is not stable, the editor 162*d* determines if the observed function is canceled by the observing function or canceled by some other function at decision block 470. Where the next function is canceled by some other function, the editor 162*d* next determines whether or not the observed function is in the same half-cycle as the observing function at block 478. Where the observed function is in the same half-cycle as the observing function, at decision block 479 the editor 162*d* determines whether or not the observed function incorporates a position or a latch. Where the observed function incorporates a position, at block 480 the editor 162*d* buckets the observed function as type A. Referring also to FIG. 40A, assigning a function to a bucket entails placing a unique name for the function in the appropriate list in the module list specification section 442 of the function template 436 associated with the observing function. In this case, where a function is placed in bucket A, the function is unstable, is canceled by the observing function, is in the same half-cycle as the observing function and incorporates a position and therefore would be placed in module list specification for 48. Similarly, as other functions are assigned to buckets, they are placed in other lists in the module list specification section 442.

After blocks 479 and 480, at block 600 the editor 162*d* determines if the observed function incorporates a latch. Note that a function can incorporate both a latch and a position. Where the observed function is not stable, is canceled by a function other than the observing function, is in the same half-cycle as the observing function and incorporates a latch, at block 481 the editor 162*d* assigns the observed function to bucket C.

Referring again to decision block 478, where the observed function is not stable, is canceled by a function other than the observing function, and is not in the same half-cycle as the observing function, the editor 162*d* passes control to decision block 482 to determine whether or not the observed function incorporates a position. Where the observed function incorporates a position, the editor 162*d* assigns the observed function to bucket B at block 483. At blocks 602 and 484, where the observed function incorporates a latch, the editor 162*d* assigns the observed function to bucket D.

Referring again to decision block 470 where the observed function is not stable but is canceled by the observing function, the editor 162*d* passes control to decision block 471 and determines whether or not the function is in the same half-cycle as the observing function. Where the observed function is in the same half-cycle as the observing function, the editor 162*d* determines whether or not the observed function incorporates a position or a latch at decision block 472. Where the observed function incorporates a position, the editor 162*d* assigns the observed function to bucket G at block 474. Where the observed function incorporates a latch, the editor 162*d* assigns the function to bucket E at blocks 604 and 475.

Referring again to decision block 471, where the observed function is not stable, is canceled by the observing function, and is in the half-cycle opposite the observing function, the editor 162*d* passes control to decision block 473 to determine whether or not the observed function is a position. Where the observed function incorporates a position, the editor 162*d* assigns the function to the F bucket at block 476 and where the observed function incorporates a latch the editor 162*d* assigns the function to bucket H at blocks 606 and 477.

Referring once again to decision block 462, where the observed function is stable, the editor 162*d* determines whether or not the observed function is in the same half-cycle as the observing function at decision block 463. Where the observed function is in the same half-cycle as the observing function the editor 162*d* determines whether or not the observed function incorporates a position at block 464. Where the observed function incorporates a position, the editor 162*d* assigns the function to bucket I at block 466. Where the observed function incorporates a latch the editor 162*d* assigns the function to bucket K at blocks 608 and 467.

Referring again to decision block 463, where the observed function is stable and is in the half cycle opposite the observing function the editor 162*d* determines whether or not the observed function incorporates a position at block 465. Where the observed function incorporates a position, the editor 162*d* assigns the function to bucket J at block 469. Where the observed function incorporates a latch the editor 162*d* assigns the function to bucket L at blocks 610 and 468.

Figure 39B:
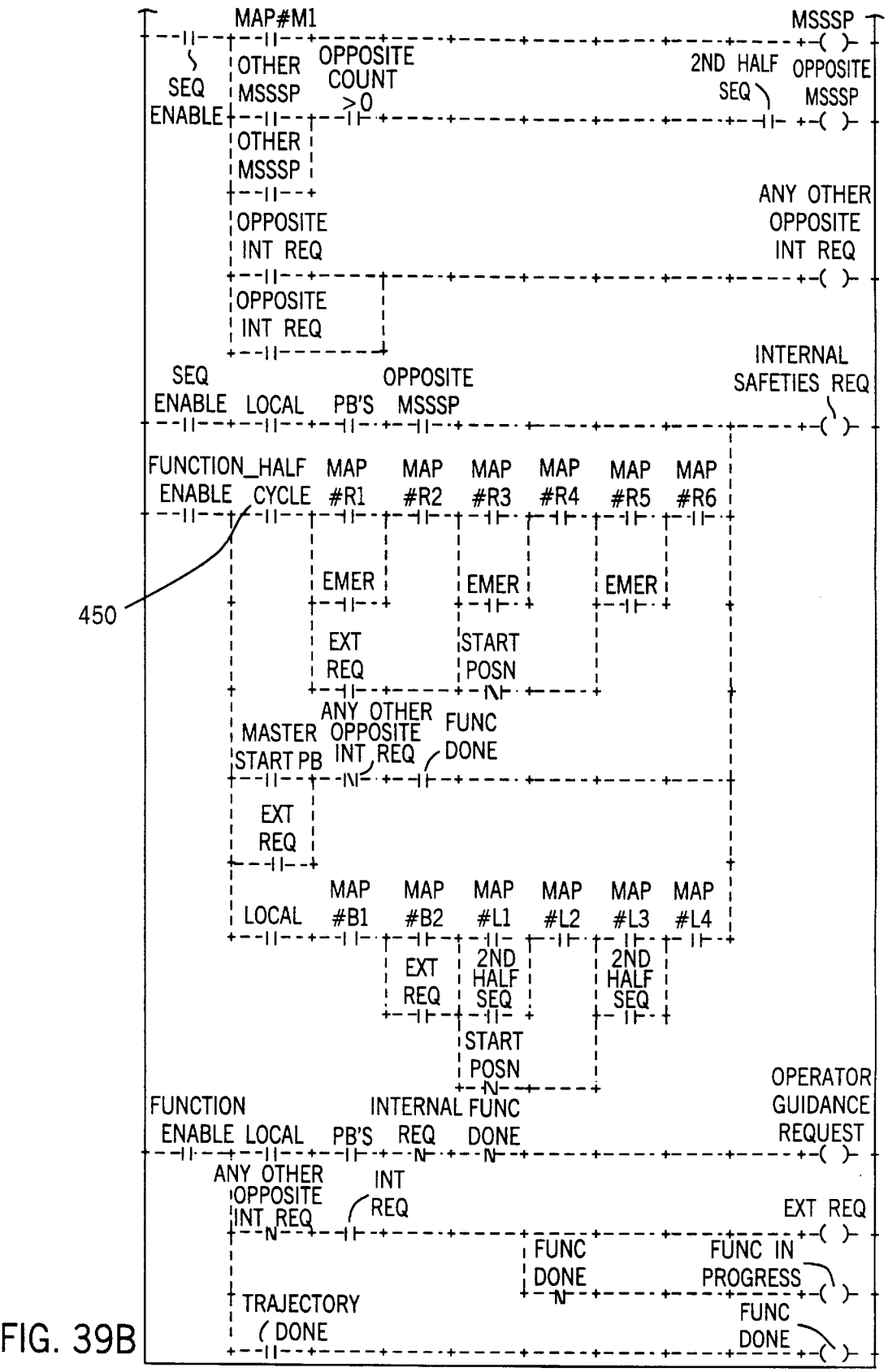

After all of the needed functions in a cycle have been assigned to buckets and added to appropriate lists by the editor 162*d*, the editor also gleans from the control diagram 236 which half-cycle the function is in. Referring to FIG. 39B, this information is used to label contact 450. In addition, this information is used at compile time with the XPO and XPC pseudoinstructions as explained above.

After a user completes the bar chart for the mill cycle including request designation, proper bar sequencing and proper contingency designations, the user must then go back to the control panel editor 162*c* and select the next cycle to be defined. Referring to FIG. 30, in the present example the user selects the spindle icon 234 and reenters the bar chart editor 162*d* to define the spindle cycle. The spindle cycle would include two requests, a "spindle on" request and a "spindle off" request. The spindle on request would constitute the first sequence and the spindle off request would constitute the second sequence. As with the mill cycle, the user would construct a complete bar chart like the one in FIG. 31, including requests, bars and contingencies for the spindle cycle. During construction, the editor 162*d* would continue to glean information required to populate modules and create new modules and to assign buckets as described above.

After complete bar charts have been constructed for each cycle identified in CYCLE field 226, if desired, the user can then define manual control devices and tie those devices to specific requests in the bar charts.

In the present example, it will be assumed that a user requires four separate manual push buttons on the horizontal mill control panel 57, one button each for the main and cross slide advance requests and one button each for the main and cross slide return requests. While buttons could be included for the spindle on and spindle off requests, for the purposes of this explanation it will be assumed that they are not needed.

To define a push button for the main slide advance request, the user selects the CONTROLS option from menu bar 222 which would provide a complete list of all requests associated with the cycles identified in the CYCLE field 226. In the horizontal mill example, the request list includes "main slide advance", "main slide return", "cross slide advance", "cross slide return", "spindle on", "spindle off", and "whole cycle", "first sequence" and "second sequence" requests for both the mill and spindle cycles. To designate a main slide advance button the user selects the main slide advance request from the list. The editor 162*c* then provides a button icon 286 labeled "main slide advance".

In a similar fashion, the user selects the CONTROLS option three more times, each time selecting a different possible request, the three selected requests being "cross slide advance", "main slide return" and "cross slide return". Each time a different request is selected, the editor 162*c* provides a new icon 287, 288, 289 labeled accordingly. At this point all of the manual control buttons have been defined and associated with different requests.

To define indicator lights, the user selects the LIGHTS option from bar 222. The editor 162*c* provides a list of possible limiting positions associated with the requests in the mill and spindle cycles. The user selects a limiting position and then the editor 162*c* provides an associated light icon. In FIG. 30, two light icons are illustrated, one 292 for the main slide return and another 294 for the cross slide return.

As with the machine 162*a* and axis 162*b* editors, while a user is constructing a control panel image and corresponding bar chart images using the control panel 162*c* and bar chart 162*d* editors, the editors 162*c* and 162*d* are simultaneously gleaning information from the images to further develop the template-based machine tree according to the process shown in FIG. 18. Thus, additional modules are created and existing modules are populated until all required images have been completed.

With all of the mode, manual control and indicator light devices defined and all of the cycles corresponding to the horizontal mill defined, the editors have all the information required to provide RLL logic to control the horizontal mill. To provide information required for all of the machine components, the user would step through editing with the axis 162*b*, control panel 162*c*, and bar chart 162*d* editors for all machine components.

Figure 34:
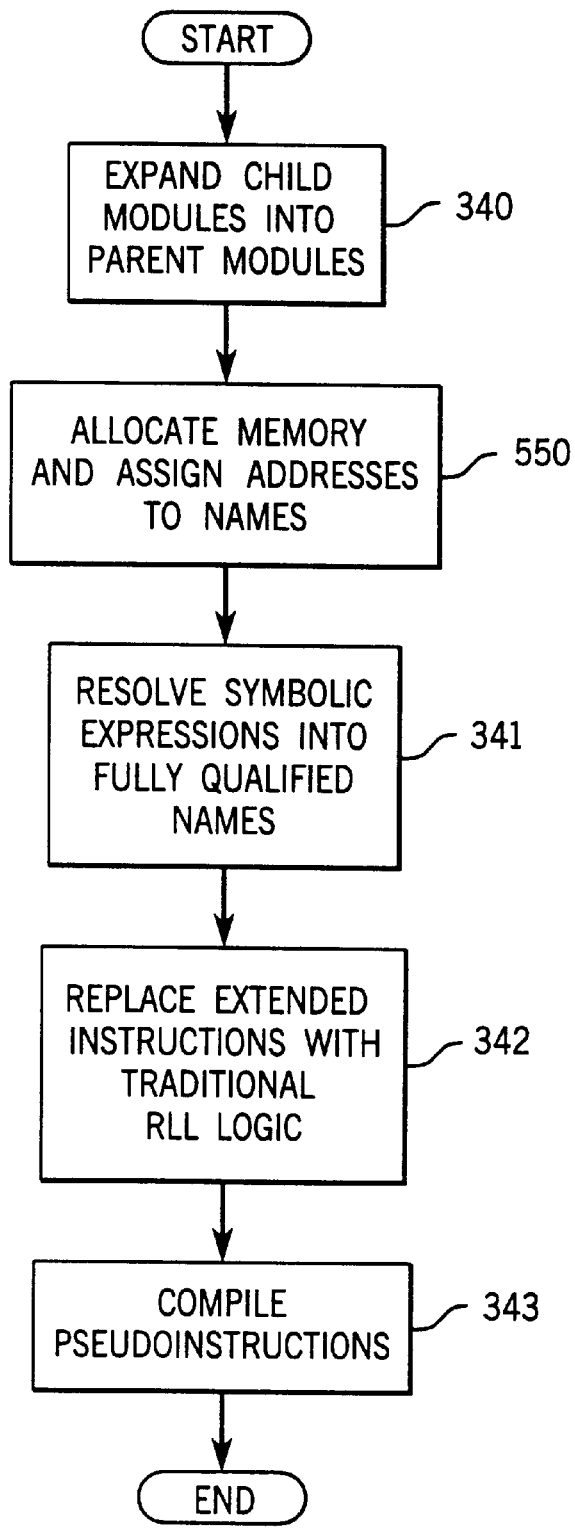
FIG. 34 is a flow chart depicting a compiling process.

After all required physical and operational characteristics of machine components are completely defined using the editors described above, the user would instruct the programming terminal to compile the entire template tree. Compilation is relatively simple and is depicted in FIG. 34. Initially, at block 340, the compiler expands all child modules into specifications in parent modules. For example, referring again to FIGS. 9 and 10, the master control panel module 106 is placed in the machine module 98 where the master control panel is referenced at 100. Similarly, all axis modules (herein the module name "air") are expanded into the machine module 98 in place of the module list specification named Axis 102 and all indexer modules (herein the module named "T1") are expanded into the machine module 98 in place of the module list specification named Indexer 104. The compiler works its way through the entire template-based machine tree, including portions provided by the axis 162*b*, control panel 162*c* and bar chart 162*d* editors until all child modules have been expanded into their referencing parent modules.

At block 550 the compiler allocates programmable controller memory for the modules and assigns memory addresses to fully qualified names defined by data definition statements in the modules. Next, at process block 341, the compiler resolves the symbolic expressions into fully-qualified names. For example, a symbolic expression for a push button of a master control panel may be "$.MasterStartPB". In the present example, this symbolic expression would expand into the fully qualified name "AB1.MasterControlPanel.MasterStartPB". Similarly, the left horizontal work-unit of the fourth station (i.e. the horizontal mill 22) in the present example would have the fully qualified name "AB1.T1.S4.LH" wherein LH stands for "left horizontal", S4 for "the fourth station", T1 for "the transfer" and AB1 for "the machine" 10 generally.

After all the symbolic expressions have been expanded into fully qualified names, at block 342 the extended instructions such as AND and OR lists are replaced with RLL logic. Thus an AND list macro corresponding to a list including ten entries will be replaced by a ten contact series set of RLL instructions, each contact corresponding to a different list entry. Similarly, OR list macros would be replaced with a set of RLL instructions expanded in parallel.

Next, at block 343 the compiler would compile pseudo-instructions XPC, XPO and OTX, removing RLL logic from some RLL rungs and expanding logic in others depending on job specific requirements.

After block 343, all that remains is a control program consisting entirely of conventional RLL logic that can be used by a controller 60 to control the industrial process of machine 10.

This concludes the detailed description of the preferred embodiment. However, it should be appreciated by those of ordinary skill in the art that the description herein is given only by way of example and that various modifications and additions might be made, while still coming within the scope of the invention. In particular, while the present template-based language has been developed for use in RLL programming, other template-based languages could be developed for use with other industrial controller programming languages such as state diagram programming. The important aspect of the present language is not that it relates to RLL, but rather the realization that extensions to normal programming language logic itself in conjunction with extensions that are separate from the language logic can be used to provide truly reusable programming logic that can be tailored to job-specific requirements.

In addition, while the exemplary template set detailed above was specifically designed for the metal removal industry, it is anticipated that other template sets that account for industry specific idiosyncrasies will be developed for other industries, and the present invention is meant to cover all other such template sets.

Moreover, while the description above described how computer editors can act as interfaces to facilitate programming, it is contemplated that a user could construct a template-based machine tree and compile a program without the use of a computer editor. In other words, using a template set, a user could designate and populate modules by hand and then compile the modules as in FIG. 34.

Furthermore, while preferred editors are described herein, any type of computer editor could be used to aid a user in programming using the template language. The important aspect of any editor is that the editor allow the user to input information from which the editor can glean a subset of information required to designate and populate required modules. In addition, while the present invention is described in the context of four editors, the inventive template language could be used with more special editors provided for specific applications or in the alternative, one editor could be used separately to provide RLL logic for a single portion of a machine tree.

To apprise those who practice in the art as to the scope of the invention the following claims are made:

We claim:

1. A programming apparatus for an industrial controller which has a processor module that stores and executes a machine language program to control a machine, the machine including at least one axis, each axis including two or more mechanical components wherein one component has freedom to move with respect to another stationary component in a reciprocal manner along a single axis, each separate movement referred to as an axis function, each function being part of a machine cycle, the apparatus used to provide a machine language program for controlling at least one cycle, the apparatus comprising:

- a generator for creating a behavior profile that depicts desired sequences of axis functions in a cycle as a two dimensional graph with order of axis functions represented along one dimension and progression of axis functions along the other dimension, the generator including a designator for designating functions and function sequences; and
- an editor for communicating with the generator to identify axis functions and function sequences corresponding to the behavior profile and for producing a substantially complete real time machine language program for controlling axis functions according to the behavior profile.

2. The apparatus of claim 1 wherein the behavior profile is a bar chart image.

3. The apparatus of claim 1 further comprising a display device for displaying the behavior profile as well as information about each axis function.

4. The apparatus of claim 1 wherein the machine includes at least first and second cycles and the designator can be used for designating first half, second half, or whole completion of the second cycle as a condition upon which each function in a first cycle is dependent.

5. The apparatus of claim 1 wherein all functions include at least some common characteristics and often function distinct characteristics and the apparatus is to be used with a template set including a function template and other templates, the function template including a logic section that provides machine language logic for common characteristics of all functions and a child module designation section for designating instances of other templates required to further designate additional logic needed to control function distinct characteristics, and wherein each template instance is a module and each module that references another module is a parent module, the editor including both an information identifier and a compiler, the identifier gleaning information from the behavior profile and creating a function module based on the function template for each cycle function and populating child designation sections of existing function modules in accordance with the gleaned information in a manner dependent upon function characteristics, whereby, after all functions in a cycle have been designated, the modules together form a template based machine tree that substantially defines all operational characteristics of a cycle, after the machine tree is formed, the compiler compiling the machine tree by substituting modules for their designations in parent modules to provide the real time machine language program.

6. A programming apparatus for an industrial controller which has a processor module that stores and executes a machine language program to control a machine, the machine including at least one axis, each axis including two or more mechanical components wherein one component has freedom to move with respect to another stationary component in a reciprocal manner along a single axis, each separate movement referred to as an axis function, each function being part of a machine cycle, the apparatus used to provide a machine language program for controlling at least one cycle, the apparatus comprising:

- a generator for creating a behavior profile that depicts desired sequences of axis functions in a cycle as a two dimensional graph with order of axis functions represented along one dimension and progression of axis functions along the other dimension, the generator including a designator for designating functions and function sequences;
- an editor for communicating with the generator to identify axis functions and function sequences corresponding to the behavior profile and for producing a substantially complete real time machine language program for controlling axis functions according to the behavior profile;
- wherein all functions include at least some common characteristics and often function distinct characteristics and the apparatus is to be used with a template set including a function template and other templates, the function template including a logic section that provides machine language logic for common characteristics of all functions and a child module designation section for designating instances of other templates required to further designate additional logic needed to control function distinct characteristics, and wherein each template instance is a module and each module that references another module is a parent module, the editor including both an information identifier and a compiler, the identifier gleaning information from the behavior profile and creating a function module based on the function template for each cycle function and populating child designation sections of existing function modules in accordance with the gleaned information in a manner dependent upon function characteristics, whereby, after all functions in a cycle have been designated, the modules together form a template based machine tree that substantially defines all operational characteristics of a cycle, after the machine tree is formed, the compiler compiling the machine tree by substituting modules for their designations in parent modules to provide the real time machine language program; and
- wherein each function module logic section or other modules referenced in a function module child designation section include some alterable logic that can be altered to provide logic to control function distinct characteristics and, wherein, the designator can be used for designating contingencies upon which each function in a cycle is dependent and, wherein, when the identifier gleans information the identifier identifies function contingencies and, when the identifier creates a function module, the identifier alters the alterable logic to accommodate said function contingencies.

7. The apparatus of claim 6 wherein, after the identifier identifies function contingencies, the identifier places contingencies into different groups and alters the alterable logic to provide a set of output logic for each group, each output logic set providing an output signal indicating when all contingencies in the group have been met, the output signals mapped into other function module logic so as to condition function performance upon the various function contingencies.

8. The apparatus of claim 7 wherein the identifier provides function modules for functions in a cycle one at a time, the function for which a module is being provided being an observing function, all other functions in said cycle being observed functions, and the identifier places each observed function into a contingency group depending upon characteristics of the observed function from the perspective of the observing function.

9. The apparatus of claim 8 wherein the functions in a cycle include an inverse observing function which is the function that returns an associated moveable component to a position with respect to the stationary component occupied prior to performance of the observing function, and the observed functions include functions in only one of two sets, a first set including functions that occur between the observing function and the inverse observing function, and the second set including functions that occur between the inverse observing function and the observing function.

10. The apparatus of claim 9 wherein the characteristics upon which each observed function is grouped are stability relative to the observing function, canceling agent, cycle half, and type, with respect to stability a function being stable or unstable, a stable function being a function that does not typically start or stop during the observing function, an unstable function being a function that does start or stop during an observing function, with respect to canceling agent an unstable function being either canceled by me or canceled by other, a canceled by me function being an unstable function that starts or stops because of a state reached by the observing function, a canceled by other function being a function that starts or stops because of a state reached by a function other than the observing function, with respect to cycle half a function being either a my half cycle or other half cycle function, a my half cycle function being a function that begins before an observing function in the same half cycle as the observing function, an other half cycle function being a function that is either in the half cycle opposite the observing function or, if in the same half cycle as the observing function, a function that starts after the observing function, with respect to type a function being either of a position type, a latch type, or a combination position and latch type, a function being a latch if the function incorporates a latch in a cycle other than the observing function's cycle, being a position if the function incorporates a change in position that causes motion and being a combination position and latch if the function incorporates a latch in a cycle other than the observing function's cycle and causes motion.

11. The apparatus of claim 10 wherein the identifier groups observed functions for each observing function into twelve different groups based on the stability, canceling agent, cycle half, and type characteristics, a first group including unstable, cancel by other, my half of cycle, position functions, a second group including unstable, cancel by other, other half cycle, position functions, a third group including unstable, cancel by other, my half cycle, latch functions, a fourth group including unstable, cancel by other, other half, latch functions, a fifth group including unstable, cancel by me, my half cycle, position functions, a sixth group including unstable, cancel by me, other half, position functions, a seventh group including unstable, cancel by me, my half cycle, latch functions, an eighth group including unstable, cancel by me, other half, latch functions, a ninth group including stable, my half, position functions, a tenth group including stable, other half, position functions, an eleventh group including stable, my half, latch functions and a twelfth group including stable, other half, latch functions.

12. The apparatus of claim 11 wherein the designator can be used to designate function control mechanisms, other contingencies, and the start position of a function and the identifier gleans control mechanism, other-contingency, and start position information from the behavior profile and provides logic for a control mechanism group having a control mechanism output providing a control mechanism output signal, an other contingency group having an other-contingency output providing an other-contingency output signal and a start position group having a start position output providing a start position output signal, the other-contingency, control mechanism and start position output signals mapped into other control logic such that specific control mechanisms, other-contingency and start position conditions must be met during various stages of performance of a corresponding function.

13. The apparatus of claim 5 wherein each cycle function can be of either a normal, a non-reversible, or a non-repeatable nature, a normal function capable of being performed many times in either forward or reverse directions in manual operation, a non-reversible function capable of performance in only the forward direction, and a non-repeatable function that cannot be performed forward to completion more than once in a single cycle, wherein the designator can be used to designate the nature of each function and, wherein, the editor maps the function group output signals in a manner dependent on the nature of the function.

14. The apparatus of claim 13 wherein, when a normal function is designated, the editor populates the child module designation section of a corresponding module with a normal function mapping module designation and creates a normal function mapping module to map the contingencies such that the function can be performed in either the forward or reverse directions, when a non-reversible function is designated, the editor populates the child module designation section of a corresponding module with a non-reversible function mapping module designation and creates a non-reversible function mapping module such that the function cannot be performed in the reverse direction, and when a non-repeatable function is designated, the editor populates the child module designation section of a corresponding module with a non-repeatable function mapping module designation and creates a non-repeatable function mapping module such that the function cannot be performed twice in the same cycle.

15. The apparatus of claim 1 wherein the machine language is relay ladder language.

16. A method to be used with an industrial controller which has a processor module that stores and executes a machine language program to control a machine, the machine including at least one axis, the axis including two or more mechanical components wherein one component has freedom to move with respect to the other in a reciprocal manner along a single axis, each separate movement referred to as an axis function, each function being part of a machine cycle, the cycle represented by a behavior profile including means whereby functions and their sequences are illustrated, the method for providing a machine language program for controlling the cycle, the method comprising the steps of:

gleaning information from the behavior profile to identify the cycle, axis functions and function sequences; and generating a substantially complete real time machine language program for controlling axis functions according to the behavior profile.

17. The method of claim 16 wherein all machine cycle functions include at least some common characteristics and often function distinct characteristics, the method to be used with a template set including a function template, a cycle template, and other templates, the function template including a logic section that provides machine language logic for common characteristics of all machine cycle functions and a child module designation section for designating instances of other templates required to further designate additional logic needed to control function distinct characteristics, the cycle template also including both a logic section and a child module designation section, and wherein each template instance is a module and each module that references another module is a parent module, the step of generating including the steps of:

identifying functions and function sequences from the behavior profile;

creating a cycle module for the cycle including a child module designation section that separately specifies a function module for each cycle function;

creating a function module for each function module designation in the cycle module child designation section;

creating other modules required to designate additional logic needed to control function distinct characteristics of each function and designating the other modules in function module child module designation sections; and compiling the modules by substituting modules for their designations in parent modules to provide the real time machine language program.

18. A method to be used with an industrial controller which has a processor module that stores and executes a machine language program to control a machine, the machine including at least one axis, the axis including two or more mechanical components wherein one component has freedom to move with respect to the other in a reciprocal manner along a single axis, each separate movement referred to as an axis function, each function being part of a machine cycle, the cycle represented by a behavior profile including means whereby functions and their sequences are illustrated, all machine cycle functions include at least some common characteristics and often function distinct characteristics, the method to be used with a template set including a function template, a cycle template, and other templates, the function template including a logic section that provides machine language logic for common characteristics of all machine cycle functions and a child module designation section for designating instances of other templates required to further designate additional logic needed to control function distinct characteristics, the cycle template also including both a logic section and a child module designation section, and wherein each template instance is a module and each module that references another module is a parent module, the method for providing a machine language program for controlling the cycle, the method comprising the steps of:

gleaning information from the behavior profile to identify the cycle, axis functions and function sequences;

generating a substantially complete real time machine language program for controlling axis functions according to the behavior profile;

the step of generating including the steps of:

identifying functions and function sequences from the behavior profile;

performance of each function is contingent upon a set of function contingencies that can be gleaned from the behavior profile and each function module logic section or other modules referenced in a function module child designation section includes some alterable logic that can be altered to provide logic to control function distinct characteristics;

creating a cycle module for the cycle including a child module designation section that separately specifies a function module for each cycle function;

creating a function module for each function module designation in the cycle module child designation section;

creating other modules required to designate additional logic needed to control function distinct characteristics of each function and designating the other modules in function module child module designation sections;

compiling the modules by substituting modules for their designations in parent modules to provide the real time machine language program; and information includes the step of identifying function contingencies and the step of creating a function module includes the step of altering the alterable logic to accommodate said function contingencies.

19. The method of claim 18 wherein, prior to creating a function module, the method includes the step of placing contingencies into different groups and the step of altering alterable logic includes providing a set of output logic for each group, each output logic set providing an output signal indicating when all contingencies in the group have been met, and the method also includes the step of mapping the output signals to function module logic so as to condition function performance upon the various function contingencies.

20. The method of claim 19 wherein the step of creating function modules includes creating function modules for functions in a cycle one at a time, the function for which a module is being provided being an observing function, all other functions in said cycle being observed functions, and the step of creating a function includes the step of placing each observed function into a contingency group depending upon characteristics of the observed function from the perspective of the observing function.

21. The method of claim 20 wherein the functions in a cycle include an inverse observing function which is the function that returns an associated moveable component to a position with respect to the stationary component occupied prior to performance of the observing function, and the observed functions include functions in only one of two sets, a first set including functions that occur between the observing function and the inverse observing function, and the second set including functions that occur between the inverse observing function and the observing function.

22. The method of claim 20 wherein the characteristics upon which each observed function is placed in a group are stability, canceling agent, cycle half, and type, with respect to stability a function being stable or unstable, a stable function being a function that does not typically start or stop during the observing function, an unstable function being a function that does start or stop during an observing function, with respect to canceling agent an unstable function being either canceled by me or canceled by other, a canceled by me function being an unstable function that starts or stops because of a state reached by the observing function, a canceled by other function being a function that starts or stops because of a state reached by a function other than the observing function, with respect to cycle half a function being either a my half cycle or other half cycle function, a my half cycle function being a function that begins before an observing function in the same half cycle as the observing function, an other half cycle function being a function that is either in the half cycle opposite the observing function or, if in the same half cycle as the observing function, a function that starts after the observing function, with respect to type a function being either of a position type, a latch type, or a combination position and latch type, a function being a latch if the function incorporates a latch in a cycle other than the observing function's cycle, being a position if the function incorporates a change in position that causes motion and being a combination position and latch if the function incorporates a latch in a cycle other than the observing function's cycle and causes motion.

23. The method of claim 22 wherein the step of placing observed functions includes placing observed functions into twelve different groups based on the stability relative to the observing function, canceling agent, cycle half and type characteristics, a first group including unstable, cancel by other, my half of cycle, position functions, a second group including unstable, cancel by other, other half cycle, position functions, a third group including unstable, cancel by other, my half cycle, latch functions, a fourth group including unstable, cancel by other, other half latch functions, a fifth group including unstable, cancel by me, my half cycle, position functions, a sixth group including unstable, cancel by me, other half, position functions, a seventh group including unstable, cancel by me, my half cycle, latch functions, an eighth group including unstable, cancel by me, other half, latch functions, a ninth group including stable, my half, position functions, a tenth group including stable, other half, position functions, an eleventh group including stable, my half, latch functions and a twelfth group including stable, other half, latch functions;

after functions are placed into different groups, the method further including the steps of altering the alterable logic to provide a set of output logic for each group, each output logic set providing an output signal indicating when all contingencies in the group have been met, and mapping the output signals into other function module logic so as to condition function performance on various function contingencies.

24. The method of claim 23 wherein each cycle function can be of either a normal, a non-reversible, or a non-repeatable nature, a normal function capable of being performed many times in either forward or reverse directions in manual operation, a non-reversible function capable of performance in only the forward direction, and a non-repeatable function that cannot be performed more than once in a single cycle, the behavior profile indicating the nature of the function, wherein the mapping step includes mapping the output signals in a manner dependent upon the nature of the function.

25. The method of claim 16 wherein the machine language is relay ladder language.

26. A programming apparatus for an industrial controller which has a processor module that stores and executes a machine language program to control a machine, the machine including at least one axis, each axis including two or more mechanical components wherein one component has freedom to move with respect to another stationary component in a reciprocal manner along a single axis, each separate movement referred to as an axis function, each function being part of a machine cycle, the apparatus used to provide a machine language program for controlling at least one cycle, the apparatus comprising:

a graphical interface for creating a graphical depiction of desired sequences of axis functions in a cycle; and an editor for communicating with the interface to identify axis functions and function sequences from the graphical depiction and for producing a substantially complete real time machine language program for controlling axis functions according to the graphical depiction.

27. The apparatus of claim 26 wherein the behavior profile is a bar chart image.

28. The apparatus of claim 26 wherein all functions include at least some common characteristics and often function distinct characteristics and the apparatus is to be used with a template set including a function template and other templates, the function template including a logic section that provides machine language logic for common characteristics of all functions and a child module designation section for designating instances of other templates required to further designate additional logic needed to control function distinct characteristics, and wherein each template instance is a module and each module that references another module is a parent module, the editor including both an information identifier and a compiler, the identifier gleaning information from the behavior profile and creating a function module based on the function template for each cycle function and populating child designation sections of existing function modules in accordance with the gleaned information in a manner dependent upon function characteristics, whereby, after all functions in a cycle have been designated, the modules together form a template based machine tree that substantially defines all operational characteristics of a cycle, after the machine tree is formed, the compiler compiling the machine tree by substituting modules for their designations in parent modules to provide the real time machine language program.

\* \* \* \* \*